United States Patent
Iyer et al.

(10) Patent No.: US 10,042,573 B2
(45) Date of Patent: *Aug. 7, 2018

(54) HIGH SPEED MEMORY SYSTEMS AND METHODS FOR DESIGNING HIERARCHICAL MEMORY SYSTEMS

(71) Applicant: Cisco Technology, Inc., San Jose, CA (US)

(72) Inventors: Sundar Iyer, Palo Alto, CA (US); Shang-Tse Chuang, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/213,492

(22) Filed: Jul. 19, 2016

(65) Prior Publication Data

US 2016/0328170 A1    Nov. 10, 2016

Related U.S. Application Data

(63) Continuation of application No. 12/806,631, filed on Aug. 17, 2010, now Pat. No. 9,442,846, which is a (Continued)

(51) Int. Cl.
G06F 12/02    (2006.01)
G06F 3/06    (2006.01)
G06F 12/08    (2016.01)

(52) U.S. Cl.
CPC .......... *G06F 3/0629* (2013.01); *G06F 3/0604* (2013.01); *G06F 3/0652* (2013.01);
(Continued)

(58) Field of Classification Search
None
See application file for complete search history.

(56) References Cited

U.S. PATENT DOCUMENTS 4,725,945 A    2/1988    Kronstadt et al.
5,835,941 A    11/1998    Pawlowski
(Continued)

FOREIGN PATENT DOCUMENTS

CN    1195817 A    10/1998
CN    101262405 A    9/2008
EP    1006435 A1    6/2000

OTHER PUBLICATIONS

Office Action with English translation in Chinese Application No. 201080063971.0, dated Nov. 24, 2014, 13 pages.
(Continued)

*Primary Examiner* — Charles Rones
*Assistant Examiner* — Ryan Dare
(74) *Attorney, Agent, or Firm* — Edell, Shapiro & Finnan, LLC

(57) ABSTRACT

A system and method for designing and constructing hierarchical memory systems is disclosed. A plurality of different algorithmic memory blocks are disclosed. Each algorithmic memory block includes a memory controller that implements a specific storage algorithm and a set of lower level memory components. Each of those lower level memory components may be constructed with another algorithmic memory block or with a fundamental memory block. By organizing algorithmic memory blocks in various different hierarchical organizations, may different complex memory systems that provide new features may be created.

20 Claims, 41 Drawing Sheets

Related U.S. Application Data continuation-in-part of application No. 12/584,645, filed on Sep. 8, 2009, now Pat. No. 8,433,880.

(60) Provisional application No. 61/161,025, filed on Mar. 17, 2009, provisional application No. 61/284,260, filed on Dec. 15, 2009.

(52) U.S. Cl.
CPC ............ *G06F 3/0673* (2013.01); *G06F 12/08* (2013.01); *G06F 2212/254* (2013.01)

(56) References Cited

U.S. PATENT DOCUMENTS

| | | |
|---|---|---|
| 5,860,141 A | 1/1999 | Washington et al. |
| 6,189,073 B1 | 2/2001 | Pawlowski |
| 6,378,032 B1 | 4/2002 | Robertson |
| 6,404,691 B1 | 6/2002 | Fujishima et al. |
| 6,446,157 B1 | 9/2002 | McGehearty et al. |
| 6,622,225 B1 | 9/2003 | Kessler et al. |
| 6,801,980 B2 | 10/2004 | Ji et al. |
| 6,948,028 B2 | 9/2005 | Ji et al. |
| 7,047,385 B1 | 5/2006 | Bhattacharya et al. |
| 7,203,794 B2 | 4/2007 | Ji et al. |
| 7,739,460 B1 | 6/2010 | Carr |
| 7,827,372 B2 | 11/2010 | Bink et al. |
| 2002/0056022 A1 | 5/2002 | Leung |
| 2003/0046487 A1 | 3/2003 | Swaminathan |
| 2004/0093458 A1 | 5/2004 | Kanno et al. |
| 2004/0103250 A1 | 5/2004 | Alsup |
| 2004/0143710 A1 | 7/2004 | Walmsley |
| 2004/0143720 A1 | 7/2004 | Mansell et al. |
| 2005/0091465 A1 | 4/2005 | Andreev et al. |
| 2006/0129741 A1 | 6/2006 | Hillier et al. |
| 2006/0190678 A1 | 8/2006 | Butler et al. |
| 2007/0233959 A1 | 10/2007 | Hotta et al. |
| 2008/0082755 A1 | 4/2008 | Komegay et al. |
| 2008/0115043 A1 | 5/2008 | Shimizume et al. |
| 2008/0133876 A1 | 6/2008 | Kwon et al. |
| 2008/0162798 A1 | 7/2008 | Lofgren et al. |
| 2008/0183958 A1 | 7/2008 | Cheriton |
| 2009/0077329 A1 | 3/2009 | Wood et al. |
| 2009/0182944 A1 | 7/2009 | Comparan et al. |
| 2009/0254731 A1 | 10/2009 | Maheshwari et al. |
| 2011/0022791 A1 | 1/2011 | Iyer et al. |
| 2013/0121075 A1 | 5/2013 | Hutchison et al. |

OTHER PUBLICATIONS

Office Action with English translation in Chinese Application No. 201180048921.X, dated May 13, 2015, 28 pages.

Hans Mattausch, "Hierarchical N-Port Memory Architecture based on 1-Port Memory Cells", Sep. 16, 1997, Digital Object Identifier:10.1109/ESSCIR.1997.186178.

Philip Koopman, "Main Memory Architecture", Oct. 19, 1998, Carnegie Mellon University.

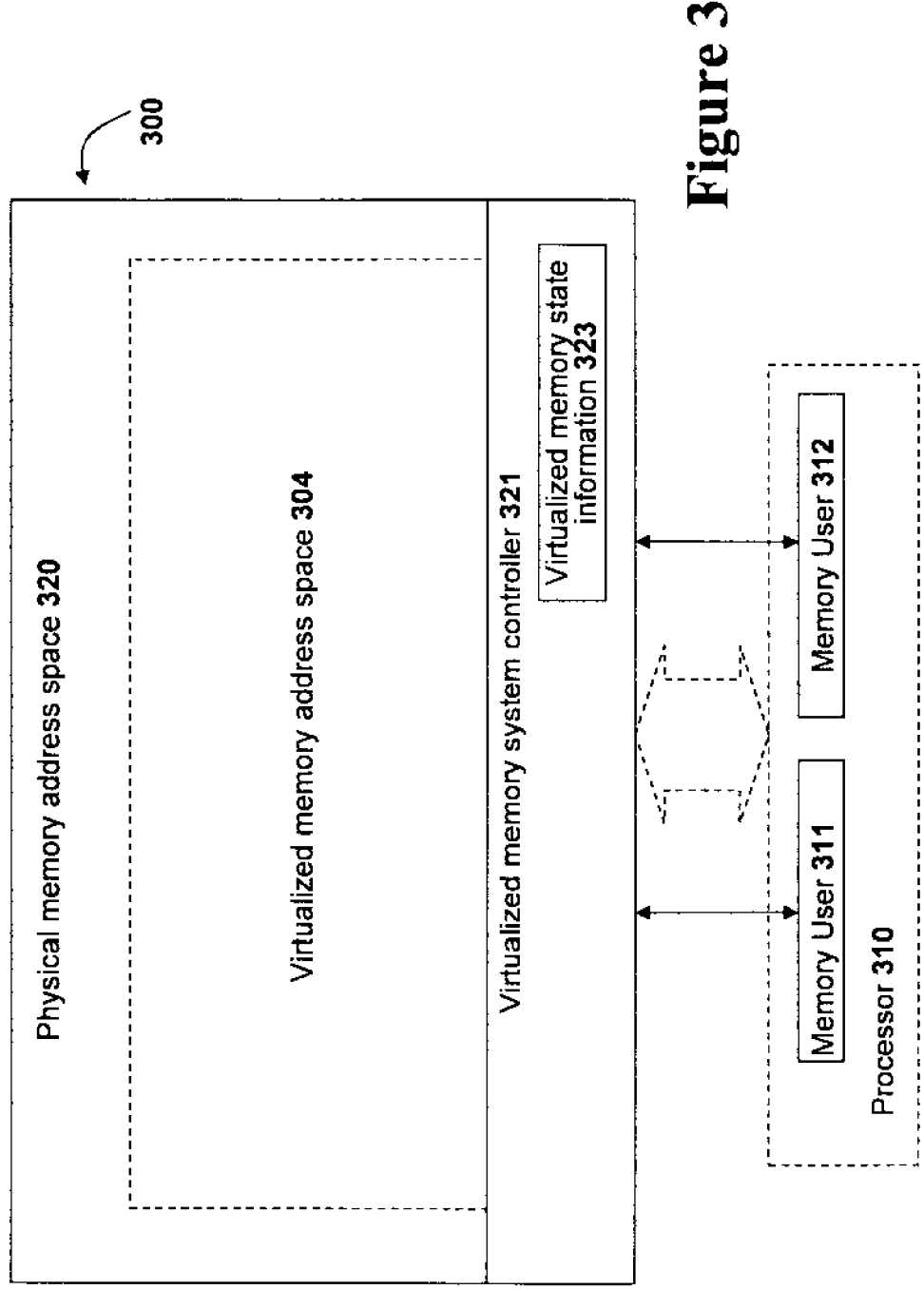

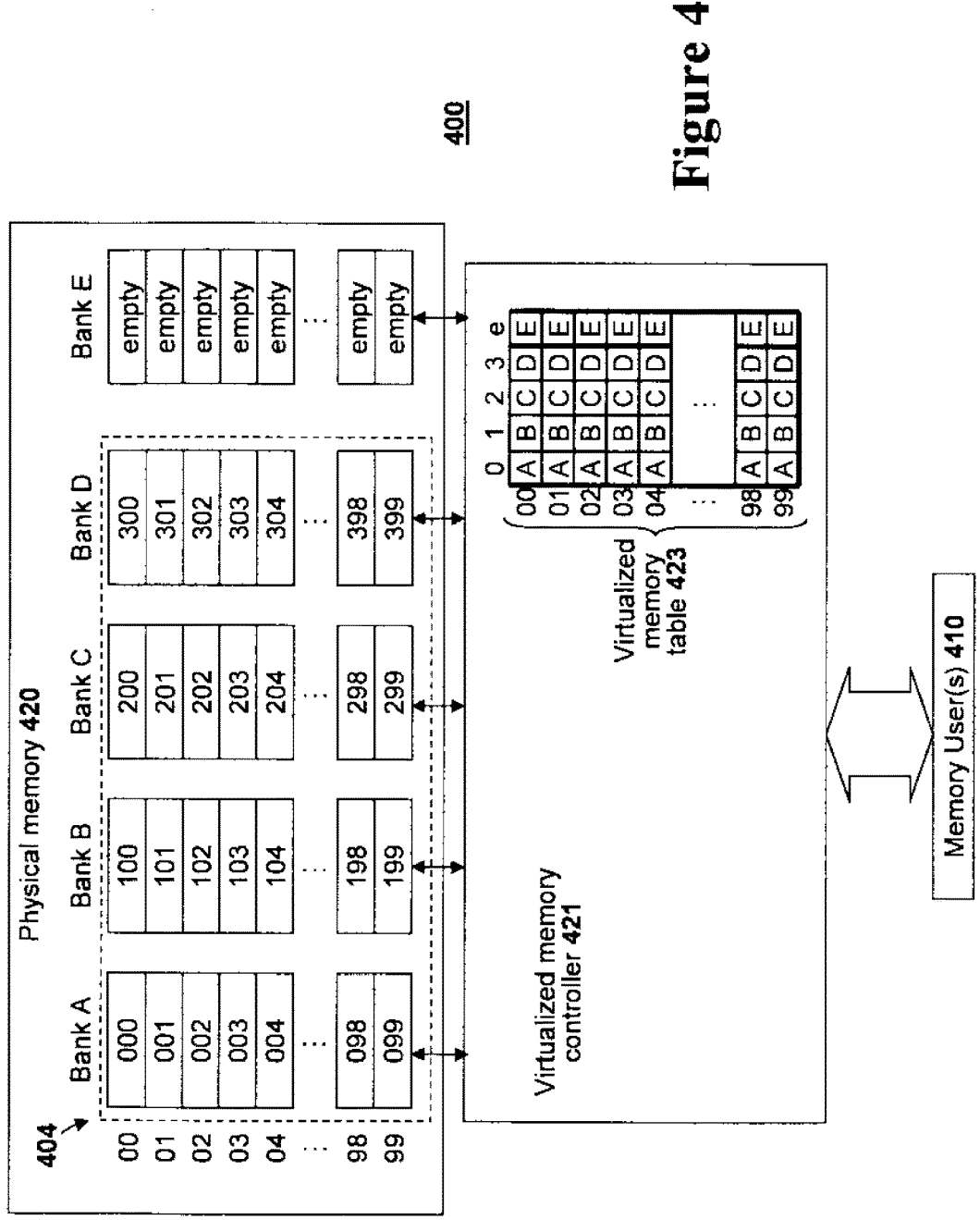

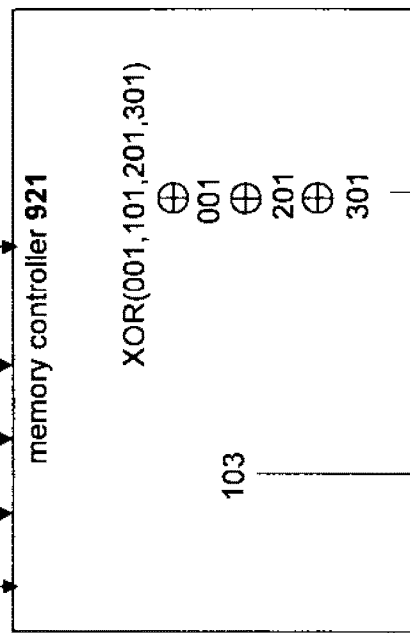

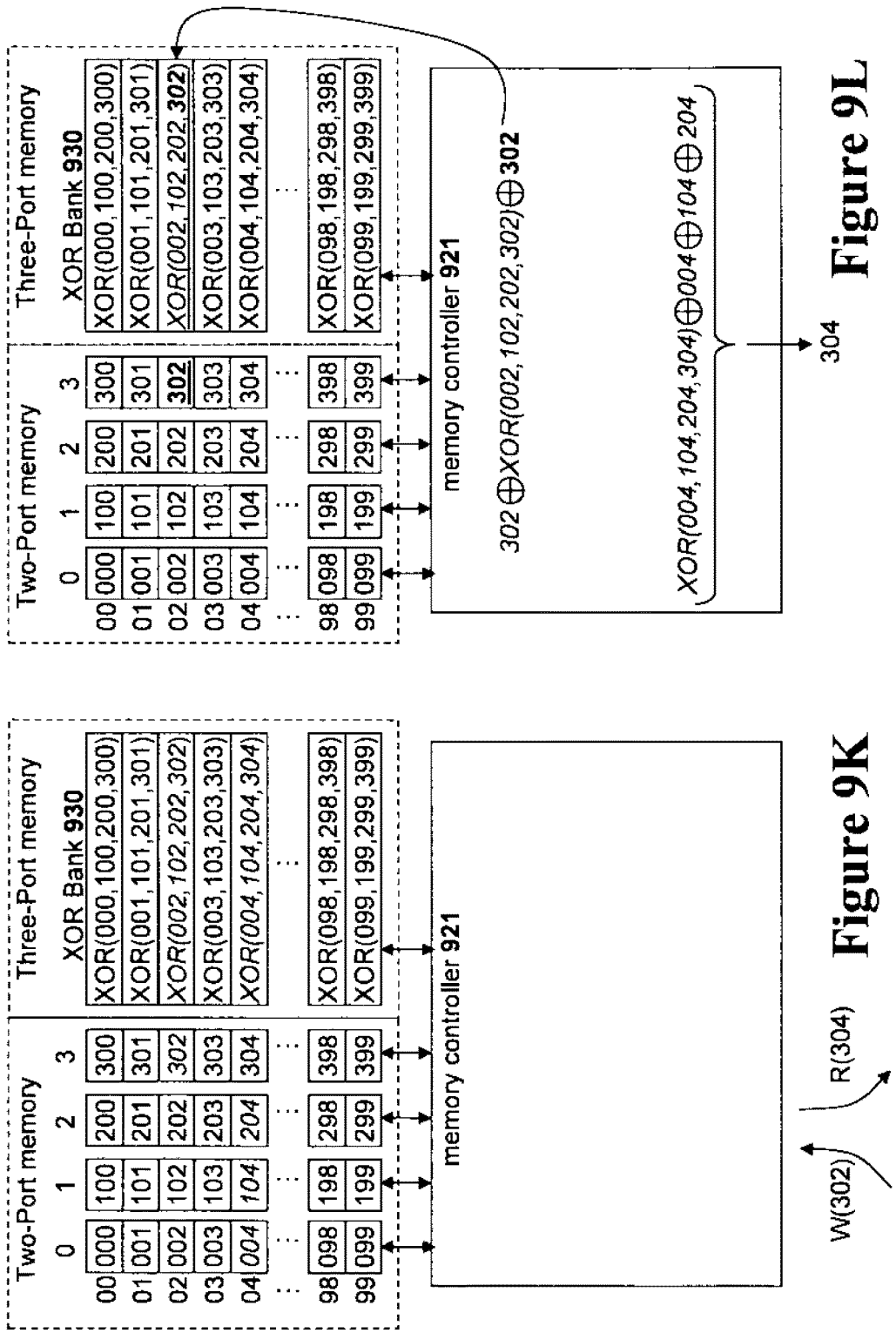

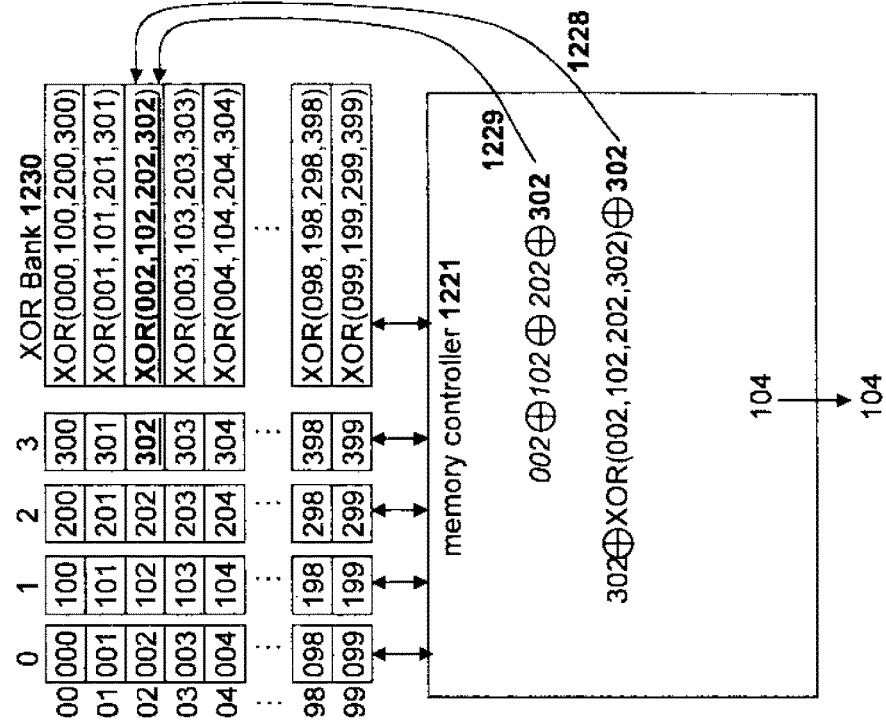
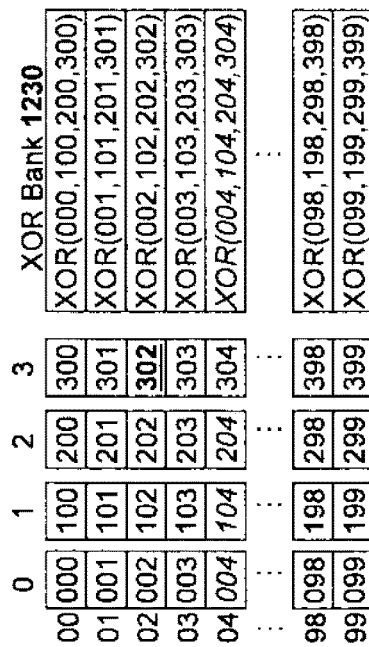
Figure 12C
Figure 12D

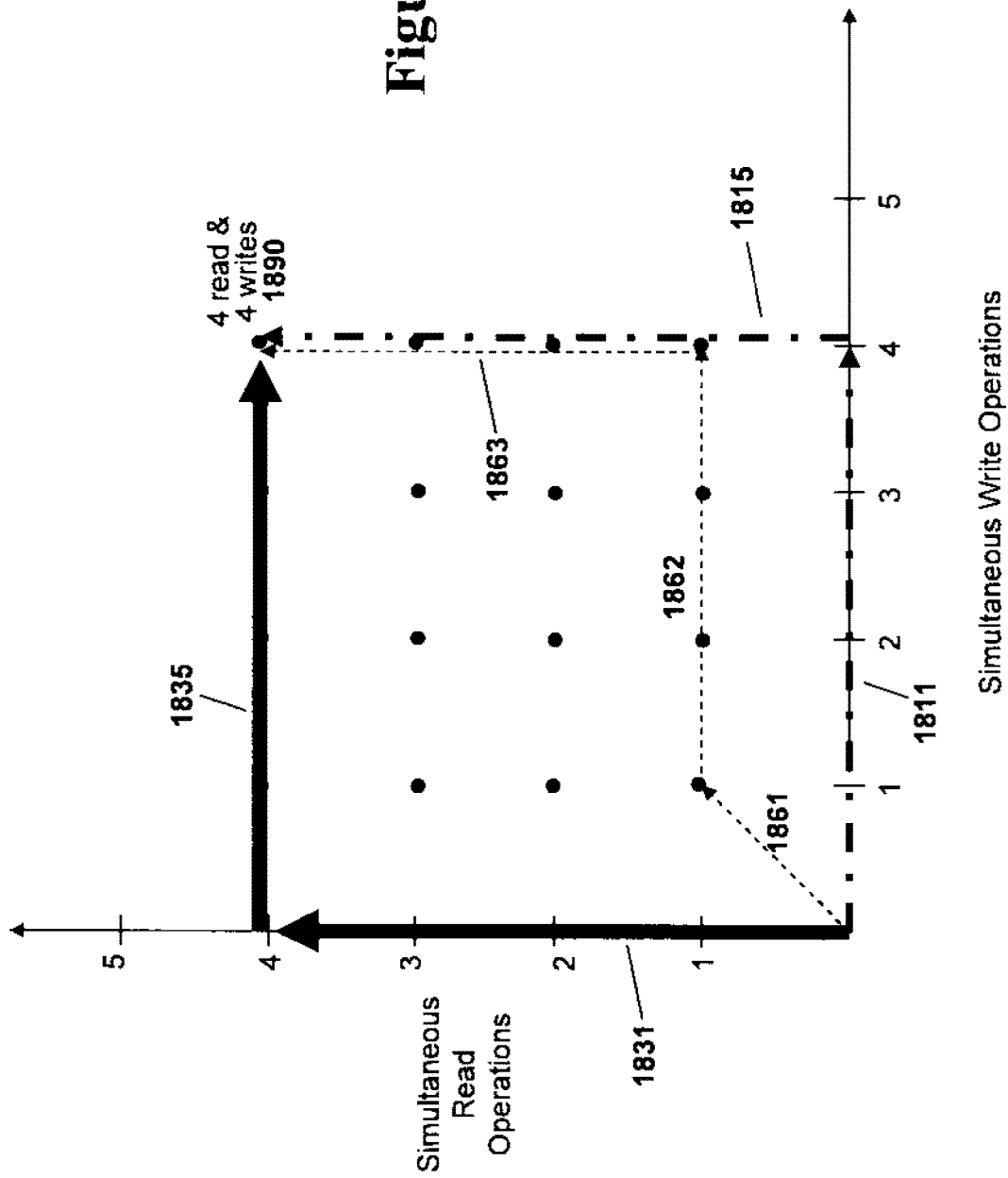

HIGH SPEED MEMORY SYSTEMS AND METHODS FOR DESIGNING HIERARCHICAL MEMORY SYSTEMS

RELATED APPLICATIONS

The present patent application is a continuation of U.S. patent application Ser. No. 12/806,631, filed Aug. 17, 2010, which claims the benefit of previous U.S. Provisional Patent Application entitled "SYSTEM AND METHOD FOR STORING DATA IN A VIRTUALIZED HIGH SPEED MEMORY SYSTEM" filed on Mar. 17, 2009 having Ser. No. 61/161,025 and previous U.S. Provisional Patent Application entitled "SYSTEM AND METHOD FOR REDUCED LATENCY CACHING" filed on Dec. 15, 2009 having Ser. No. 61/284,260. U.S. patent application Ser. No. 12/806,631 is in turn is a continuation in-part of previous U.S. Patent Application entitled "SYSTEM AND METHOD FOR STORING DATA IN A VIRTUALIZED HIGH SPEED MEMORY SYSTEM" filed on Sep. 8, 2009 having Ser. No. 12/584,645, now U.S. Pat. No. 8,433,880, which also claims the benefit of previous U.S. Provisional Patent Application entitled "SYSTEM AND MEMORY FOR STORING IN A VIRTUALIZED HIGH SPEED MEMORY SYSTEM" filed on Mar. 17, 2009 having Ser. No. 61/161,025.

TECHNICAL FIELD

The present invention relates to the field of memory systems for of digital computer systems. In particular, but not by way of limitation, the present invention discloses techniques for designing and constructing hierarchical digital memory systems.

BACKGROUND

Most modern computer systems include at least one processor for processing computer instructions and a main memory system that stores the instructions and data processed by the processor. The main memory system is generally implemented with some form of Dynamic Random Access Memory generally known as DRAM. DRAM devices have a very high memory density (amount of data stored per area of integrated circuit used), low power usage, and a relative inexpensive cost. Thus, DRAM devices are used to construct large main memory systems for computer systems.

The speed at which computer processors operate has been continually increasing. Specifically, decreasing the size of the semiconductor transistors and decreasing the operating voltages of these transistors has allowed processor clocks to run at faster rates. However, the performance of DRAM main memory systems that provide data to these faster processors have not kept pace with the increasingly faster processors. Thus, DRAM based main memory systems have become a bottleneck for computer performance. To mitigate this issue, larger Static Random Access Memory (SRAM) based cache memory systems are often used. SRAM devices operate at much faster rates than DRAM devices but have a lower memory density, consume more power, and are more expensive. Furthermore, cache memory systems only provide a speed improvement when a cache "hit" occurs (the needed data is available in the cache memory system). When a cache miss occurs, data must be fetched from the lower speed DRAM memory system. In some applications that require a guaranteed fast performance, the use of cache memory system will not suffice. Thus, it is desirable to improve the speed of memory systems such that memory systems can handle memory read and write operations as fast as possible.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 3 illustrates a high level conceptual diagram of a virtualized memory system 300.

FIG. 4 illustrates a block diagram of a first embodiment of an algorithmic memory block that can handle either simultaneous read and write operations or two simultaneous write operations.

FIG. 9A illustrates an algorithmic memory block using the teachings of FIG. 8 receiving a single write operation to address 302.

FIG. 9B illustrates the algorithmic memory block of FIG. 9A after handling the single write operation with a first method.

FIG. 9C illustrates an algorithmic memory block using the teachings of FIG. 8 receiving a read operation for address 103 and a read operation for address 101.

FIG. 9D illustrates the algorithmic memory block of FIG. 9C handling the two read operations.

FIG. 9K illustrates an algorithmic memory block using the teachings of FIG. 8 receiving a read operation for address 304 and a write operation for address 302.

FIG. 9L illustrates the algorithmic memory block of FIG. 9I after handling the read and write operations.

FIG. 12C illustrates an algorithmic memory block using the teachings of FIG. 7 receiving a read operation for address 302 and a write operation for same address 104 wherein both operations are associated with an update operation.

FIG. 12D illustrates the algorithmic memory block of FIG. 12C after handling the read and write operations.

FIG. 18 illustrates a conceptual diagram depicting different paths to achieve the same type of multiple read and multiple write memory systems.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the example embodiments are disclosed with reference to computer processing systems used for packet-switched networks, the teachings can be used in many other environments. Thus, any digital system that uses digital memory can benefit from the teachings of the present disclosure. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated.

Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
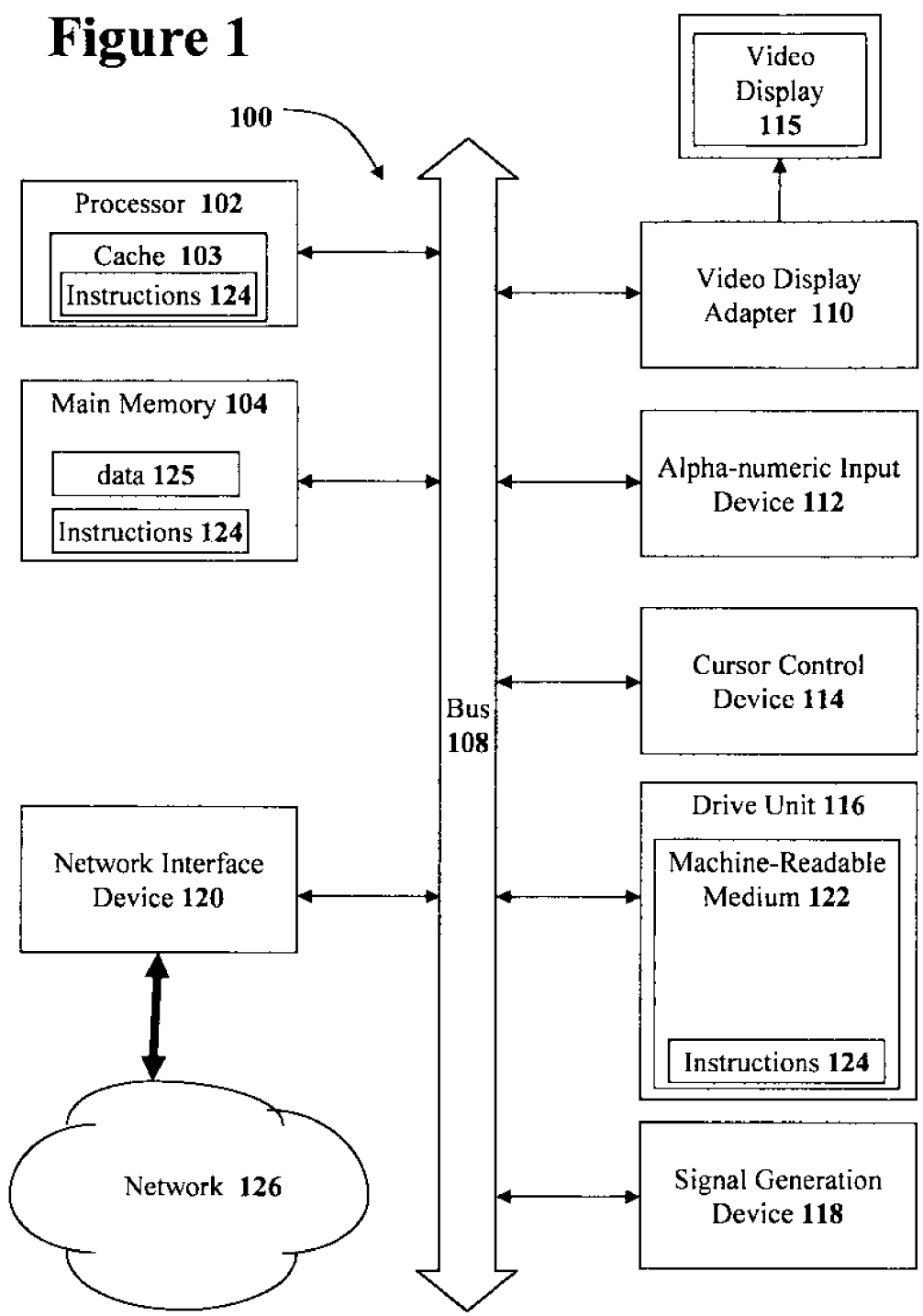
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both) and a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or a trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the cache memory 103 associated with the processor 102 also constitute machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Pipelining in Digital Circuit Design

Pipelining is a design technique used in modern digital electronics. To perform a complex operation (such as a table look-up, a multiplication, etc.), a digital computing system must generally perform a sequential series of smaller individual operations. These small individual operations may be performed internally and a final result is provided.

If a computer system uses an individual instruction to perform complex operations, then the processor executing the instruction may decode the instruction, perform the series of steps internally, and provide a processing result before executing the next instruction. With such a processor architecture, the processor requires a significant amount of time to perform all of the individual steps to complete the instruction. Thus, this architecture does not provide optimal results.

To improve processing speeds, virtually all modern processors (and other digital systems such as DSPs, ASICs, etc.) implement "pipeline" processing architectures. In a pipelined processor architecture, each individual step required to implement a complex computer instruction is broken down into an individual processing stage. The processing of a complex computer instruction is then handled by having the state data for the instruction proceed through the individual processing stages one by one. Then, to achieve performance gains, multiple complex instructions are handled at the same time with each pipelined stage handling data from a processing successive stage. This processing of multiple instructions simultaneously greatly improves the performance of the processor.

Figure 2A:
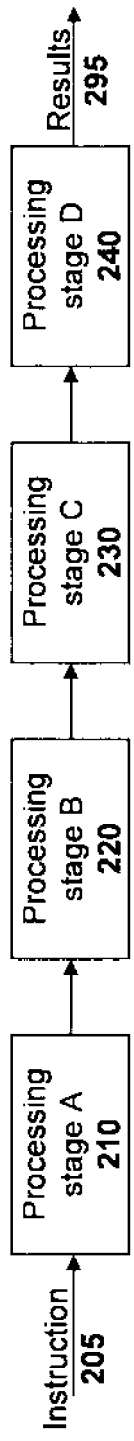
FIG. 2A illustrates a conceptual diagram of a pipelined processing system used in digital electronics.

FIG. 2A illustrates a conceptual diagram of a pipeline for processing a computer instruction. A computer instruction 205 enters the pipeline at a first processing stage, processing stage A 210 in FIG. 2A. The computer instruction will then pass through subsequent processing stages B 220, C 230, and D 240. The computer instruction may pass through these processing stages during sequential clock cycles of a clock signal within the processor core. At the end of the processing pipeline, some results 295 will be output. The results may be the output of an arithmetic operation, the output of a logical operation, the results of a comparison, or any other processing result.

Figure 2B:
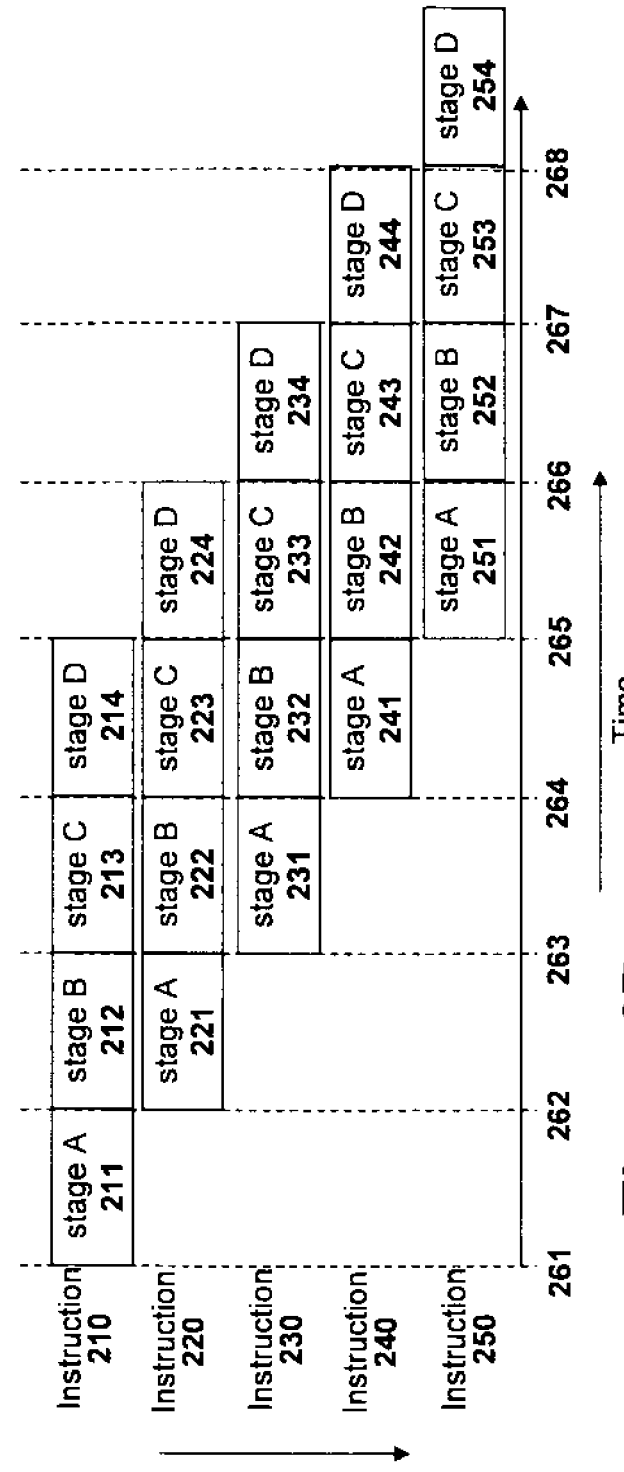
FIG. 2B illustrates a time flow diagram of instructions flowing through the pipelined processing system of FIG. 2A.

FIG. 2B conceptually illustrates how several instructions may be processed in parallel in the pipelined processing system of FIG. 2A. The diagram of FIG. 2B illustrates time moving to the right along a horizontal axis and new instructions entering the pipeline along a vertical axis.

Initially, at time 261, a first instruction 210 enters stage A as depicted by processing 211. Next, at time 262, the first instruction 210 is passed to processing stage B as illustrated by processing 212. Simultaneously at time 262, a second instruction 220 enters processing stage A as depicted by processing 221.

Next, at time 263, the first instruction 210 is passed to processing stage C as illustrated by processing 213. Similarly, the second instruction 220 is passed to processing stage B as illustrated by processing 222. And simultaneously, a third instruction 230 enters stage A of the processing pipeline as depicted by processing 231.

The pipeline system proceeds to process instructions sequentially in this manner. Thus, for every new time cycle, a new instruction enters the pipeline and an older instruction exits the pipeline. For example, at time 265, a new instruction 250 enters the pipeline as depicted with processing 251 but the first instruction 210 (at the top row) has completed all four processing stages and is no longer in the pipeline.

In this manner, the processing pipeline is able to complete an instruction in every clock cycle. There will be a latency between when processing is started on an instruction and when processing is finished for that instruction. However, the throughput of the processor has been greatly increased since an instruction is completed during every clock cycle.

One problem that may occur in a pipelined processing system is that one instruction may be dependent on the output of an earlier instruction. For example, an output data value for a first instruction may be an input data value for a later instruction. If that later instruction enters the pipeline before the first instruction has been complete, the processor cannot process that later instruction until it receives the result from the earlier instruction.

There are different manners of handling this problem. The ideal way to handle this problem is process the instruction normally but have the needed result data propagate back in the instruction processing pipeline as soon as the needed result data becomes available. For example, FIG. 2C conceptually illustrates this solution.

Figure 2C:
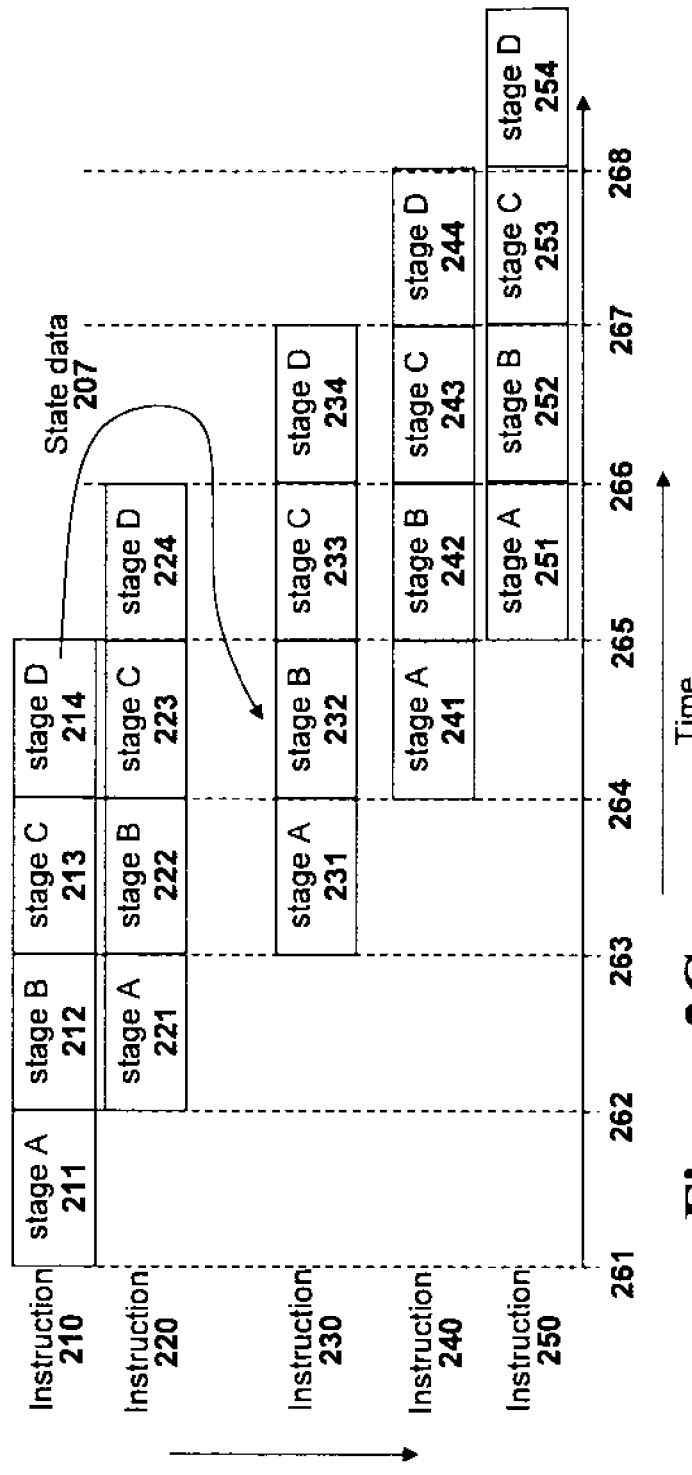
FIG. 2C illustrates a time flow diagram with result data being propagated back to an earlier pipeline stage.

Referring to FIG. 2C, a third instruction 230 enters the instruction processing pipeline at stage 263. This third instruction 230 is dependent on output data from the first instruction 210. To handle the situation in the most efficient manner, the system will continue processing normally and resolve the data issue internally. Specifically, instruction 230 may be processed in the first processing stage 231 at time 232. However, this processing stage may not need the input data yet. For example, stage 231 may simply decode the instruction. Then, at time 264, instruction 210 may be near completion and can pass the needed state data 207 back to the earlier pipeline stage 232 that needs the state data 207 as illustrated in FIG. 2C. With the needed state data now available, instruction 230 can continue processing at stage C 233 at time 265 using the state data was propagated forward up the pipeline.

Thus, as long as output data from earlier instructions can be propagated back up the pipeline to later instructions that need the data as inputs, then the processor pipeline can continue operating despite various data dependencies. In certain situations, the needed data cannot be propagated back fast enough to allow a particular instruction to proceed through the pipeline. When this occurs, a pipeline stall may occur wherein the later instructions cannot advance along the processing pipeline until the needed data becomes available. Thus, some "bubbles" may occur within the pipeline. Although these bubbles may reduce performance to some degree, the system will still be faster than a system that completely processes every instruction before fetching a subsequent instruction.

The memory systems that will be disclosed in this document often use a series of independent processing steps in order to locate data, fetch data, resolve conflicts, store data, and perform other operations. To implement these processing steps in an efficient manner, the memory systems will use pipelined design techniques as disclosed in this section. However, instead of processing individual computer instructions, the pipeline will process a sequential series of memory accesses (reads and writes).

In a memory system that uses pipelined logic, there can be at least two different circumstances wherein data dependency issues may occur: memory data dependencies and internal state dependencies. Both types of dependencies must be handled properly in order for the memory system to provide proper results.

Memory data dependencies occur when data from one unresolved memory operation is used within a later operation that follows shortly thereafter. For example, a read operation from one memory location may shortly be followed by a write operation to another memory location. If these two memory requests enter a memory request processing pipeline in close proximity, the data needed to perform the memory write will not be available until the data fetch for the memory read operation is performed. However, these two instructions may both enter the memory request processing pipeline and progress through the pipeline as long as the data fetched for the memory read operation is propagated back along the pipeline to the data write operation.

The other type of dependency issue involves internal state data. The logic of memory request processing pipeline may operate using several different pieces of internal state data. This internal state data may include pointers, Boolean values, counters, coded values, etc. For example, one system may keep track of a 'free' memory location that may be used to store a data value if a memory bank conflict occurs. This value will change upon each use since a new 'free' memory location must be made available. If there is a long memory request processing pipeline, then later memory instructions will enter the memory request processing pipeline without this needed information being available. However, as long as the needed value is determined and propagated up the memory request processing pipeline before the value is needed, there will be no stall of the memory request processing pipeline.

This document will disclose multi-step procedures that must be performed in order to handle memory operations. In should be assumed that these multi-step procedures will be implemented with pipelined logic as set forth in this section. Furthermore, if a particular data value needed to perform a particular step is not available when the memory request enters the memory request processing pipeline then that needed data will be propagated back from a later processing stage.

In a pipelined computer processor, the instruction stream will include conditional branch instructions that will specify if the processor should follow one instruction path or another. Such branch instructions greatly increase the difficultly of implementing a pipelined system since it is not clear which instructions after a branch instructions should be fetched. To handle this situation, most processors implement a branch prediction system that makes an educated guess as to the most probably direction that will be taken. However, if the branch prediction unit predicts incorrectly, the instruction processing pipeline must be flushed and reloaded with the proper instructions. Although this is a concern when designing computer processors, this pipelining issue is generally not an issue in a memory system.

Memory Design Overview and Methodology

This document discloses various different memory system designs and methods of combining those memory system designs to create sophisticated memory systems with specific design characteristics. Specifically, a memory system with a desired set of memory requirements may be created by combining together various different types of memory blocks in a hierarchical arrangement that will fulfil the desired memory requirements. The memory requirements may include factors such as the number of simultaneous reads, the number of simultaneous writes, the memory system size, the data width, the clock speed, the maximum acceptable latency, the minimum throughput, etc.

The sophisticated hierarchical memory system designs are constructed from two different types of memory building blocks: algorithmic memory building blocks and fundamental memory building blocks. The algorithmic memory building blocks are memory systems implement algorithms with digital processing logic in order to improve the performance of the memory system. The fundamental memory blocks consist of various different memory circuit designs such as DRAMs, SRAMs, etc.

Each of the algorithmic memory building blocks includes internal memory that be constructed from other algorithmic memory building blocks or with fundamental memory building blocks. By using algorithmic memory building blocks to provide memory services to higher level algorithmic memory building blocks various hierarchical memory systems may be created. However, each hierarchical memory arrangement ultimately terminates with fundamental memory blocks at the end ("leaf") nodes of the hierarchy.

Almost any type of fundamental memory circuit design may be used to construct the hierarchical memory systems of the present disclosure. Each fundamental memory circuit design provides different advantages and disadvantages.

Traditional Dynamic Random Access Memory (DRAM) may be used to construct hierarchical memory systems using the teachings of the present invention. However, since traditional DRAM tends to be constructed using semiconductor process technologies that differ from the semiconductor process technologies used for most digital circuits such as the logic circuitry is this disclosure, traditional DRAM may not be the best choice of memory technology.

Embedded DRAM (eDRAM) is a volatile memory circuit design that is now very often used since it may be constructed with the industry standard CMOS processes used to fabricate most digital circuit designs. Embedded DRAM (eDRAM) is generally for the main memory within ASIC designs due to its high memory density.

Static Random Access Memory (SRAM) is often used when DRAM or eDRAM memory technology does not provide adequate memory performance. However, SRAM generally requires more die area, consumes more power, and generates more heat. Many different types of SRAM may be used such as the higher density 3T-SRAM and 1T-SRAM.

In certain situations, individual flip-flops may be used to implement small amounts of memory that must operate at very high speeds. However, such memory should be used sparingly due to the low memory density of using individual flip-flops.

Thyristor RAM (T-RAM) may be used as a fundamental memory design in the present disclosure. T-RAM is a type of DRAM computer memory that exploits the electrical property known as negative differential resistance. T-RAM memory devices combine strengths of the DRAM (memory density) and SRAM (high speed).

Zero capacitor RAM (Z-RAM) may be used as a fundamental memory design in the present disclosure. Z-RAM is a type of digital memory that uses the floating body effect of silicon on insulator (SOI) process technology. Z-RAM memory makers claim that Z-RAM technology provide memory access speeds similar to traditional SRAM cells but provides higher memory density due to the use of only a single transistor.

The hierarchical memory systems will be disclosed primarily with reference to volatile memory designs, however hierarchical memory systems may also be constructed with non-volatile memory. For example, flash memory cells may be used in certain applications wherein non-volatile storage is needed. Flash memory tends not to operate as fast as other types of memory but has the advantage of not losing the memory state when power is removed from the system. Magnetoresistive Random Access Memory (MRAM) is another type of non volatile memory technology that may be used.

The various different memory types may be implemented with various different features. For example, memory cells may be implemented with a single port, two ports, or dual ports. A single port memory can handle only one read operation or one write operation. A two port memory has an independent read port and an independent write port. Thus, a two port memory can handle one read operation and one write operation simultaneously. A dual port memory has two completely independent memory ports. Thus, a dual port memory can handle two read operations simultaneously, two write operations simultaneously, or one read operation and one write operation simultaneously. Memory cells may have additional memory ports.

The above fundamental memory building blocks (and others not disclosed) may be used to implement various different algorithmic memory blocks. And these first-level algorithmic memory blocks constructed from fundamental memory devices may be used within other higher-level algorithmic memory blocks to create complex hierarchical memory systems. Note that the algorithmic memory blocks combined in various arrangements may create various different dependencies that need to be taken into account by the hierarchical circuit designs.

Algorithmic Memory Block Basics

To construct high performance memory systems, the algorithmic memory blocks of present disclosure often implement "virtualized memory systems". These virtualized memory systems generally provide memory performance increases without imposing any specific programming restraints upon the user of the virtualized memory system. Greater details about virtualized memory systems can be found in U.S. patent application entitled "SYSTEM AND METHOD FOR STORING DATA IN A VIRTUALIZED HIGH SPEED MEMORY SYSTEM" filed on Sep. 8, 2009 having Ser. No. 12/584,645.

A virtualized memory system operates in a manner analogous to traditional virtual memory but with a different goal. In traditional virtual memory system, a large virtual memory space is mapped onto a small physical memory (with the aid of a long term storage system) to provide a programmer with a larger memory space to work with. To the contrary, in a virtualized memory system a smaller virtualized memory space is mapped onto a larger physical memory space to provide the programmer with improved memory performance. The computer programmers work in the virtualized memory address space without having to worry about the specific details of how the virtualized memory system internally handles the data in a real physical memory address space.

A memory controller in a virtualized memory system is used to perform various logical operations that implement the techniques which improve memory performance. The memory controller may translate the memory requests made in a virtualized address space into a real physical address space using one of several different techniques. In one technique, an extra memory bank and a set of address space mapping tables is used to ensure there will be no memory bank conflicts that will reduce memory performance. Using the larger physical memory address space (the extra memory bank), the virtualized memory system hides the effects of any potential memory bank conflicts from the user of the memory system. In other embodiments, the virtualized memory system uses extra memory to encode a redundant copy of each data item such that there are always at least two different methods of fetching requested data.

FIG. 3 illustrates a high level conceptual diagram of a virtualized memory system 3300. In the particular virtualized memory system disclosed in FIG. 3, memory user 311 and memory user 312 access the same virtualized memory system 300. The concurrent memory requests to the virtualized memory system 300 may be from a single entity operating at twice the speed of two individual entities. Thus, processor 310 operating at twice the clock speed of memory user 311 and memory user 312 could issue two consecutive memory requests that would appear as two memory requests received concurrently by virtualized memory system 300.

All of the memory access requests to the virtualized memory system 300 are handled by a virtualized memory system controller 321. The virtualized memory system controller 321 receives memory access requests (reads, writes, or other memory commands) containing virtualized memory addresses and performs request memory operation. In some embodiments, the virtualized memory system controller 321 translates virtualized memory addresses (in the virtualized memory address space 304) into real physical memory addresses in a larger physical memory address space 320. The memory system controller 321 then accesses the requested information using the physical addresses in the physical memory address space. As set forth in an earlier section of this document, the virtualized memory system controller 321 may be implemented with pipelined digital logic such that the virtualized memory system controller 321 may be handling several sequentially received memory requests through several processing stages concurrently.

The virtualized memory system controller 321 performs the needed logical operations (such virtualized to physical address translations) with the aid of virtualized memory state information 323 in the virtualized memory system controller 321. The virtualized memory state information 323 is a set of state information needed to implement the particular memory performance technique implemented by the virtualized memory system controller 321. For example, in a virtualized memory system controller 321 that translates from virtualized addresses to physical address, the virtualized memory state information 323 may include virtual to physical address translation tables. Other techniques will maintain other state information.

The end result of the logical operations performed by the virtualized memory system controller 321 using the virtualized memory state information 323 is some type of memory operation (a read, a write, or another memory operation) on the physical memory address space 320. However, that "physical address space" 320 may be a real physical memory address space implemented with fundamental memory blocks or it may actually be another algorithmic memory building block. If the "physical address space" is implemented with another algorithmic memory block, that algorithmic memory building block will implement its own memory performance enhancing techniques. It is this ability to design and build hierarchies of algorithmic memory building blocks (which all ultimately terminate with a fundamental memory block) that allows the system of the present disclosure to construct a wide variety of complex high-performance memory systems.

Thus, a key aspect of the present disclosure is the set of different algorithmic memory building blocks used to create complex memory systems. Each different algorithmic memory building block provides different features. The following sections will describe a set of several different algorithmic memory building blocks that may be used to created hierarchical memory systems. However, the disclosed set of algorithmic memory building blocks is not exhaustive.

Algorithmic Memory System 1: Extra Memory To Obtain 2X Performance (1R & 1W) or (1R or 2W)

The first algorithmic memory block is a memory block that uses extra memory to allow either simultaneous read and write operations; or two simultaneous write operations. This algorithmic memory block operates by using extra memory to prevent memory conflicts between the two simultaneous memory operations. The extra memory may be implemented in various different methods. For example, the extra memory may comprise a cache that handles incoming memory requests that may cause conflicts. However, this section will primarily focus on an implementation which uses an extra memory that is the same as the other memory banks in the memory system.

FIG. 4 illustrates a block diagram of a first embodiment of a algorithmic memory block 400 that can handle either simultaneous read and write operations (1R1W); or two simultaneous write operations (2W). The example depicted in FIG. 4 and in the following description will provide specific numbers of memory banks, memory addresses, etc. However, it will be obvious to one skilled in the art that these are just numbers for this one example implementation. Various different memory system sizes may be constructed using very different numbers of memory banks, memory addresses, etc.

As previously depicted in the conceptual diagram of FIG. 3, the algorithmic memory block 400 mainly consists of a memory system controller 421 and physical memory array 420. As set forth earlier, the "physical memory array" 420 may not actually be physical memory array. Instead, physical memory array 420 may be implemented with another algorithmic memory block. However, for purposes of this document, it will be referred to as a physical memory array since that allows the familiar concept of virtual to physical memory translation to be used in the explanation of the algorithmic memory block 400.

Referring to the algorithmic memory block 400 of FIG. 4, the physical memory array 420 is organized into five independent memory banks (Bank A to E) having 100 rows each. For ease of explanation, this document will refer to memory bank sizes and memory addresses with base 10 (decimal) numbers but most actual implementations would use an even multiple of 2 for a base 2 (binary) address system. In the algorithmic memory block 400 embodiment of FIG. 4 that has five memory banks with 100 rows in each memory bank, there are 500 unique physical memory addresses in the physical memory 420.

The algorithmic memory block 400 presents a virtualized memory address space to users Of the algorithmic memory block 400 that is smaller than the actual physical address space. Thus, in the embodiment of FIG. 4, an initial virtual memory address space 404 (surrounded by a rectangle made of dotted lines) comprising virtualized memory addresses 000 to 399 is represented within physical memory banks A to D. Physical memory bank E does not initially represent any of the virtualized memory locations such that memory bank E's memory locations are marked 'empty'. As depicted in FIG. 4, this document will specify a virtualized memory address that is currently being represented by a physical memory location as a three-digit virtualized memory address within the box of the physical memory location. For example, the physical memory location at row 00 of Bank B initially represents virtualized memory address 100 such that '100' is depicted within the box at row 00 of memory bank B. As will be set forth later in this document, the actual locations of the various virtualized memory addresses will move around in the physical memory space 420. Thus, the virtual memory address space 404 organization depicted in FIG. 4 only represents one possible state of many.

In the algorithmic memory block 400 of FIG. 4, the virtualized memory system controller 421 is responsible for handling all virtualized memory access requests from the memory user(s) 410. The memory system controller 421 translates virtualized memory addresses (the 000 to 399 addresses in FIG. 4) into actual physical memory-addresses (identified in FIG. 4 by the memory bank letter and the row within that memory bank) within the physical memory 420. To accomplish this virtualized to physical address translation task, the memory system controller 421 uses a virtualized memory mapping table 423.

In the specific virtualized memory system embodiment illustrated in FIG. 4, the virtualized memory addresses are split into a most significant digit (the first digit of a three digit virtualized address) and two least significant digits (the second two digits of a three digit virtualized address). The virtualized memory system of FIG. 4 uses the least significant digits of virtualized memory address (the second two digits of the virtualized memory address) as the physical row designation in the physical memory system. Thus, there is no translation needed for the two least significant digits of the virtualized memory address since they are the same as the two least significant digits of the physical memory address. Note that other embodiments may use other bits or even any other type of suitable virtual-to-physical address translation system.

The most significant digit of a virtualized memory address must still be translated into a physical memory address. In the system of FIG. 4, the most significant digit of a virtualized memory address is translated into a physical memory bank. To perform the translation, the virtualized memory mapping table 423 includes a number of rows equal to the number of rows in the memory banks and a number of columns equal to the number of most significant address digit possibilities (0, 1, 2, and 3 in this example of a virtualized address space from 000 to 399). To translate from the virtualized memory address to the physical memory location, the virtualized memory system controller 421 examines the entry of the virtualized memory mapping table 423 having the same row of the virtualized memory address' two least significant digits and the same column as the virtualized memory address' most significant digit. For example, to translate virtualized address 304 to a physical memory location, the virtualized memory system controller 421 consults the entry of column '3' and row '04' to obtain 'D' as the memory bank that currently represents virtualized address 304. Specifically, virtualized address 304 is currently represented in row 04 of memory bank D.

In addition to the 0 to 3 columns, the virtualized memory mapping table 423 embodiment of FIG. 4 also includes a column labelled "e". This column is used to identify a memory bank containing an empty memory location for that particular designated row. For example, row '02' of column 'e' in the virtualized memory mapping table 423 lists memory bank 'E' as a memory bank with an empty location for row 02. However, this column need not be implemented since the memory bank with an empty memory location in that particular row can be inferred by determining the memory bank designation (A, B, C, D, or E) not represented in the 0 to 3 columns of that same row.

The algorithmic memory block 400 of FIG. 4 is configured to handle either a read request with a simultaneous write request or two simultaneous write requests. The algorithmic memory block 400 accomplishes these simultaneous actions without ever forcing the memory user(s) 410 to stall due to a memory bank conflict. Thus, even if the simultaneous memory request are directed to the same memory bank (which would cause a memory bank conflict in most memory systems), the algorithmic memory block 400 will handle the two memory requests without stalling the memory user(s) 410. Thus, the virtualized memory system 400 provides a guaranteed memory bandwidth such that all applications which require a guaranteed memory access time can use the virtualized memory system 400.

It should be noted that one situation that cannot be dealt with easily is when both a read and a write are received at the same time for the exact same virtualized address. Normally, a memory user should never issue such a pair of simultaneous requests since there is really no reason to read an address when that same address is being written to by the same entity. However, if such a case occurs, the reader may be given the original data or the newly written data depending on the particular implementation.

The virtualized memory system controller 421 prevents memory bank conflicts wherein two memory operations are simultaneously directed toward the same memory bank by moving the virtualized memory address for a write operation to an unused memory location in a different memory bank. The unused memory location is located by reading the virtualized memory table 423. After writing the data into that formerly unused memory location the memory controller 421 then updates the virtualized memory table 423 with the virtualized address from the write operation to reflect the new location of data associated with that virtualized memory address.

Figure 5:
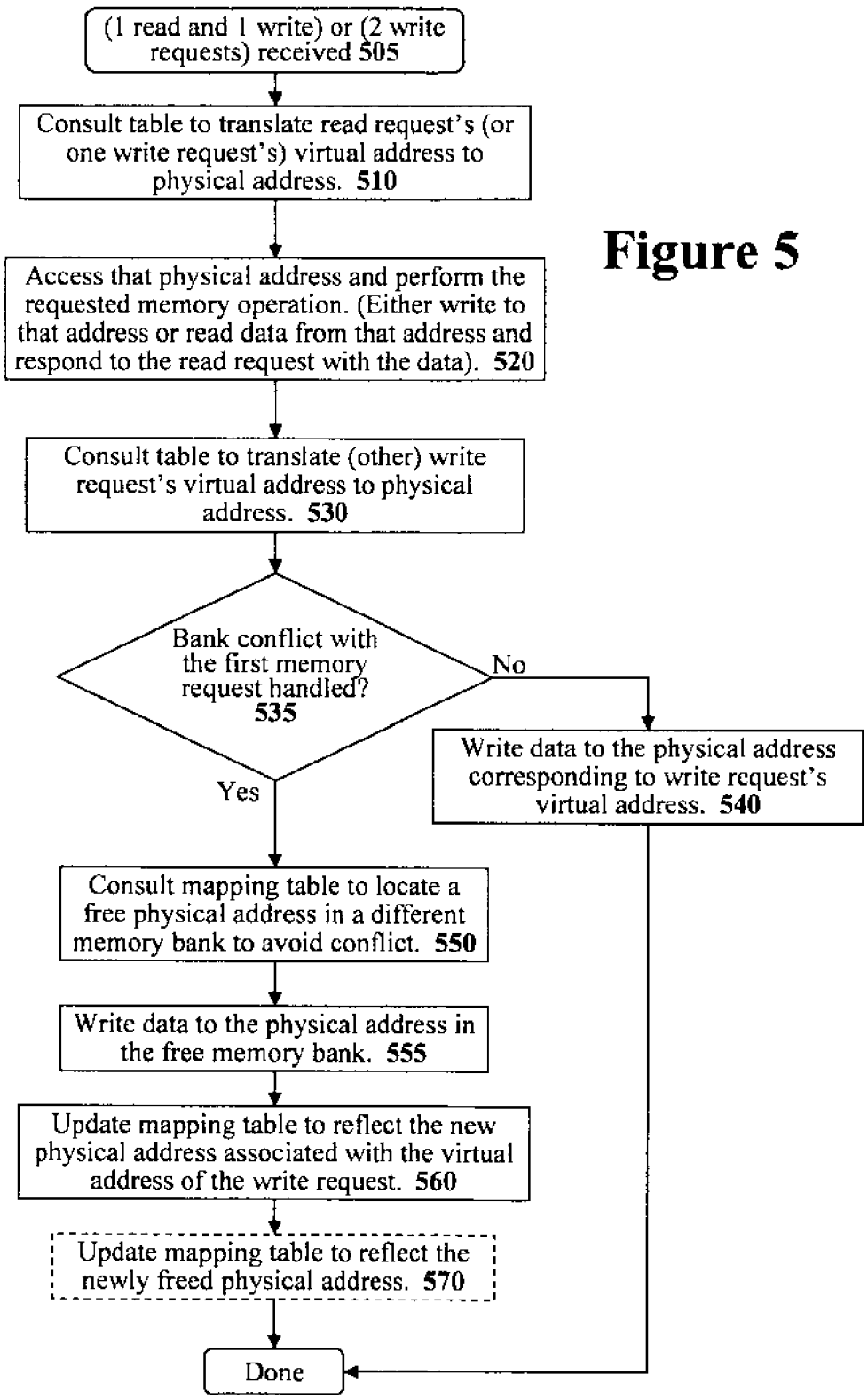
FIG. 5 illustrates a flow diagram describing the operation of the algorithmic memory block disclosed in FIG. 4.
Figure 6B:
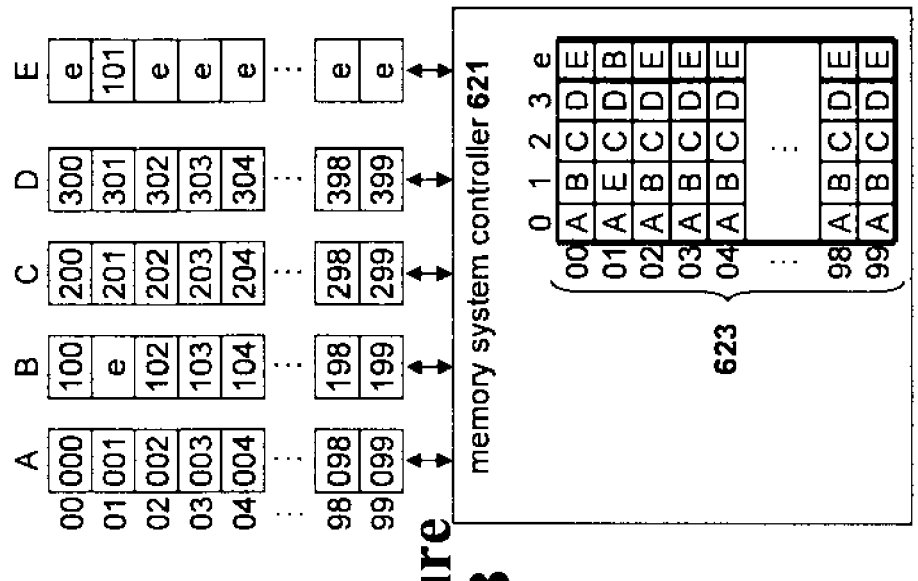
FIG. 6B illustrates the algorithmic memory block of FIG. 6A after processing the write to virtualized address 101 and the write to virtualized address 103.
Figure 6A:
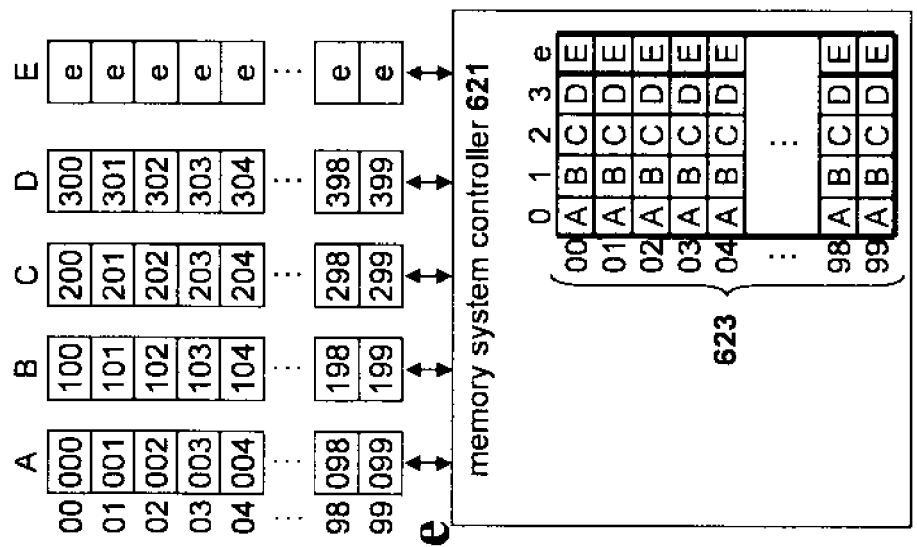
FIG. 6A illustrates an algorithmic memory block as disclosed in FIG. 4 receiving write to virtualized address 101 and write to virtualized address 103.

The technique is best described with the use of examples. An example operation of the virtualized memory system 400 embodiment of FIG. 4 is set forth with reference to FIGS. 5, 6A, and 6B. FIG. 6A illustrates the same virtualized memory system 400 of FIG. 4 in the same initial condition. If the virtualized memory system controller simultaneously receives a memory write to virtualized address 101, written as W(101) in FIG. 6A, and memory write to virtualized address 103, written as W(103), this memory access pattern would normally cause a memory bank conflict since both virtualized address 101 and 103 are in the same memory bank (memory bank B).

To prevent the memory bank conflict, the virtualized memory system controller 621 allows one of the write operations (the write to virtualized address 103 in this example) to proceed as normal in physical memory bank B but handles the other write to virtualized address 101 using a different memory bank. The data currently residing in the current physical memory location associated with virtualized address 101 is no longer relevant since a new data value is being written to virtualized address 101.

If instead of a write to address 103 it was a read from address 103, the system would perform in the same manner. Specifically, the read would be performed from address 103 and the write to address 101 would be placed in a different memory bank to prevent a memory bank conflict. Note that in this particular type of algorithmic memory block, the read operation must always use the current physical location associated with the requested virtualized address since that is the only location where the data can be found.

The full chain of events will be set forth with reference to the flow diagram disclosed in FIG. 5. Note that the flow diagram of FIG. 5 is being used to disclose the method of operation of the system in a simplified manner for explanation purposes. In a physical implementation, several of the stages disclosed in FIG. 5 (such as the table look-ups in stages 510 and 530) may be performed in parallel.

Initially, at stage 505, the virtualized memory system controller 521receives either one read and one write request or two write requests. (In the example of FIG. 6A it is write requests to address 103 and to address 101). Next, at stage 510, the virtualized memory system controller 621 consults the virtualized memory table 623 to determine the current physical location the read address or one of the write addresses. (In the example of FIG. 6A the write request to address 103 is chosen.) The most significant digit of the address is used to select a column and the two least significant digits are used to select a row in virtualized memory table 623 which specifies that virtualized address 103 is currently located in memory bank B. Thus, the virtualized memory system controller 621 access that physical memory location and performs the requested memory operation (read or write) at stage 520.

At stage 530, the virtualized memory system controller 621 consults the virtualized memory table 623 to determine the physical location of the virtualized address (101 in this example) associated with (other) write request. Consulting virtualized memory table 623, it can be seen that virtualized address 101 is in memory bank B. Next, at stage 535, the system determines if this location causes a memory bank conflict with the read operation. If the write had been to a memory location in a different memory bank (such as address 200 in bank D) then the write operation could simply be performed using that location at stage 540 thus completing both memory operations. This operation could be performed in parallel with the previous memory operation. However, in this example, the write is to virtualized address 101 that is in memory bank B thus causing a memory bank conflict with the memory operation that used virtualized address 103 which is also located in memory bank B.

To prevent the memory bank conflict between addresses 101 and 103, the system proceeds to stage 550 where the virtualized memory system controller 621 consults the "e" column of the 01 row in the virtualized memory table 623 to determine the physical location of an available memory bank to write the data for virtualized address 101. Row 01 of column "e" in virtualized memory table 623 specifies memory bank E as being available memory bank for accepting data into the 01 row. Thus, the virtualized memory system controller 621 writes the data from the write request targeted at virtualized address 101 into row 01 of memory bank E. (The actual data value is not shown in FIG. 6A or 6B since the actual data value does not matter for this discussion.)

Since the physical location of virtualized memory address 101 has moved, the virtualized memory table 623 must be updated to reflect the new physical location of virtualized address 101. Thus at stage 560, the virtualized memory system controller 621 writes "E" into row 01 of the 1 column in the virtualized memory table 623. This signifies that virtualized address 101 is now located in memory bank E.

If the particular memory system implementation uses a 'free bank' column then the new free memory bank associated with the 01 row must also be updated in that free bank column. Therefore, at stage 570, the virtualized memory system controller 621 writes "B" into the "e" column of row 01 in the virtualized memory table 623. Note that in implementations where the free memory bank is inferred by the memory bank not listed in that particular row, this stage does not need to be performed. At this point, both the memory operation (read or write) using address 103 and the write operation to address 101 have been performed without stalling due to a memory bank conflict.

Figure 6D:
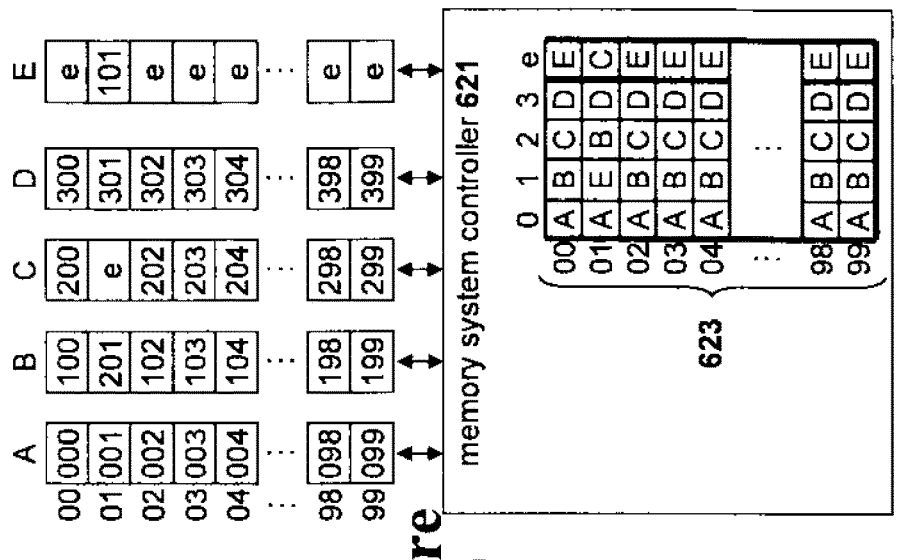
FIG. 6D illustrates the algorithmic memory block of FIG. 6C after processing the write to virtualized address 201 and read of virtualized address 204.
Figure 6C:
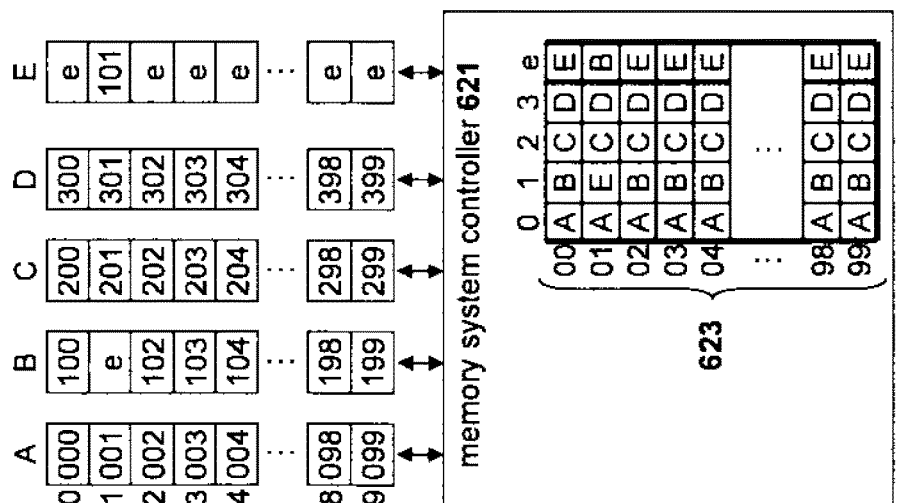
FIG. 6C illustrates the algorithmic memory block of FIG. 6B receiving write to virtualized address 201 and read of virtualized address 204.

A second example of a simultaneous read operation and write operation is provided with reference to FIGS. 6C and 6D. FIG. 6C uses the state of FIG. 613 as a starting point and then simultaneously receives a write to virtualized address 201 and a read from virtualized address 204. To perform the read of virtualized address 204, the memory controller 621 first determines the location of virtualized address 204 in the physical memory. Thus, the memory controller first reads out the entry at column 2 of row 04 in virtualized address table 623 which specifies that virtualized address 204 is currently located in memory bank C. Thus, the memory controller 621 reads the data for virtualized address 204 out of the 04 row of memory bank C to handle the read request.

To handle the write to virtualized address 201 which was previously in the 01 row of column C thus causing a memory bank conflict with the read from row 04 of memory bank C, the memory controller 621 reads the entry from the "e" column in row 01 of virtualized address table Q23 to determine that the free memory bank for row 01 is memory bank B. Thus, the data associated with the write to location 201 is placed in row 01 of physical memory bank B as depicted in FIG. 6D. The memory controller 621 then updates table 623 to reflect the new location of virtual address 201 (by writing "B" in entry at row 01 of column 2) and the location of the new free memory location for row 01 (by writing a "C" in the entry at "e" column of row 01. The final state after the read from address 204 and the write to address 201 is illustrated in FIG. 6D.

As can be seen from the above two examples, the virtualized memory system will always have at least two locations where it can perform a write for any virtualized address: the current location of that virtualized address or the memory bank for that row designated as empty. If an incoming write does not cause a memory bank conflict with another simultaneous memory operation (read or write), then the virtualized memory controller 621 may store the data in its current location. However, if there is a memory bank conflict caused by a write and one other memory operation to the same memory bank, then the virtualized memory controller 621 will write the data to a memory bank having an empty location for that row and update the new location of that virtualized memory address in the virtualized memory table 623. In the implementation depicted, the lowest two digits of the virtualized address space location will always designate the row in the physical memory space.

However, in a real digital implementation, a subset of bits from the virtualized memory address may be used (such as a set of least significant bits of the virtualized memory address).

The memory systems disclosed with reference to FIGS. 6A to 6 operates using extra memory banks added to a memory system. However, similar results may be achieved by adding extra memory to the memory system in different forms. For example, instead of using an extra memory bank, a cache memory system may be added to the memory controller 621 portion of the memory system. The Provisional Patent Application entitled "SYSTEM AND METHOD FOR REDUCED LATENCY CACHING" filed on Dec. 15, 2009 having Ser. No. 61/284,260 discloses a method of using a cache memory to achieve a similar result and is hereby incorporated by reference.

Algorithmic Memory System 2: Additional Memory to Obtain Even Greater Write Performance (1R and nWs) or (nWs)

The preceding section disclosed an algorithmic memory block that allowed for two simultaneous write operations or, alternatively, one read operation and one write operation simultaneously. That algorithmic memory block achieved that result by adding extra memory that is used when a write operation conflicted with another memory operation (either a read or a write). A memory mapping table was then used to keep track of the new location of the data. This technique can be expanded to handle many additional concurrent write operations by adding additional memory to handle each additional write operation. Again, although this technique will be described with reference to an implementation that uses additional memory banks that operate like the other memory banks, a memory system that handles several simultaneous write operations can also be implemented using a cache memory within the memory controller. For example, the memory system disclosed in the provisional patent application "SYSTEM AND METHOD FOR REDUCED LATENCY CACHING" filed on Dec. 15, 2009 having Ser. No. 61/284,260 could be modified to include additional caches to handle additional write operations.

To construct a memory system that handles many additional concurrent write operations, one additional memory bank must be added to the memory system for each additional write operation after a first memory operation (which may be a read or a write operation). For example, if a system needs to handle four concurrent write operations then the system needs a main set of memory banks and then three additional memory banks to handle the additional write operations. The first write operation is handled by the main memory bank and the remainder of the write operations are either handled by the main memory (when there is no conflict with another write operation) or one of the additional extra memory banks (when there is a conflict with another write operation). Similarly, if a system needs to hand one read operation and two write operations then the system will require a main memory bank and two additional memory banks. The read operation is handled by the main memory bank and the write operations are either handled by the main memory (when there is no conflict with the read operation) or one of the additional extra memory banks (when there is a conflict with the read or another write operation).

Figure 6F:
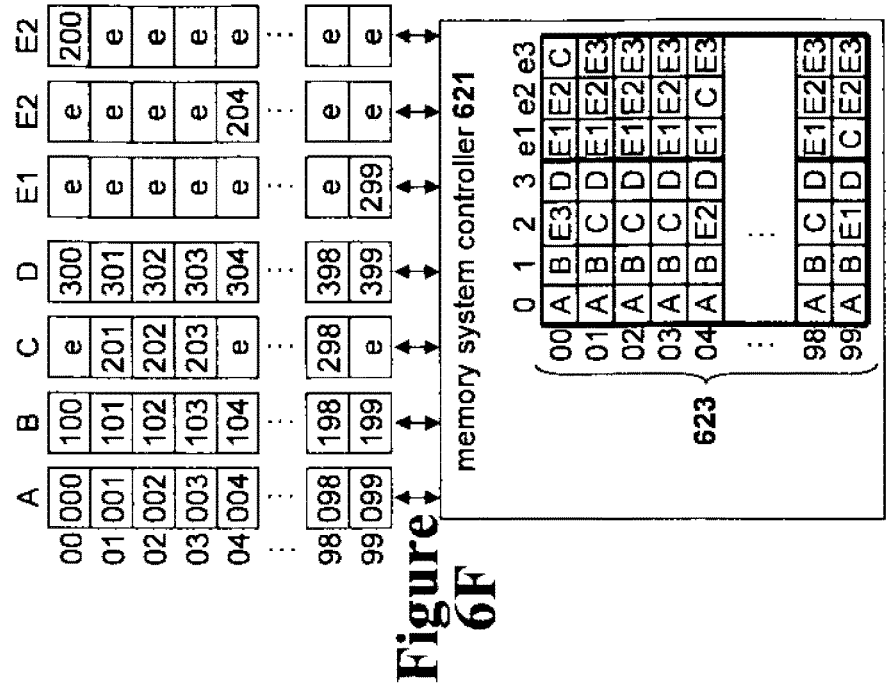
FIG. 6F illustrates the algorithmic memory block of FIG. 6E after processing the four different simultaneous memory operations.
Figure 6E:
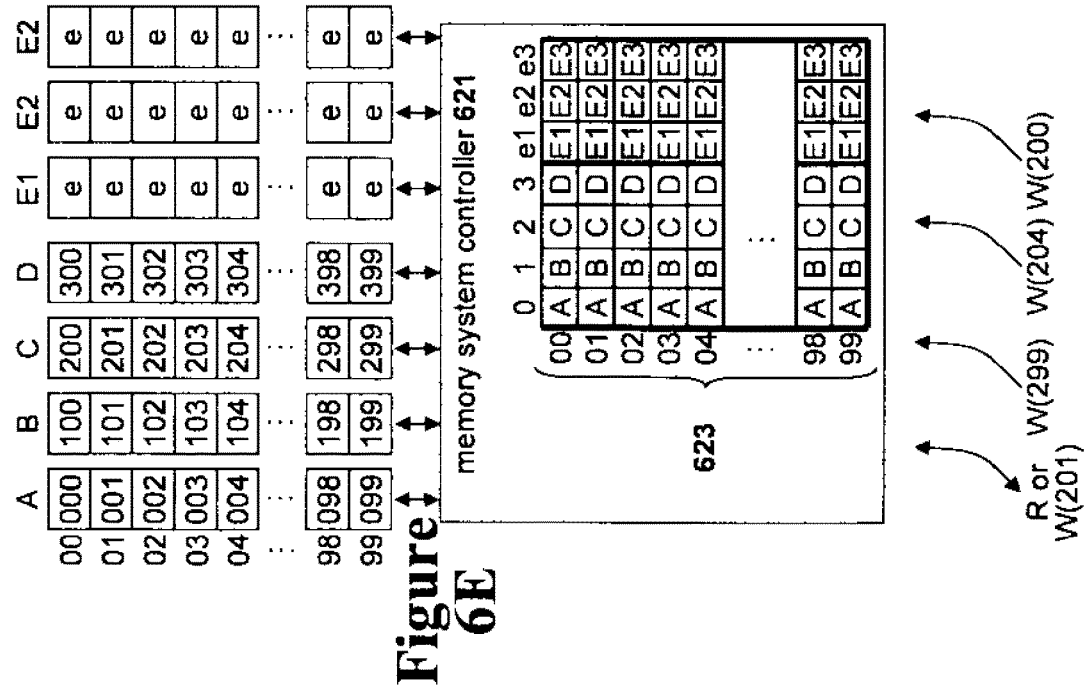
FIG. 6E illustrates an algorithmic memory block that can handle multiple write memory operations receiving four different simultaneous memory operations.

FIGS. 6E and 6F illustrate the operation of an example algorithmic memory block that has three additional memory banks labelled E1, E2, and E3. By having three extra memory banks, the algorithmic memory block can simultaneously handle a first memory operation (a read operation or a write operation) and three additional write operations. An example of the operation of the algorithmic memory block is set forth with reference to FIGS. 6E and 6F.

In FIG. 6E, the algorithmic memory block is an initial state wherein all of the externally addressable memory locations are currently located in the main memory banks A, B, C, and D. The algorithmic memory block also includes three additional memory banks E1, E2, and E3 for handing write operations that may conflict with a first memory operation. The algorithmic memory block then receives four memory operations: a first memory operation (that may be a read or a write) addressing location 201 and three additional write operations to addresses 299, 204, and 200.

If a read operation is received, that read operation can only be handled by the memory bank that currently stores the data for the address specified in the read operation. Write operations can be handled by the current location for the specified address or in any free memory bank. In FIG. 6E, the first operation (a read or write) directed toward address 201 is handled by the memory bank that currently stores the data for address 201 (memory bank B in this example). The remaining write operations cannot access memory bank B.

In the example of FIG. 6E, all of the operations are directed toward addresses located in memory bank B. Thus, the additional write operations must be handled by other memory banks. In this example, the write to address 299 is handled with memory bank E1, the write to address 204 is handled with memory bank E2, and the write to address to address 200 is handled with memory bank E3. The result after handling all of the memory operations is illustrated in FIG. 6F.

Algorithmic Memory System 3: Duplicated Memory Banks to Obtain 0(Read Performance (nR or 1W)

The algorithmic memory blocks disclosed in the previous sections were able to handle additional write operations by writing an empty physical memory location and then changing a mapping table to associate the virtual address in write operation with the physical address used to store the data. However, that type of algorithmic memory block was unable to support more than a single read operation. Two read operations could not be supported since if two simultaneous read operations were directed to the same memory bank, a memory bank conflict would prevent the memory controller from reading and return both data values without stalling.

Figure 7:
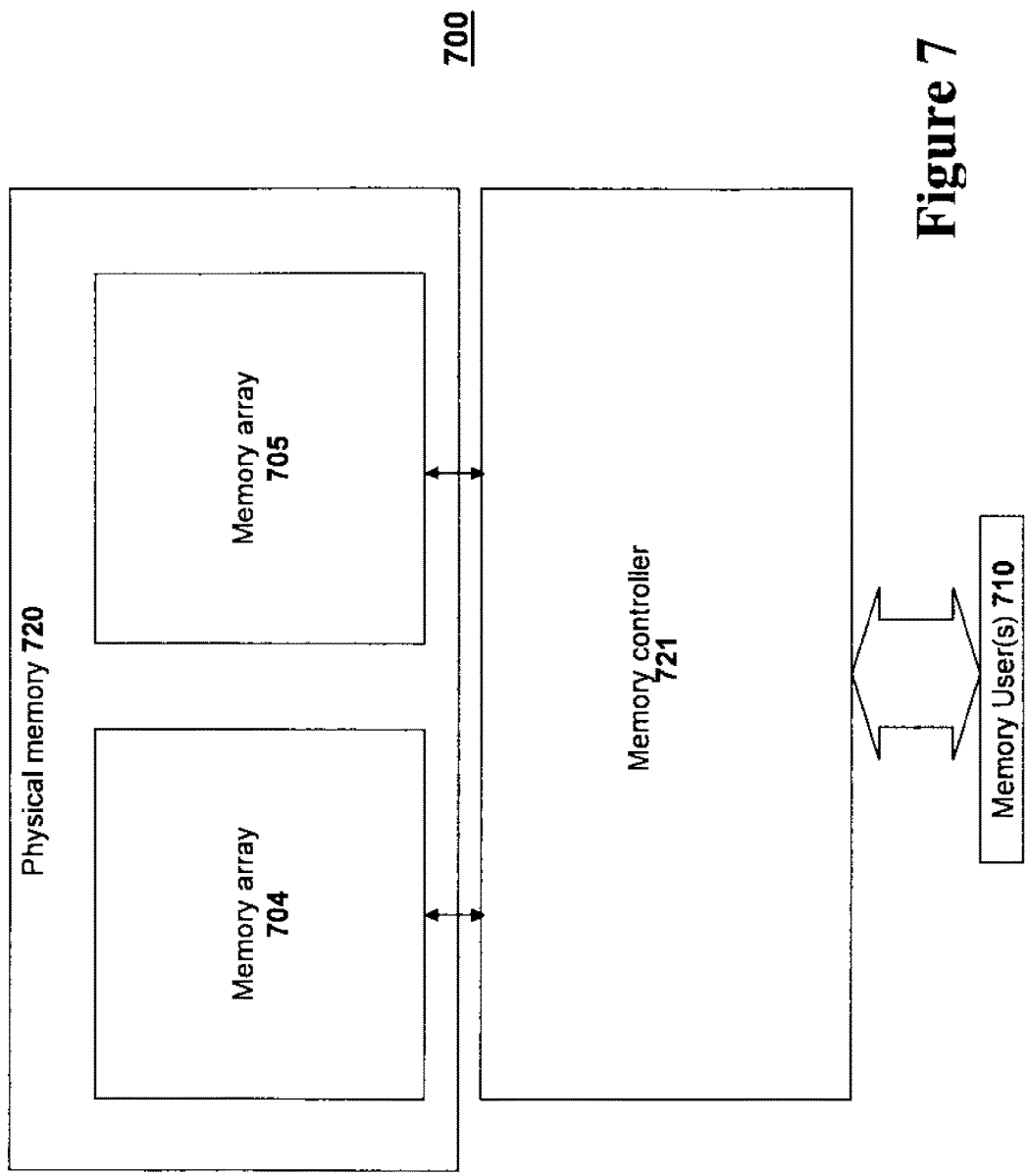
FIG. 7 illustrates an algorithmic memory block that can handle two simultaneous read operations using two independent memory arrays.

To handle two simultaneous read operations, a simple algorithmic memory block may store two copies of every piece of data stored in the memory block. Specifically, the entire memory array could be duplicated. FIG. 7 illustrates a block diagram of a memory system wherein there is a first memory array 704 and a second memory array 705. Each memory bank is the same size and can be accessed independently.

When the memory system 700 of FIG. 7 receives two read operations for data that would be stored in the same memory bank then the first read operation can access the first memory array 704 and the second read operation would access the second memory array This method of implementing a multiple read memory system can obviously be extended to handle many read operations by creating many additional copies of the entire memory array.

However, without any other extensions, this duplicate memory system could only handle a single write operation at a time. Each write operation must write to all the memory arrays (both arrays 704 and 705 in FIG. 7) to keep all of the data current.

This method of implementing a memory system capable of handling multiple simultaneous reads is well-known and may be implemented with many variations. However, this method is certainly not elegant. Such a full duplicate memory system would have a very low memory density since a full copy of the entire memory array is required for each additional simultaneous read operation to be handled. Thus, it would be desirable to have alternative solutions for handling simultaneous read operations.

Algorithmic Memory System 4: An Additional memory Bank to Obtain 2X Read Performance (2R or IW)

Instead of providing two full independent representations of every piece of data, this section discloses an algorithmic memory block that instead stores one full representation of each data item and one encoded version of each data item. The full representation of a data value is stored in a consistent location in a main memory bank. The encoded version of the data value is implemented in a manner that efficiently combines multiple data items such that only a small amount of additional memory is required to store the encoded versions of data.

When such a memory system receives two simultaneous read operations requesting data that have their full representations in the same memory bank then the memory controller may retrieve the full representation of the first data item from the main memory bank and retrieve the second data item by decoding the encoded version of the second data item. To operate properly, the memory system must always be able to fetch the encoded version of the second data item without the use of the main memory bank that is being accessed to retrieve the first data item.

Since this algorithmic memory block always requires a main full representation of each data item in a consistent main memory bank location, the algorithmic memory block will not be able to handle two write operations concurrently. Specifically, if two write operations are directed to memory addresses with full representations stored in the same memory bank then the two write operations will not be able to simultaneously access that main memory bank. The memory system would stall in order to execute a first write in a first cycle and a second write in a second cycle. Thus, such a memory system cannot handle two write operations simultaneously.

In one embodiment, the encoded version of each data item is stored in an extra memory bank added to a multi-bank memory system. For example, each row of the extra memory bank may store an encoded value that is function which combines all of the data items from the corresponding rows of all the normal memory banks. To retrieve a single specific data item from the encoded version, the memory system would read the encoded version and process that encoded version with decode function that extracts a single specific requested data item.

In one particular implementation, all of the data items from the corresponding row in the main memory banks are combined together with a logical exclusive-OR function (commonly known as an 'XOR' function) and stored in the extra memory bank. This extra memory bank is sometimes referred to as the "XOR bank" since it stores a logical XOR combination of all the other data items. To reverse the XOR function encoding in order to obtain a desired data item from a particular memory bank, the XOR encoded data value from one row of the XOR bank is combined (using an XOR function) with the all the data values from the same row of all the other main memory banks except for the main memory bank containing the desired data item. This operation will eliminate the data items from other memory banks that were also encoded in the same row of the XOR bank using the exclusive-OR (XOR) function thereby leaving only the desired data item.

Although the disclosed embodiment operates using an XOR function, there is a general class of "erasure codes" that may be used to allow multiple data reads. Erasure codes encode a set of N data bits into a larger set of N+X bits that allow a system to recover a subset of the N data bits if that subset of data bits becomes unavailable (usually due to being lost or corrupted). Such erasure codes are commonly used in encoding data for transmission across an unreliable channel. In the disclosed memory system, a set of data bits from the same row of the memory banks can be viewed as the original N data bits and the X data bits are the data stored in the extra memory bank using the erasure code. Thus, when a subset of the N data bits become unavailable (a memory bank containing a subset of the N bits is being accessed for a simultaneous read operation), that subset of data bits can be reconstructed using X data bits in the extra memory bank and the remaining data bits from the set of N data bits. In this manner, any erasure coding system that allows the quick full reconstruction of data bits from an unavailable memory bank (a memory bank blocked due to another memory access to that memory bank) may be used to encode the data in the extra memory bank.

Examples of erasure coding systems that may be used include Reed-Solomon coding, Maximum Distance Separable (MDS) codes, and Galois Fields. Some coding systems that do not guarantee the exact same data to be recovered or take too long to return a result would not be used. There may be several different encoding systems that can be used which each have properties. Some codes may require more layout area but provide faster results. The encoding system for a particular application should guarantee that data can be recovered within a prescribed maximum time period and use minimal resources.

Figure 8:
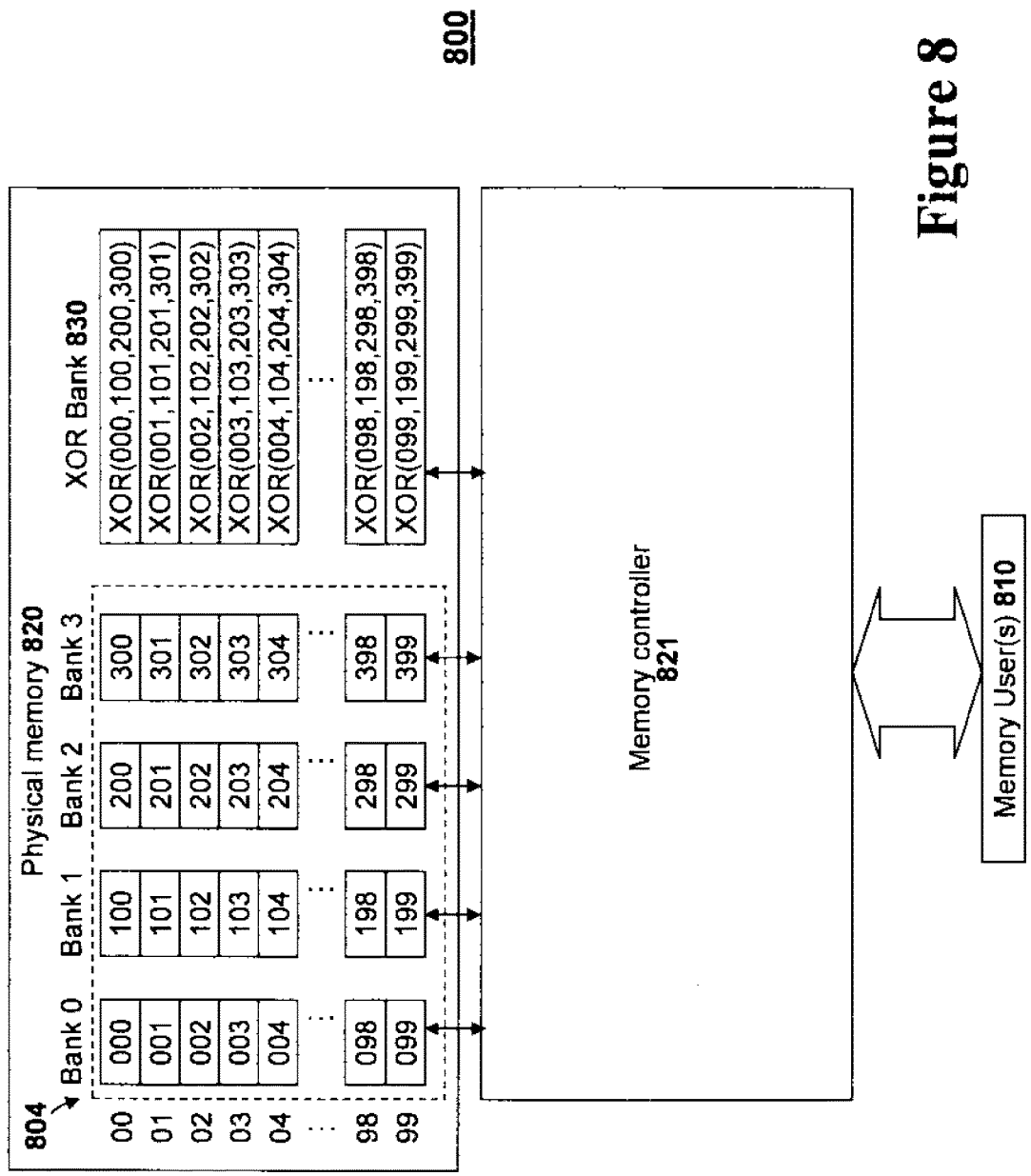
FIG. 8 illustrates an algorithmic memory block that can handle two simultaneous read operations using an extra memory bank with a second encoded copy of each data item.

FIG. 8 illustrates a block diagram of an algorithmic memory block 800 that allows two read operations to be handled simultaneously using an extra memory bank with erasure coding. The algorithmic memory block 800 stores a first (full) data representation in the main memory bank 804 and a second (encoded) data representation in an XOR memory bank 830. Note that in the illustration of FIG. 8 the XOR memory bank 830 is only illustrated wider in order to fit the notation in the illustration. In an actual implementation, the XOR memory bank 830 would be physically the same as the other memory banks in the memory system (Bank 0, Bank 1, Bank 2, and Bank 3).

As illustrated in FIG. 8, the algorithmic memory block 800 stores a full representation of data items using addresses 000 to 399 in the set of main memory banks 804. In the example of FIG. 8, each main memory bank (Bank 0 to Bank 3) is labeled with a number that is the same as the most significant digit of the memory addresses stored within that memory bank. (In FIG. 8, bank 0 is associated with addresses having '0' as the most significant digit, bank 1 is associated with addresses having '1' as the most significant digit, and so on.) The full data representation for each item of data is stored within the appropriate location in the main memory bank 804. Note that the XOR-based algorithmic memory block 800 does not require any virtual to physical memory mapping table in the memory controller 821 to keep track of where each piece of data currently resides.

In addition to storing the full representation in the main memory banks 804, the memory controller 821 also stores a second (encoded) representation of data items in the XOR memory bank 830. In each row of the XOR memory bank 830, the memory controller 821 stores an exclusive-OR (XOR) encoded version of all the data that has been written into the corresponding row of all the main memory banks (banks 0 to 3). For example, as illustrated in FIG. 8, row 00 of the XOR memory bank 830 stores an exclusive-OR (XOR) combination of the data items from row 00 of memory banks 0, 1, 2, and 3. This is depicted in FIG. 8 as having row 00 of XOR memory bank 830 store the logical function of XOR(000,100,200,300).

In the XOR-based algorithmic memory block 800 of FIG. 8, all data write operations will store information into both a row of one of the main memory banks 804 and the corresponding row of the XOR bank 830. The storing of the full representation of data into a bank of the main memory 804 is a normal write operation that uses the address specified in the write operation. The storing of the encoded representation into the corresponding row in the XOR bank 830 must first create a new encoded value by encoding the new data value with existing data (either data from the other memory banks or the current encoded value in the XOR bank 830) and then store that new encoded value into XOR bank 830. Different methods may be used to create the new encoded value to be stored into the corresponding row in the XOR bank 830.

In the embodiment of FIG. 8, the system has N main memory banks for storing full representations of data and one XOR bank 830 for storing an encoded version. One method of creating new encoded value to store into the corresponding location in the XOR bank 830 is to create an entirely new encoded value that does not use the existing encoded value already stored within the XOR bank 830. For example, the memory controller 821 could read all the data currently stored in the same row of other memory banks, combine those existing data values together with the new data value from the write operation using an XOR operation, and then write the newly encoded value into the XOR bank 830. Such an implementation would access every memory bank on each write operation. To implement that method, the memory controller 821 would write the new data value into the target memory bank designated by the write address while simultaneously updating the corresponding XOR bank 830 entry with a new XOR encoded value. Specifically, the memory controller 821 would read the corresponding row of all the other memory banks to obtain their current data values, combine those data values from the other memory banks with the new data value using an XOR function to create a new XOR encoded value, and then write that new XOR encoded value into the XOR bank 830.

In summary, to write a new data value into the memory system, the system may write the new data value into one of the N main memory banks, read N-1 data values (from the other memory banks), and then write one encoded data value into the XOR bank. This method allows the system to be constructed with simple single port memory cells since there is only a single memory operation performed on each memory location. Specifically, there is a single write to the addressed memory row of the addressed memory bank, there is a single read from the corresponding row of all the other main memory banks, and there is a single write to the corresponding row of the XOR bank 830 to write the new encoded XOR value.

Figures 9A, 9B:
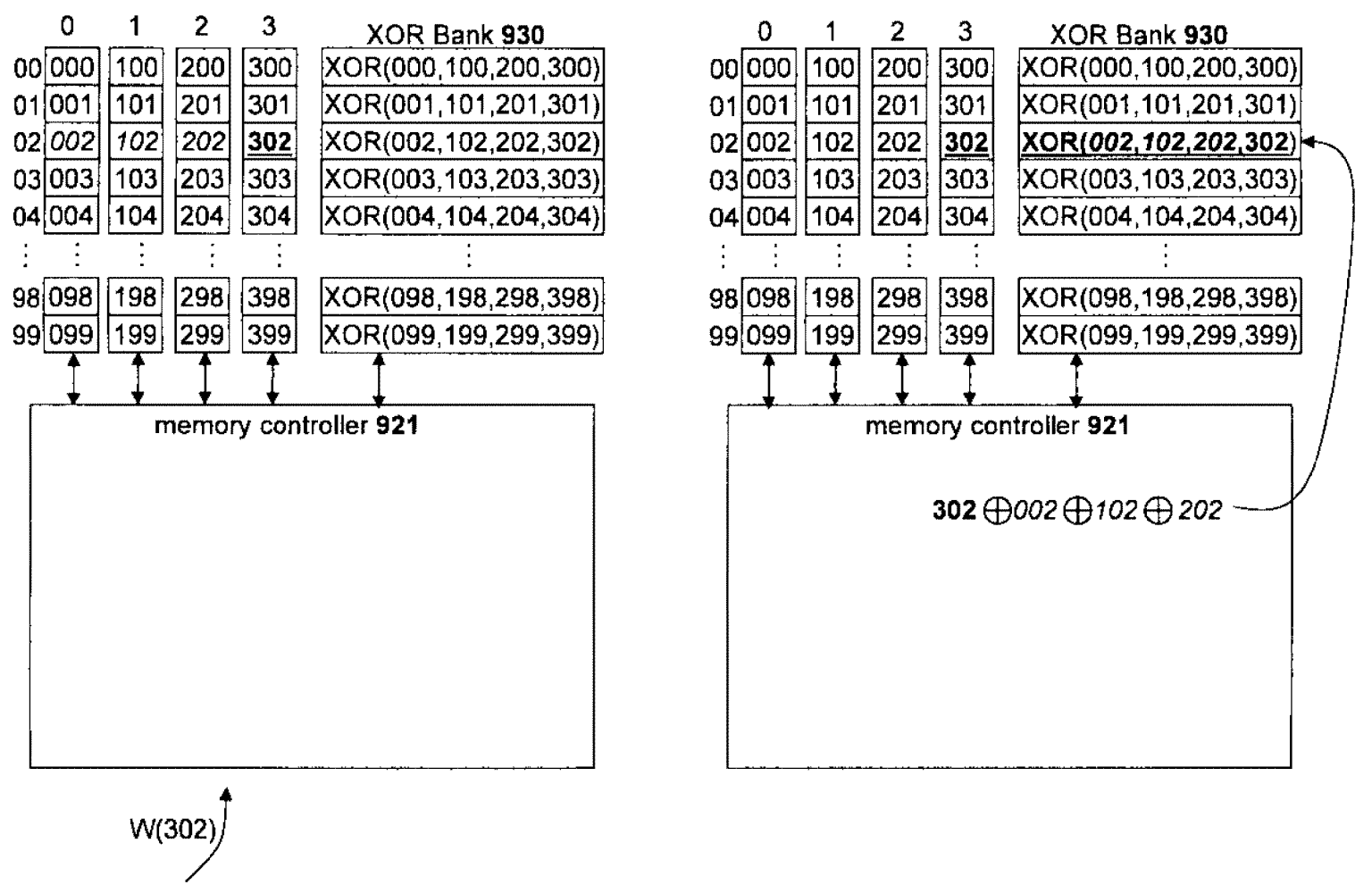

Examples of the operation of the XOR based algorithmic memory block of FIG. 8 are set forth with reference to FIGS. 9A to 9D. FIGS. 9A and 9B illustrate how the memory system stores a single new data value into the XOR based algorithmic memory block. FIGS. 9C and 9D illustrate how the memory system may simultaneously respond to two different read operations.

FIG. 9A illustrates an XOR based memory system that has received a single write request to store data into address 302. To complete the write request, the memory controller 921 must write the data value associated with the write request into address 302 in the main memory banks and must write an encoded XOR version into the XOR Bank 930. In the example presented in FIGS. 9A and 9B, the memory controller 921 will created the encoded XOR version for the XOR Bank 930 without reference to the currently existing encoded XOR version for the XOR Bank 930.

To respond to the write request, the memory controller 921 reads data values 002, 102, and 202 (in memory banks 0, 1, and 2 respectively) to obtain the other data values in the same 02 row as address 302. The data value for the write operation may simultaneously be stored into address 302. In FIG. 9A, the reads of data from addresses 002, 102, and 202 are depicted with italics and the write of the new data into address 302 is illustrated with underlining.

The memory controller 921 must then update the encoded XOR value for the XOR Bank 930. The memory controller 921 combines the new data value for address 302 with the data just read from addresses 002, 102, and 202 using an XOR operation (illustrated symbolically as "⊕") to generate a new encoded XOR representation as illustrated in FIG. 9A. The newly encoded version is stored into the corresponding row (row 02) of the XOR Bank 930. The final state after processing the write request address to location 302 is illustrated in FIG. 9B.

The primary advantage of the XOR-based algorithmic memory block 800 of FIG. 8 is the ability to handle two simultaneous read operations. An example of concurrently reading of two pieces of data from addresses that reside in the same main memory bank is presented with reference to FIGS. 9C and 9D. In FIG. 9C, an XOR-based algorithmic memory block receives simultaneous read operations for addresses 103 and 101 that are both located in memory block 1. Since both addresses are located in the same memory block, this causes a potential memory bank conflict. (Note that if the addresses from the two concurrent read operations targeted addresses in two different memory banks, the two read operations could easily be handled by the two different independent memory banks concurrently since no memory bank conflict occurs.) To handle both read operations without a memory bank conflict, one read request will be serviced using the main representation in memory bank 1 and the other read request will be serviced using the encoded XOR representation in the corresponding row of XOR bank 830 (with the help of data read from the corresponding row of memory banks 0, 2, and 3).

Referring to FIG. 9C, the memory controller 921 reads five different data values to handle the two simultaneous read requests. Specifically, the memory controller 921 reads from:

1) Address 103 from row 03 of main memory bank 1;
2) Address 001 from the 01 row of main memory bank 0;
3) Address 201 from the 01 row of main memory bank 2;
4) Address 301 from the 01 row of main memory bank 3; and
5) The encoded XOR value from row 01 in the XOR bank 930

Note that all five of these read operations all access different memory banks such that there is no memory bank conflict between any of these read operations. Furthermore, note that every memory bank in the memory system is accessed such that the technique of this XOR-based algorithmic memory block may consume more power than techniques used by other types of algorithmic memory blocks. However, the system will only need to read from every memory bank when there is a memory bank conflict between the two requested addresses. If the read requests were directed toward data in two different memory banks, then the memory controller 921 would only read from those two different memory banks.

Figure 9E:
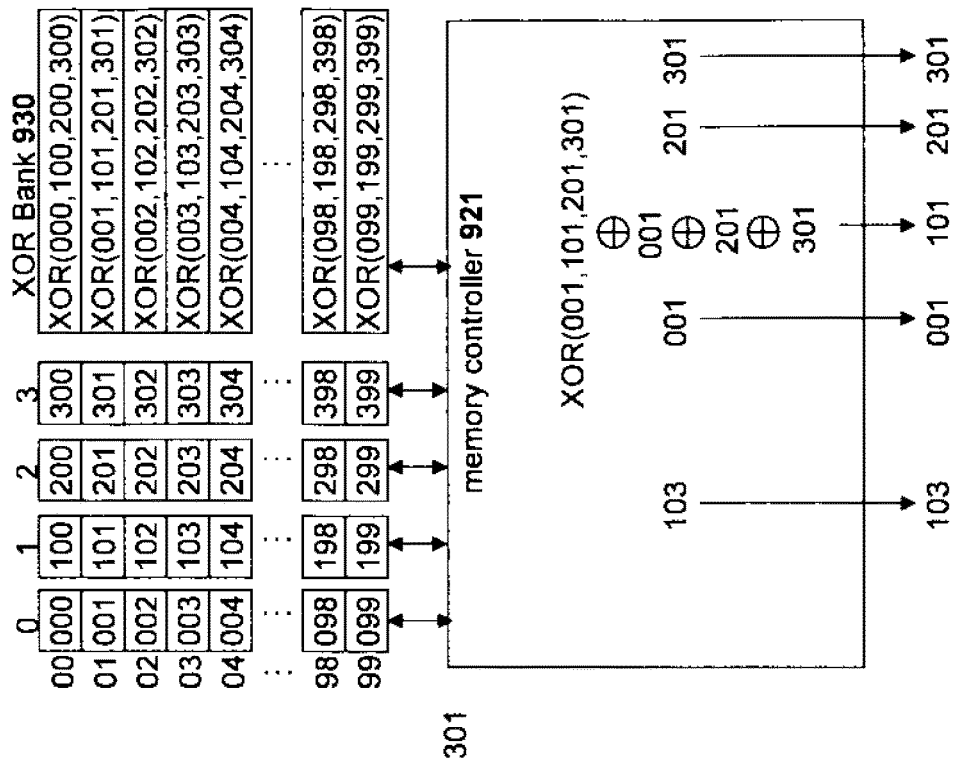
FIG. 9E illustrates an algorithmic memory block using the teachings of FIG. 8 receiving a read operation for address 103 and a read operation for the entire 01 row.

FIG. 9D illustrates how the memory controller 921 then responds with the two requested data values using the data from these five read operations. The memory controller 921 responds with the data read from address 103 to handle the read operation for address 103. To handle the read operation for address 103, the memory controller 921 performs an XOR operation combining the encoded XOR value from row 01 in the XOR bank 930 with the data read from addresses 001, 201, and 301 from row 01 in the main memory banks. This removes the effect of those data values from the encoded XOR value in row 01 the XOR bank 930 thereby leaving only the data value from address 101. Thus, FIG. 9E illustrates the memory controller 921 responding with the data values for addresses 103 and 101.

One nice feature of the XOR-based algorithmic memory block is that no mapping table is required within the memory controller. This eliminates the need for mapping table memory and sophisticated control logic required read the mapping table and to update the mapping table as necessary. However, the XOR-based algorithmic memory block is not ideal for wide data values since parallel data paths must be routed from all of the different memory banks (including the XOR bank) back to the memory controller in order to implement the XOR-based algorithmic memory block.

Algorithmic Memory System 5: Alternative XOR Bank Implementations to Obtain 2X Performance (2R or 1W), (2R or ½W) and (1R and 1W)

The algorithmic memory block of FIG. 8 allows two read operations to be handled simultaneously. FIG. 9A to 9D illustrated one particular method of implementing such an algorithmic memory block. However, many variations of the algorithmic memory block of FIG. 8 may be implemented that each provide different features. This section discloses several variations of the algorithmic memory block of FIG. 8 that can handle two different read operations simultaneously.

Figure 9F:
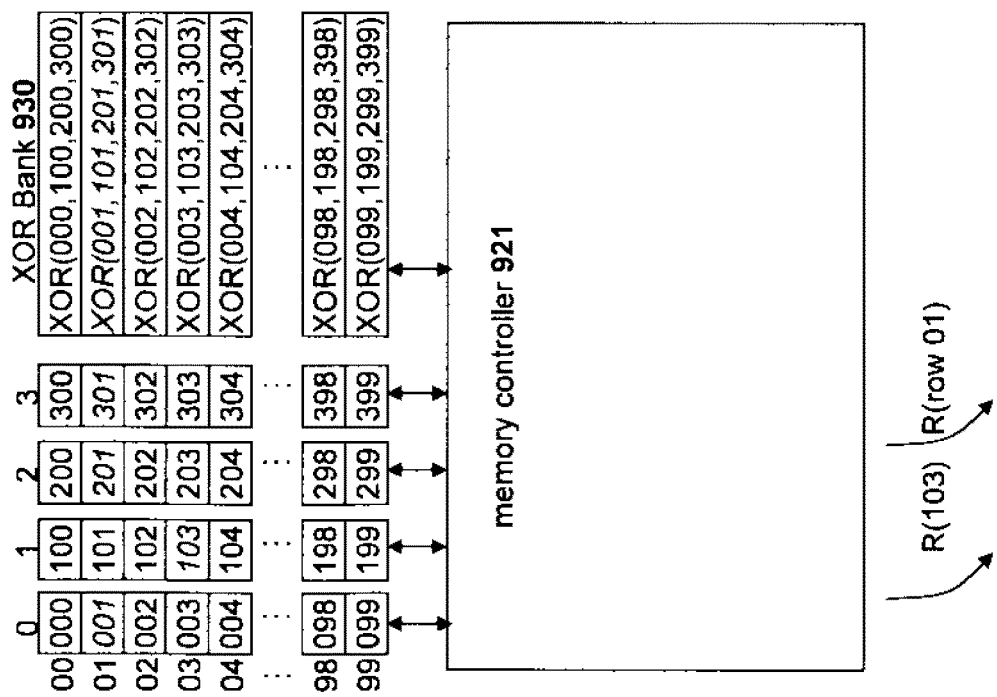
FIG. 9F illustrates the algorithmic memory block of FIG. 9E handling the two read operations.

Referring back to FIGS. 9C and 9D, the memory controller 921 had to read the entire 01 row of the memory bank (with the exception of address 101 that could not be read due a memory bank conflict) in order to respond to the read request for address 101. Using the XOR function allowed the data value for address 101 to be decoded from the XOR bank 930. Since the other data in the same 01 row is already being read, the system of FIGS. 9C and 9D may be used to implement an algorithmic memory block that implements a "row read" that provides the data from an entire data row in the main memory bank. Such an algorithmic memory block could respond to both a normal read request and a row read request simultaneously. FIGS. 9E and 9F illustrate a memory system that implements the row read feature.

As illustrated in FIG. 9E, the memory system receives a read request for address 103 and a row read request for the entire memory row 01 (address 001, 101, 201, and 301). The memory controller 921 reads the data value for address 103 read directly out of the main memory bank. The memory controller 921 also reads the entire row 01 of the memory system with the exception of location 101 since reading address 101 would conflict with the reading of address 103 since both are stored in bank 1. Then, in FIG. 9F, the memory controller 921 outputs the data read from addresses 103, 001, 201, and 301 from the direct read operations and the data from address 101 as decoded from the row 01 XOR bank entry in the same manner as set forth in FIG. 9D.

As described in FIGS. 9A and 9B, the use of erasure codes increases the speed of reads from memory; however this had a consequence on write performance. FIGS. 9A and 9B illustrated one possible method of encoding the second representation of data (the XOR bank entry) that must read all of the other data in the same row before adding a new data item to the second representation (the XOR bank entry). In what follows, a different method to create a new or second representation of a data item is described. For example, one implementation may read the existing second representation (the XOR bank entry), update that second representation with new data item, and then write-back the newly updated second representation.

Referring to FIG. 8, the memory controller 821 may perform this method by first reading both the current data value from the target address in the main memory bank 804 of a write request and the current encoded value stored within the corresponding row of the XOR bank 830. Next, the memory controller 821 removes the representation of that current data from the encoded version of the XOR bank 830 by XORing that current data value with the current encoded value from the XOR bank 830. After the old data has been removed from the encoded value, the memory controller 821 then creates a new encoded XOR value by XORing the new data value with the encoded value that has had the old data removed. Finally, the memory controller 821 may then write the new data value into the target address in the main memory bank and write the newly encoded XOR value into corresponding row of the XOR bank 830.

To store a new data item in this manner, the memory system must perform the following four memory operations: (1) read an old data value from one of the N main memory banks, (2) write a new data value into that main memory bank, (3) read the old encoded value from the XOR bank, and (4) write a new encoded data value back into the XOR bank. In order to perform all of these memory operations in a single cycle, both the main memory banks 804 and the XOR bank 830 must be implemented with two-port memory (one read port and one write port). The main memory banks must be two-port memory such that the target address in the main memory bank 804 can be read from (to obtain the old data value that must be removed from the existing encoded value in the XOR bank 830) and written to (to store the new data value) within a single cycle. Similarly, the XOR bank 830 must be implemented with two port memory so it can be read from (to obtain the existing encoded XOR data value) and written to (to write the updated encoded XOR value) within a single cycle. The use of two-port memory for both the main memory banks 804 and the XOR bank 830 in this method may make this method more costly to implement. However, some memory cell circuit designs are able to implement two-port memory cells with only a small increase in cost.

Figure 9H:
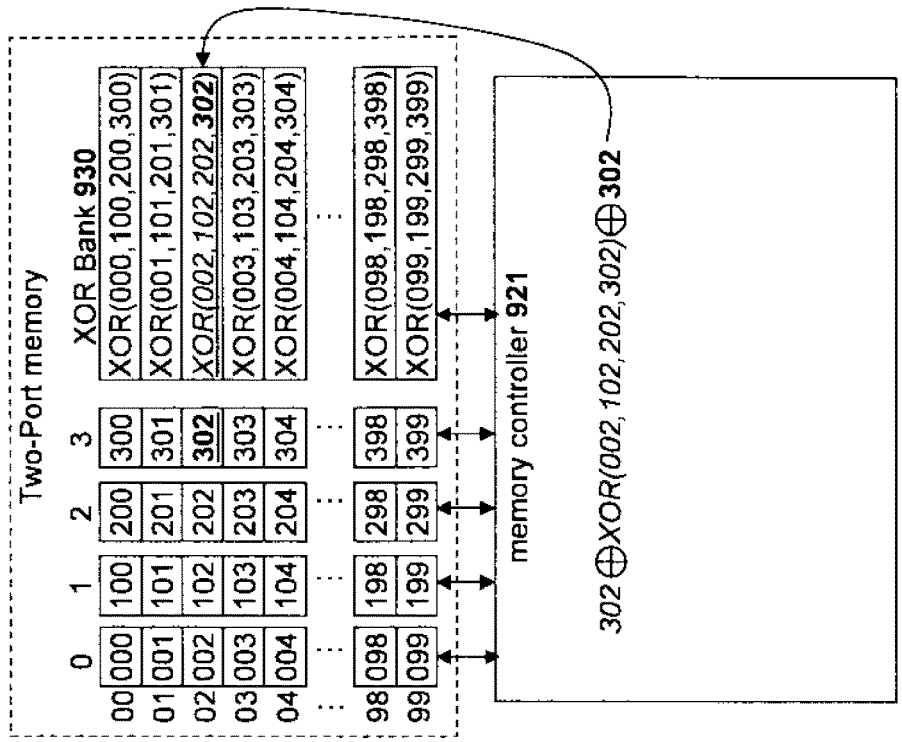
FIG. 9H illustrates the algorithmic memory block of FIG. 9G after handling the single write operation with a second method using two port memories.
Figure 9G:
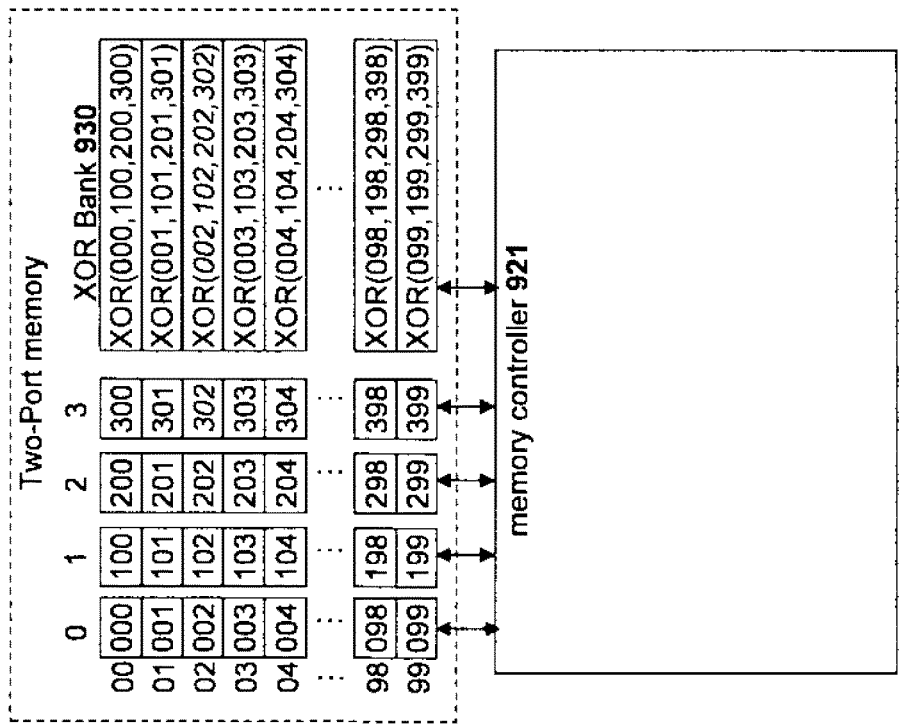
FIG. 9G illustrates an algorithmic memory block using the teachings of FIG. 8 receiving a single write operation to address 302.

FIGS. 9G and 9H illustrate the alternate method of updating the second representation of data using the existing representation. In the example of FIGS. 9G and 9H, the current encoded XOR representation stored in the XOR Bank 930 is used to generate a new encoded XOR representation that is written back into XOR Bank 930. Referring to FIG. 9G, the memory system receives a write to address 312. As illustrated by italics in FIG. 9G, memory controller 921 responds to the write to address 302 by reading the existing data value in address 302 and reading the 02 row entry of the XOR Bank 930 that contains the function XOR(002,102,202,302). This data will be used to create the new encoded XOR value for the row 02 entry the XOR bank 930.

Next, as illustrated in FIG. 9H, the memory controller 921 then generates a new encoded value for the row by XORing the old data value of address 302 with the current encoded value (in order to remove the old data associated with address 302) and also the new data value being written to address 302 (in order to add the new data for address 302 into the encoded XOR value). Finally, the memory controller 921 writes the new data value into address location 302 and writes the newly created encoded XOR value for the row 02 entry of the XOR bank 930. The final state after the write to address location 302 is illustrated in FIG. 9H.

In the write operation disclosed in FIGS. 9G and 9H, there were four internal memory accesses (two read operations and two write operations) to handle a single write request received. The number of memory accesses is independent of the number of banks used in the memory sub-system. In the write operation disclosed FIGS. 9A and 9B, the system used five memory accesses (three read operations and two write operations). The number of memory read accesses is dependent on the number of banks used in the memory sub-system, and in implementations with greater numbers of memory banks, the system of FIGS. 9A and 9B will use even more memory accesses since the corresponding row in every memory bank must be read to create the updated second representation. Thus, the second method of handling write operations as disclosed in FIGS. 9G and 9H consumes less power than the original method of handling write operations as disclosed in FIGS. 9A and 9B.

The example of FIGS. 9G and 9H operates in a single memory cycle by using two-port memory cells. For systems that must handle a write operation in every cycle, this type of implementation will work but may be costly due to the two-port memory that must be implemented in both the main memory bank and the XOR bank 930. However, if an application does not need to be able to handle a new write operation every cycle then the system may be allowed to use less expensive single port memory. For example, a memory system may use two cycles to complete each write request while using only one cycle to handle two simultaneous read requests. Such a memory system may be referred to as a two-read or half-write (2R or ½W) algorithmic memory block two read operations can be handled in a single cycle but only half of a write operation can be handled in a single write cycle. (Two memory cycles would be required to compete a full write operation.)

Figure 9J:
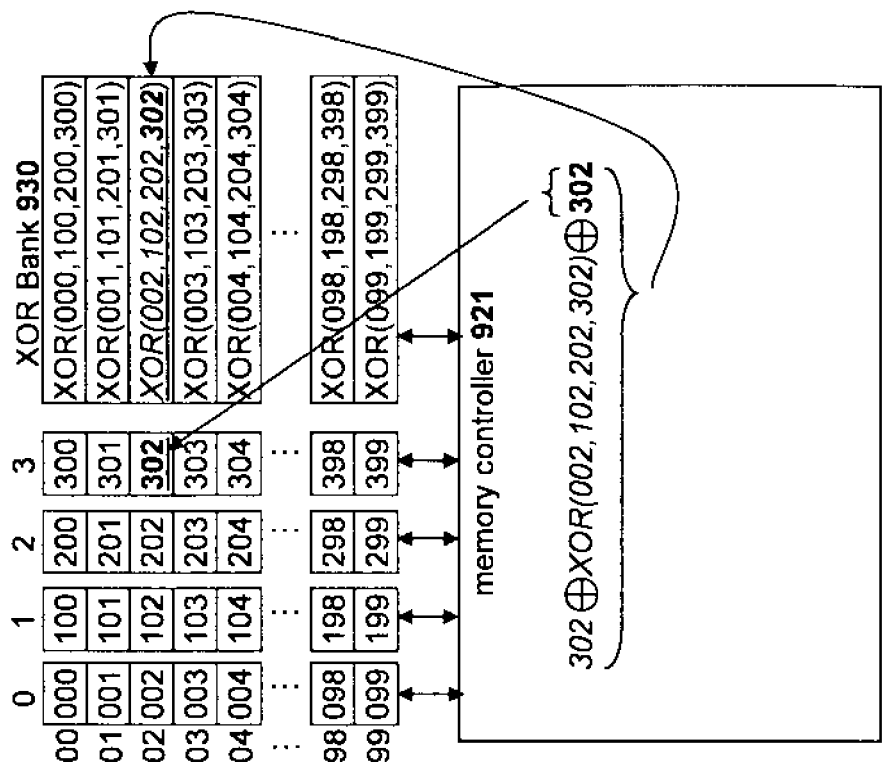
FIG. 9J illustrates the algorithmic memory block of FIG. 9I executing a second cycle of operations to handle the single write operation.
Figure 9I:
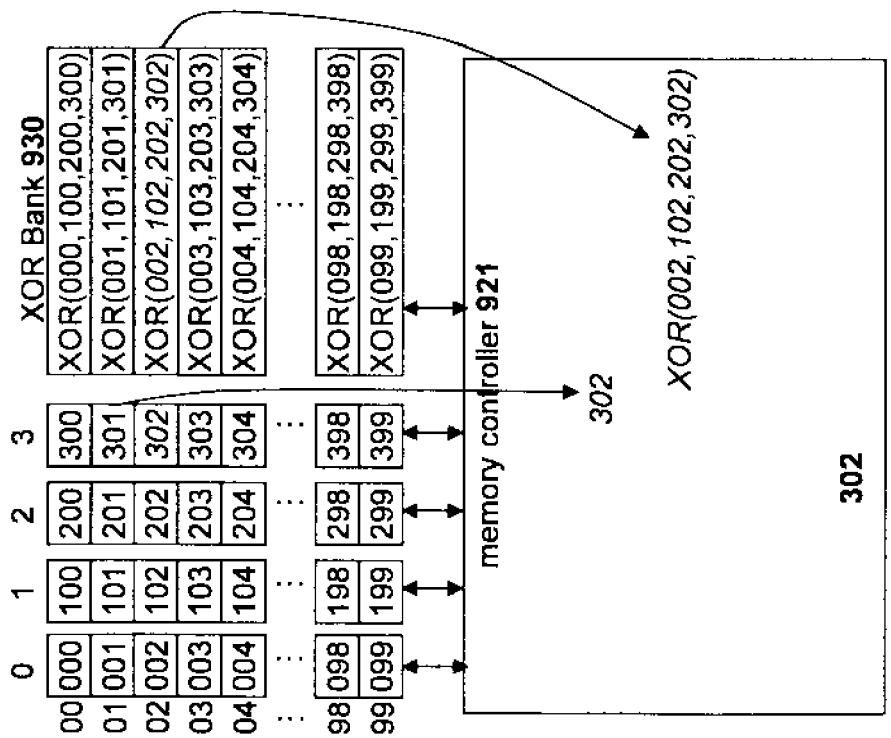
FIG. 9I illustrates an algorithmic memory block receiving a single write operation to address 302 and executing a first cycle of operations.

FIGS. 9I and 9J illustrates how such a two-read or half-write algorithmic memory block may handle a write operation into address 302. FIG. 9I illustrates a first memory cycle wherein the memory controller 921 reads the existing data value from address 302 and the existing encoded XOR representation from the XOR bank 930, FIG. 9J illustrates a second memory cycle wherein the memory controller 921 writes the new data value into address 302 and writes an updated encoded XOR representation into the 02 row entry of the XOR bank 930.

In the memory systems disclosed in FIGS. 9G to 9H, the memory controller 921 accessed only a single memory bank from the set of main memory banks when writing a new data value into the memory system. Specifically, the system disclosed with reference to FIGS. 9G to 9H only accessed the target memory location (address 302 in the examples) in the main memory bank. Since the other main memory banks were not touched, a read operation could be added such that a memory system that supports one read and one write operation per cycle (in addition to alternatively supporting two read operations per cycle) may be constructed. However, this embodiment requires a three port memory to implement the XOR 5 bank.

FIGS. 9K and 9L illustrate an XOR-based algorithmic memory block that handles one write operation and one read operation. As illustrated in FIG. 9I, the memory controller 921 receives a write to address 302 and a read from address 304. To handle the write operation, the memory controller 921 must first access address 302 and the 02 row entry XOR bank 930. The memory controller 921 first reads original data value in address 302 (the data value in address 302 before this write request was received) and then may write the new data into address 302. The memory controller 921 then combines the original data value from address 302 with the 02 row entry XOR bank 930 to remove the original address 302 data. Finally, the memory controller 921 XORs in the new data value from the write operation and then writes the result back into the 02 row entry XOR bank 930.

To simultaneously handle the request to read address 304, the memory controller 921 cannot directly access memory bank 3 since the write to address 302 is already using memory bank 3. Instead, the memory controller 921 reads the 04 row entries from the other memory banks (addresses 004, 104, and 204) and the row 04 entry in the XOR bank 930 that contains XOR(004,104,204,304). Note that this reading of the 04 entry in the XOR bank 930 is occurring while the row 02 entry from the XOR Bank 930 is also being read such that more than one row of the XOR Bank 930 must be independently accessible during the same clock cycle. Thus, the XOR Bank 930 needs to be implemented with three port memory as depicted. The memory controller 921 then XORs together the data values from addresses 004, 104, and 204 with the XOR(004,104,204,304) entry from the XOR Bank 930 to retrieve the data value from address 304.

Algorithmic Memory System 6: Additional XOR Banks to Obtain NX Read Performance (NR or 1W)

The XOR-based algorithmic memory block disclosed in the previous sections may be expanded to handle more than just two simultaneous read operations. The technique of expanding the XOR-based algorithmic memory block involves adding additional XOR memory banks that cover the main memory banks with various different disjoint sets. In this manner, the multiple-read XOR-based algorithmic memory block will respond to multiple read operations to the same memory bank with one data value directly read from the addressed memory bank and multiple other data values created by combining data values read from the other memory banks with XOR memory banks.

Figure 10:
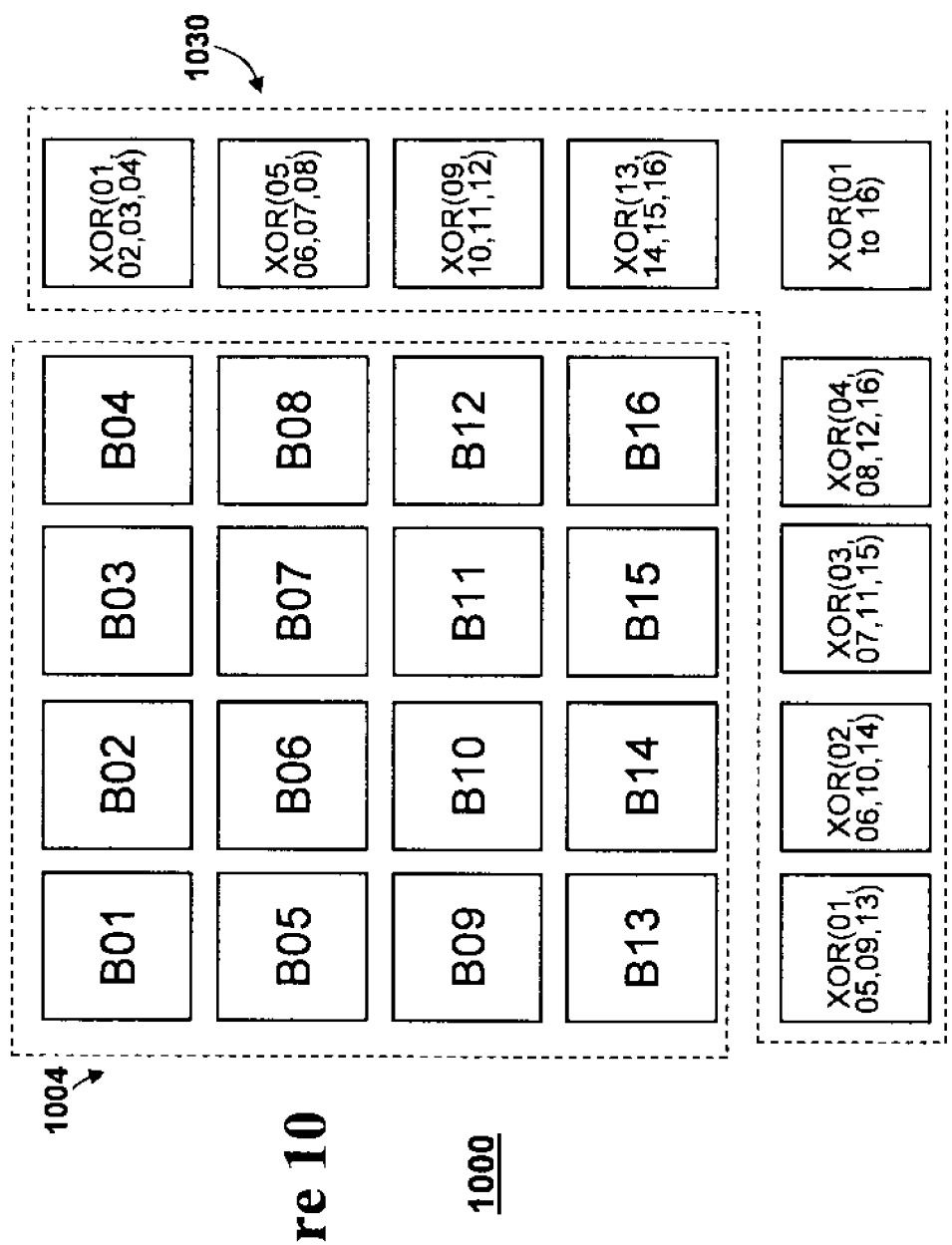
FIG. 10 illustrates an algorithmic memory block for handling four simultaneous read operations.

FIG. 10 illustrates a conceptual diagram of a XOR-based algorithmic memory block 1000 designed to handle four simultaneous read operations. The XOR-based algorithmic memory block 1000 has a main memory bank set 1004 that includes sixteen independent memory banks labelled B01 to B16. Each of the memory banks B01 to B16 can be independently accessed simultaneously.

The XOR-based algorithmic memory block 1000 also includes a set of XOR memory banks 1030. Each memory bank in the main memory bank set 1004 is represented within three of the XOR memory banks 1030 such that data within each memory bank can be accessed four different ways: a direct read to the memory bank within the main memory bank set 1004 and an XOR decoding of the three different XOR memory banks that contain an alternate representation of the data.

Only one data item can be written into the XOR-based algorithmic memory block 1000 at a time. The writing of a new data item requires writing the new data value into the target address of main memory bank for that item (one of the memory banks 01 to 16 in main memory bank set 1004) and updating the three XOR memory banks within the XOR memory banks 1030 that also contain a representation of the new data item. The methods that may be used to write a data item into the XOR-based algorithmic memory block 1000 are the same as the methods disclosed in the previous two sections of this document.

Figure 11A:
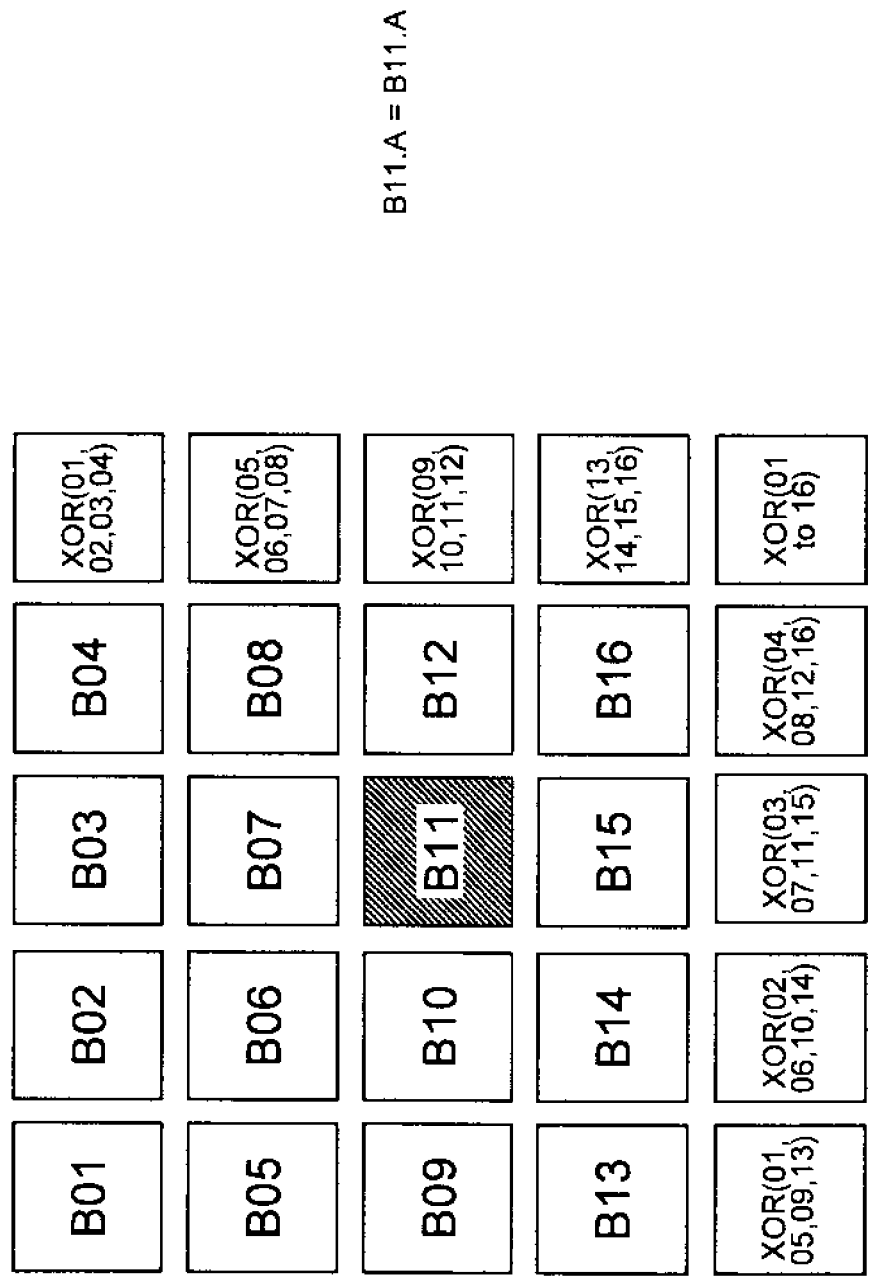
FIG. 11A illustrates how a first data value is read from the B11 block of the algorithmic memory block of FIG. 10.

FIGS. 11A to 11E illustrate how four data items located in the same memory bank (bank B11 in this example) may be read simultaneously by accessing one main data representation within bank B11 and three encoded data representations from XOR banks 1030. Initially, the XOR-based algorithmic memory block receives a request for four data items that all reside within main memory bank B11. The four addresses within memory bank B11 may be designated B11.A, B11.B, B11.C, and B11.D wherein the postfix letter specifies an address within memory bank B11. Note that all of the memory banks are of the same size and may be addressed internally with the same A, B, C, etc. style addressing. A first requested data item, B11.A, may be read directly from the B11 memory bank as illustrated in FIG. 11A. The other three data items (B11.B, B11.C, and B11.D) cannot be read directly from memory bank B11 since this would cause a memory bank conflict.

Figure 11B:
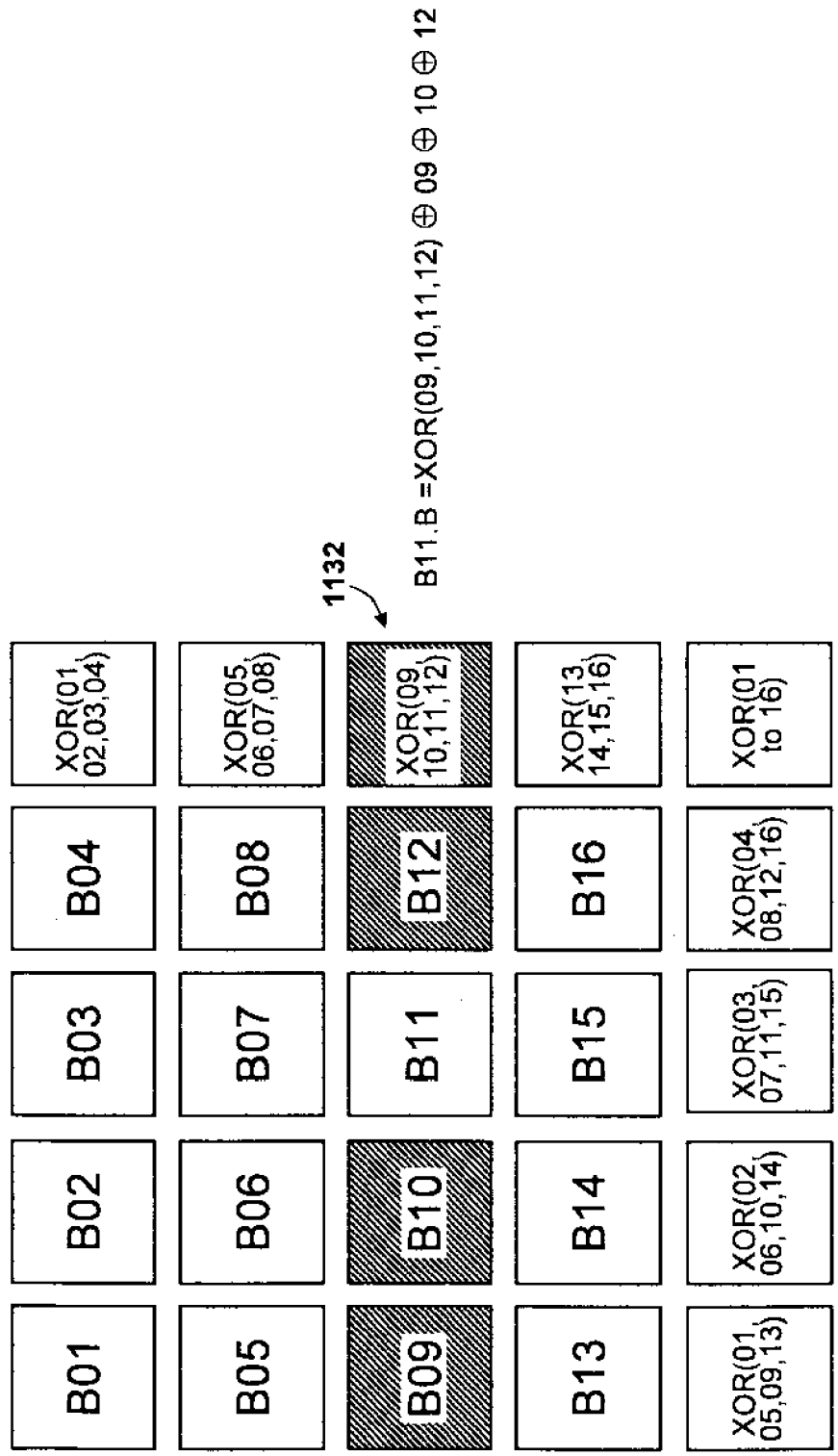
FIG. 11B illustrates how a second data value is read from the B11 block of the algorithmic memory block of FIG. 10.

FIG. 11B illustrates how a second data item, B11.B, may be accessed by using a first XOR bank 1132 that contains an encoded representation of the B11 memory bank and thus contains a representation of the data at address B 11.8. The requested B data address from XOR bank 1132 is XORed with the data from the corresponding B address location in the other memory banks represented by the XOR bank 1132. In this example, the B address location from a first XOR bank 1132 containing a combination of entries from the B09, B10, B11, and B12 memory banks is combined with data items retrieved from the corresponding B address memory location in main memory banks 809, B10, and B12 in order to extract requested data item B11.B.

Figure 11C:
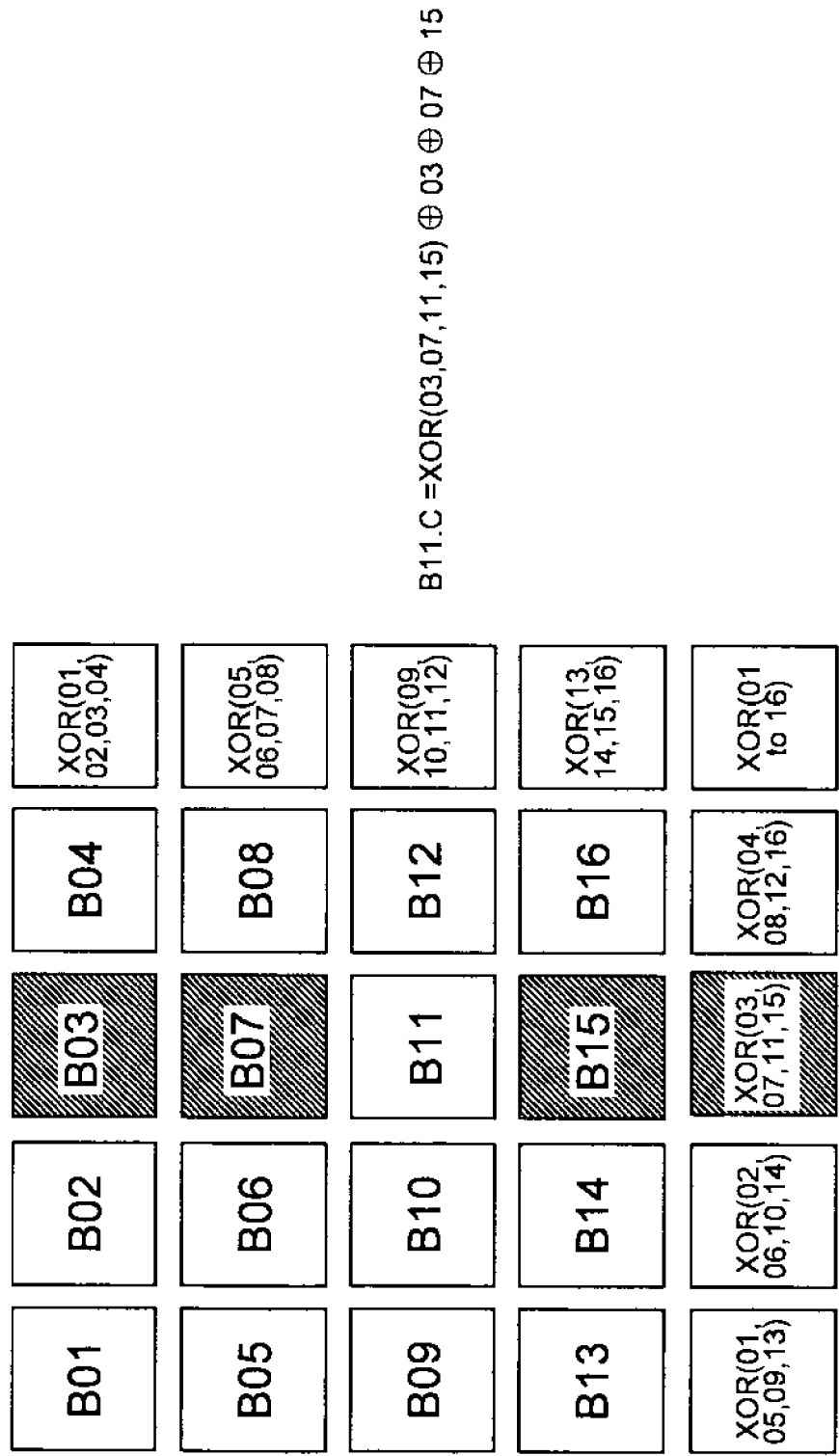
FIG. 11C illustrates how a third data value is read from the B11 block of the algorithmic memory block of FIG. 10.

FIG. 11C illustrates how a third data item, B11.C, may be accessed by using a second XOR bank 1133 that also contains a representation of the 811 memory bank and thus contains the requested data at address B11.C. In addition to the data from the desired B11 bank, the second XOR bank 1133 contains a representation of data from other memory banks (banks B03, B07, and B15). Note that these data banks are all different than the data banks represented in the first XOR bank 1133 (which had banks B09, B10, and B12) such that the corresponding other memory banks (banks B03, B07, and B15) can be accessed without a memory bank conflict. In this example, a C address from a second XOR bank 1133 containing a combination of entries from the B03, B07, 811, and B15 memory banks is combined with data items retrieved from the corresponding C address in main memory banks B03, B07, and B15 to reconstruct the desired data item 811.C.

Figure 11D:
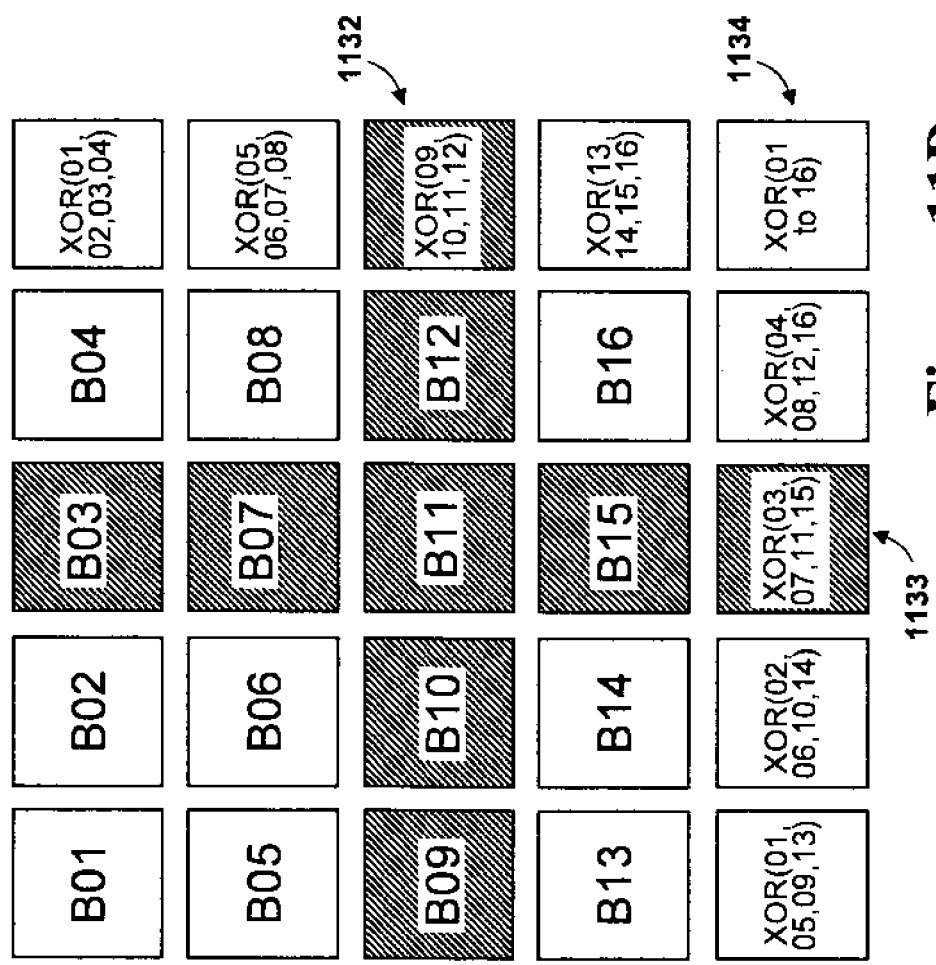
FIG. 11D illustrates all of the memory blocks read during the read operations depicted in FIGS. 11A, 11B, and 11C.

FIG. 11D illustrates all of the memory banks that have been accessed to obtain the first three data items (B11.A, B11.B, and B11.C). Specifically, FIG. 11D illustrates all of the memory banks that were read in the memory reads disclosed with reference to FIG. 11A, FIG. 11B, and FIG. 11C. As illustrated in FIG. 11D, the only memory bank that contains a representation of data from the B11 bank and has not been read yet is XOR bank 1134 in the lower right corner. XOR bank 1134 contains an XOR combination of all the data values in all of the main memory banks B01 to B16.

Figure 11E:
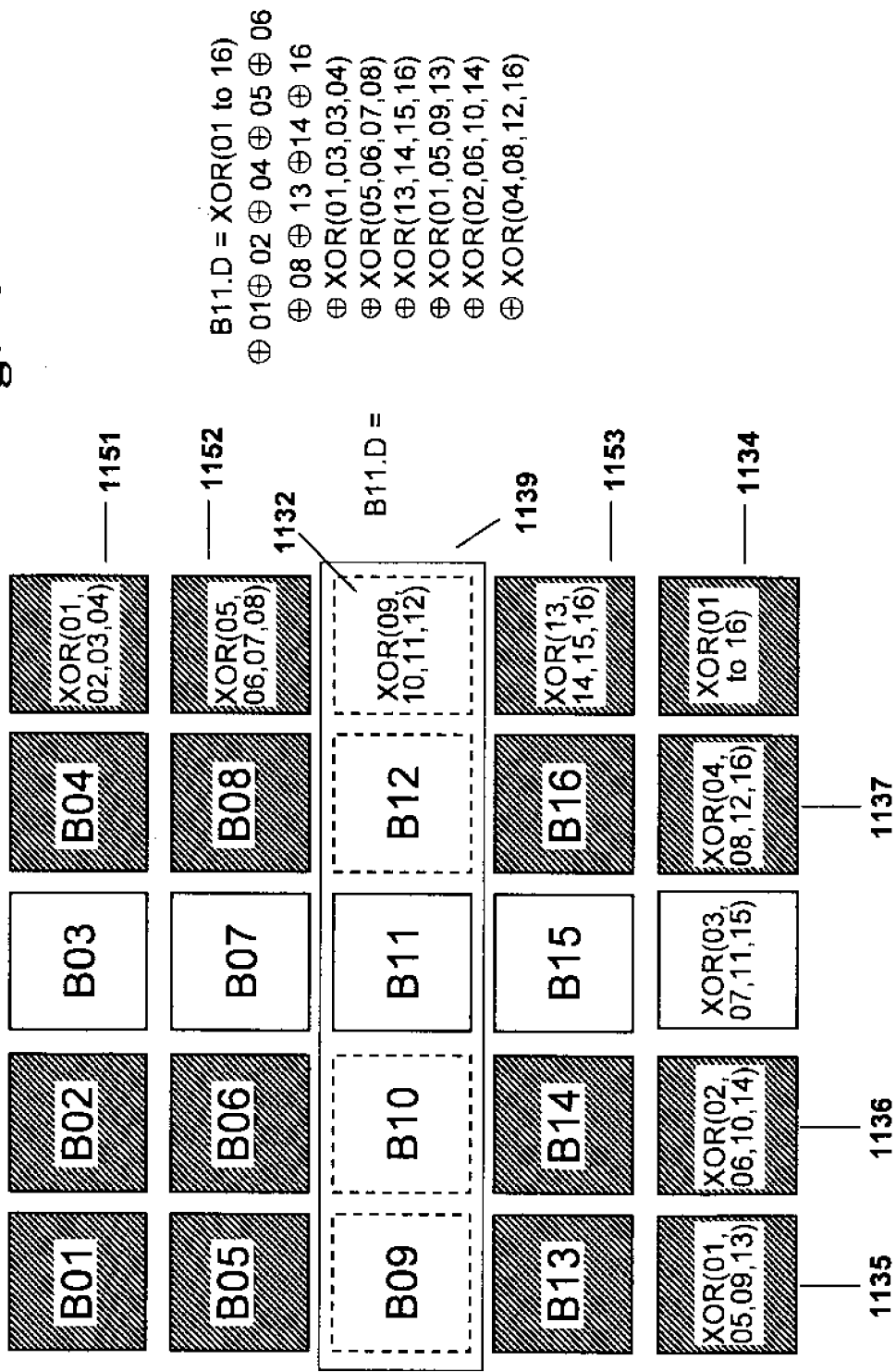
FIG. 11E illustrates how a fourth data value is read from the B11 block of the algorithmic memory block of FIG. 10.

To retrieve the last requested data value (the data from address B11.D), the memory system will XOR together the D memory address from all of the memory banks not yet accessed as illustrated in FIG. 11E. To illustrate why this works, consider the horizontal row of memory banks 1139. With reference to FIG. 11B, the data values at address B in memory banks B09, B10, and 812 were combined with the value at address B in XOR bank 1132 to obtain the desired data value B11.B. (B11=XOR(B09, B10, B12, XOR bank 1132) If those same memory banks could be read again, the final B11.D data value could be obtained in the same manner. Although those memory banks cannot be read again (due to memory bank conflict), the desired contents from those memory banks can be reconstructed using memory banks that have not been read yet. The following equations illustrate how data values from all the other memory banks in the same row as B11 may be reconstructed:

B09=XOR (B01, B05, B13, XOR bank 1135)
B10=XOR (B02, B06, B14, XOR bank 1136)
B12=XOR (804, B08, B16, XOR bank 1137)
XOR bank 1132=XOR (XOR bank 1151, XOR bank 1152, XOR bank 1153, XOR bank 1134)

Thus, when data values from those four memory banks are combined, the result is the same value from B11. Note that the previous four equations list all of the memory banks highlighted in FIG. 11E. Therefore, to reconstruct the B11.D value, the address D location from all of the memory banks highlighted in FIG. 11E may be XORed together to obtain the data from address B11.D.

Figure 11F:
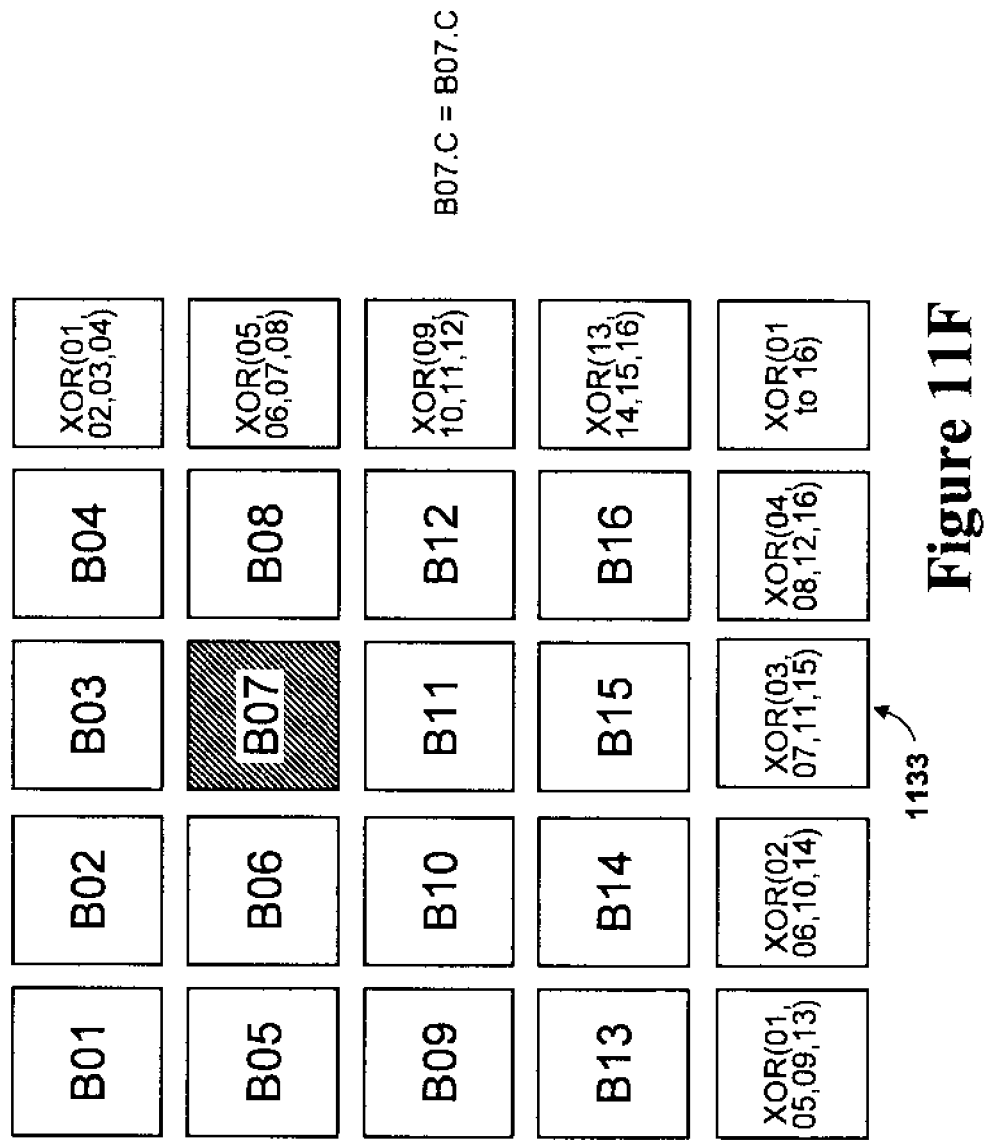
FIG. 11F illustrates how a data value is read from the B07 block of the algorithmic memory block of FIG. 10.

The example set forth in FIGS. 11A to 11E illustrates the worst case scenario where all of the read requests are directed toward the same memory bank (memory bank B11 in this example) thus creating a potential four-way memory conflict. When the memory requests are spread out among different memory banks, the system does not have to rely so much on the XOR banks. For example, FIG. 11C illustrates how a second data item, 811.C, needed to be accessed using an XOR bank 1133 and all of the memory banks in a vertical column with memory bank B11. If the second memory request had instead been directed to an address B07.C located in memory bank B07 then XOR bank 1133 would not be needed to obtain the B07.C value. Specifically, FIG. 11F illustrates how data item B07.0 can be read directly out of memory bank 07 since there is no memory bank conflict with bank B11. Thus, the decoding of a second representation as illustrated FIG. 11C.

Algorithmic Memory System 7: An Additional XOR Bank to obtain 2X Performance (1 Update)

The XOR-bank based methodology disclosed in the preceding sections can also be used to implement a specialized "1 Update" memory. An "Update" operation is a special type of memory operation consisting of a read operation and a simultaneous write operation wherein the write operation writes to a memory location that was read from a few memory cycles earlier. The read operation will be followed by a corresponding write operation a few cycle later. This is generally referred to as "read-modify-write" operation within the field of computer science.

An update type of memory operation is frequently used when keeping track of statistics or state. For example, a network router that is handling many different communication lines, connections, sessions, data packet queues, and other data abstractions may need to keep track of various statistics for each data abstraction. For example, the network router may keep track of the number of packets serviced, the number of packets dropped, packet types, the total amount of data carried for a particular session, etc. Similarly, read-modify-write operations are also very useful for maintaining state values such as TCP connection state, policer state, and other system states. For each of these statistics and state values maintained, the network router may periodically read the current value from memory, modify the current value, and then write the updated statistic or state value back into memory. If a large number of statistics must be kept track of, a specialized statistics memory could be used to optimize such statistic handling.

Since an update operation involves reading a data value from memory and then writing back an updated data value to same memory location in the near future, the memory system may take advantage of the fact that it can expect a later write operation to be received. For example, after the memory read stage of an update operation, the memory controller may carry forward state information from that memory read operation such that the carried-forward state information will be available when the later write operation is received. To optimize the handling of the stored carried-forward information, the carried-forward information may be carried along a pipeline in an internal shift register that is synchronized with the related read and write operations of the read-modify-write.

Referring back to the XOR-based algorithmic memory block of FIG. 8, the XOR-based algorithmic memory block must update both the main representation in the addressed memory location in the main memory bank area 804 and the secondary (encoded) representation in the appropriate row in the XOR bank 830 for each write operation. To update the XOR bank 830 during a write operation, the memory controller 821 requires either all the other data values from the same row of the XOR bank 830 (as disclosed with reference to FIGS. 9A and 9B) or the contents of the appropriate row in the XOR bank 830 with the old data value removed (as disclosed with reference to FIGS. 9G to 9J). In an update memory system, this additional data needed to create the encoded representation may be fetched during the read operation, carried forward in a pipeline or shift register, and then used when the later write operation is received.

Figure 12B:
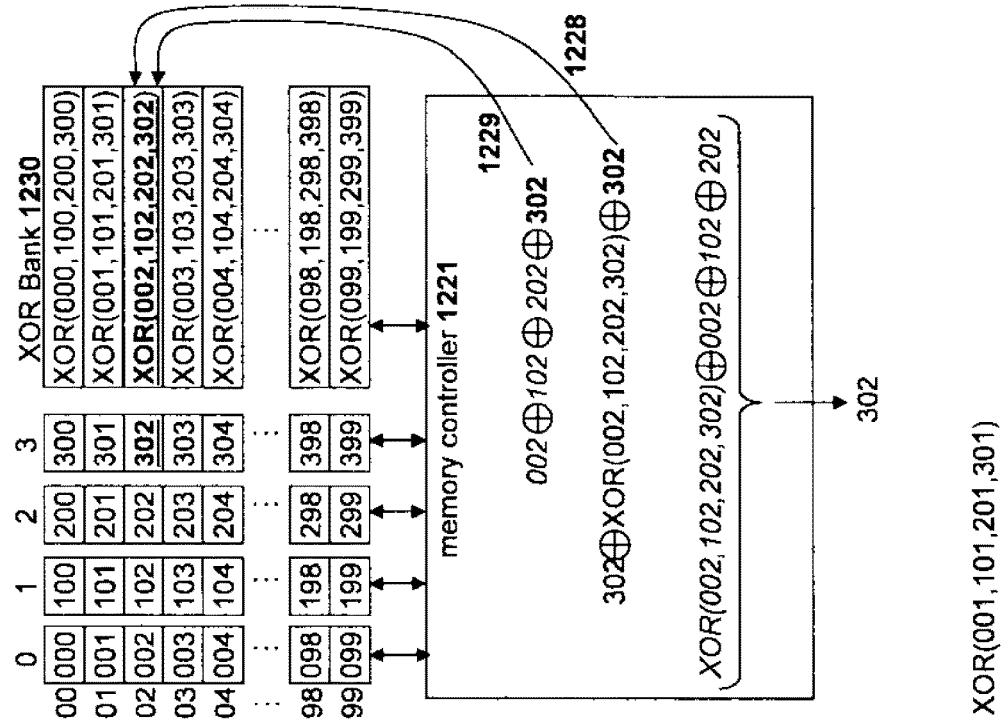
FIG. 12B illustrates the algorithmic memory block of FIG. 12A after handling the read and write operations.
Figure 12A:
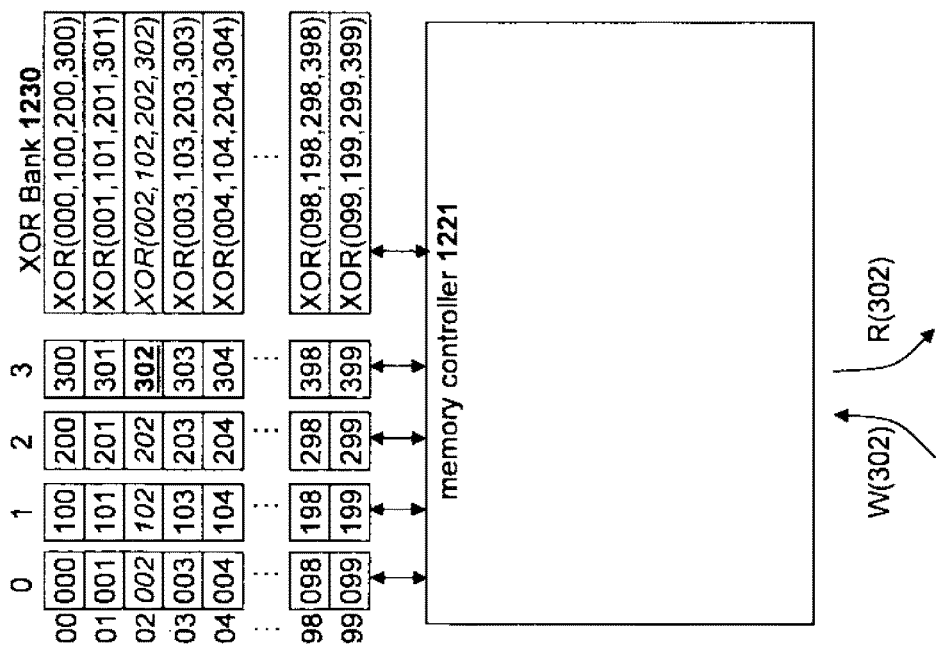
FIG. 12A illustrates an algorithmic memory block using the teachings of FIG. 7 receiving a read operation for address 302 and a write operation for same address 302 wherein both operations are associated with an update operation.

There are a few different cases that must be considered with an update memory system. Each case will be illustrated with an example. FIG. 12A illustrates a first case to consider wherein a read operation and a write-back operation (from two different update operations a few cycles apart) are being handled in the same cycle both target the same address. This is a potential a memory bank conflict since the same address is obviously within the same memory bank.

To handle the read operation, the memory controller 1221 reads the 02 row of the XOR bank 1230 and the other data values in the 02 row (addresses 002, 102, and 202) and then combines those values to retrieve the current data value of address 302. Specifically, the memory controller 1221 combines XOR(002,102,202,302) with the data values from addresses 002, 102, and 202 to obtain the requested data from address 302. This is illustrated in FIG. 12B wherein the memory controller 1221 calculates the value of XOR(002, 102,202,302)⊕ 002 ⊕ 102 ⊕ 202 to return the data for address 302.

The memory controller 1221 handles the write operation using state data that has been carried forward from an earlier read operation to the same address. Specifically, the state information that is carried forward is the old data value for the target address and the value of the associated row of the XOR bank 1230. Thus, for the example of FIG. 12A wherein the write is directed to address 302, the memory controller 1221 would carry forward the old data value for address 302 and the 02 row entry of the XOR bank 1230 (which is XOR(002,102,202,302)). To create the new entry for the XOR bank 1230, the memory controller 1221 XORs together the carried-forward old data value for address 302, the carried forward XOR(002,102,202,302) value, and the new data value for address 302 to create a new XOR(002, 102,202,302) value. The memory controller 1221 writes this newly created XOR(002,102,202,302) value into the 02 row entry of the XOR bank 1230 as illustrated by line 1228 in FIG. 12B. The memory controller 1221 also writes new data value for address 302 directly into the address 302 location in the main memory bank. Thus, to handle the write into address 302, the memory controller only needs to perform two write operations: a write of the primary representation into the address 302 location and a write of the secondary (encoded) representation of the address 302 data into the 02 row entry of the XOR bank 1230.

Note that in the example of FIG. 12A, the XOR(002,102, 202,302) value that is carried forward in the pipeline from the read operation may change before it is used with a subsequent write operation. For example, between the time the data value for address 302 was read and the time that a new data is written into address 302, the data value for address 102 may have changed. If this occurs, then simply using the XOR(002,102,202,302) value from when the original read occurred would result in an outdated value for address 102 within the XOR(002,102,202,302) value. To prevent this situation, the pipeline that carries data forward must propagate changed data values to later pipeline stages such that the data remains coherent. Thus, when the write operation changes a data value that is represented in later pipeline station (such an XOR bank entry being carried forward), that data value (such as an XOR bank entry) must be updated to reflect the new data value.

There are variations of implementing the data carry forward system. For example, in some implementations, the memory controller may carry forward the data values for all of the memory bank entries in the same row instead of carrying forward the XOR bank entry. In the case of the read operation to address 302 illustrated in FIG. 12A, the memory controller 1221 could carry forward the data values for addresses 002, 102, and 202. Then, to create the new 02 row entry for the XOR bank 1230 at the time of the write-back, the memory controller 1221 would then XOR together the new data value for address 302 with the carried-forward data values for addresses 002, 102, and 202. This is illustrated in FIG. 1213 with line 1229. Note that if the other data values (002, 102, or 202) changed with a write before the write-back for address 302 occurs then those data values being carried in the pipeline should also be changed.

FIGS. 12C and 12D illustrates a second case to consider wherein a read to address 104 and a write-back operation to address 302 target different addresses in different memory banks. In the case of FIGS. 12C and 12D, the write to address 302 is handled in the same manner. Specifically, the memory controller writes the new data for address 302 directly into address 302 and uses carry-forward data to create a new row 02 entry for the XOR bank 1230. As illustrated in FIG. 12D, the row 02 entry for the XOR bank 1230 can be created using a carried forward 02 row XOR bank entry as illustrated by line 1228 or the row 02 entry for the XOR bank 1230 can be created using carried-forward data values from the same memory bank row (data from addresses 002, 102, and 202) as depicted by line 1229.

The memory controller 1221 can handle the read from address 104 by simply reading the data value directly from address 104 and responding with the data as depicted in FIG. 12D. However, the memory controller 1221 will also access other information from the 04 row to obtain needed carry-forward information. In an embodiment that carries the XOR bank entry value, the memory controller 1221 would only accesses the row 04 entry of the XOR bank 1230 to obtain the XOR(004,104,204,304) value. In an embodiment that carries the data values from the other memory banks forward, the memory controller 1221 would also read the 004 and 204 data values. The memory controller 1221 would calculate the data value for address 304 by combining the XOR(004,104,204,304) value with the data values of addresses 004, 104, and 204 with an XOR operation.

Figure 12F:
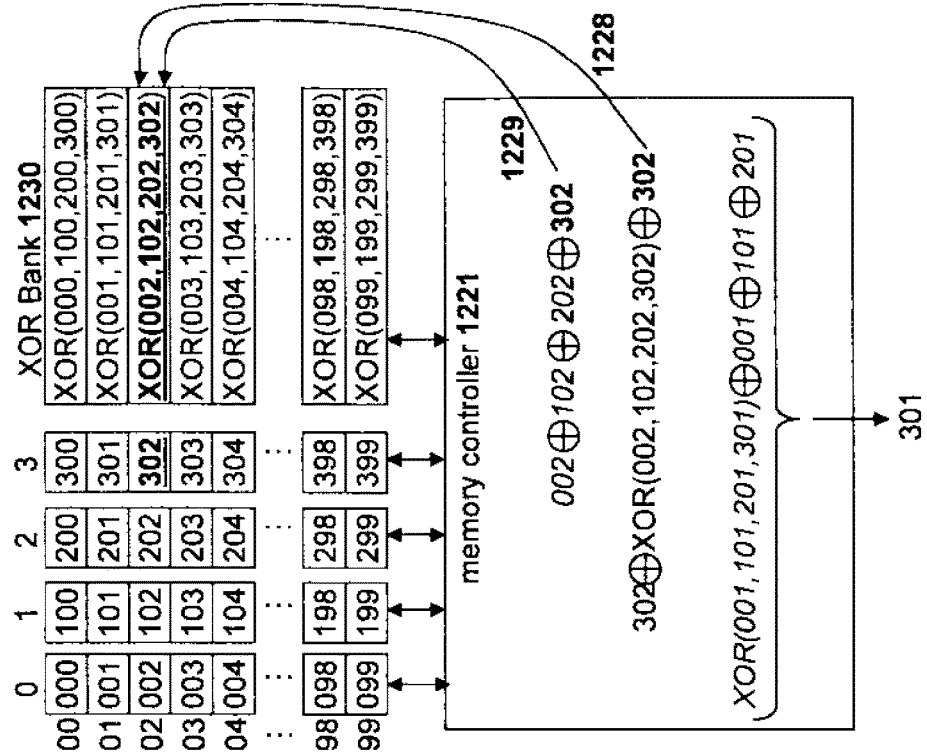
FIG. 12F illustrates the algorithmic memory block of FIG. 12E after handling the read and write operations.
Figure 12E:
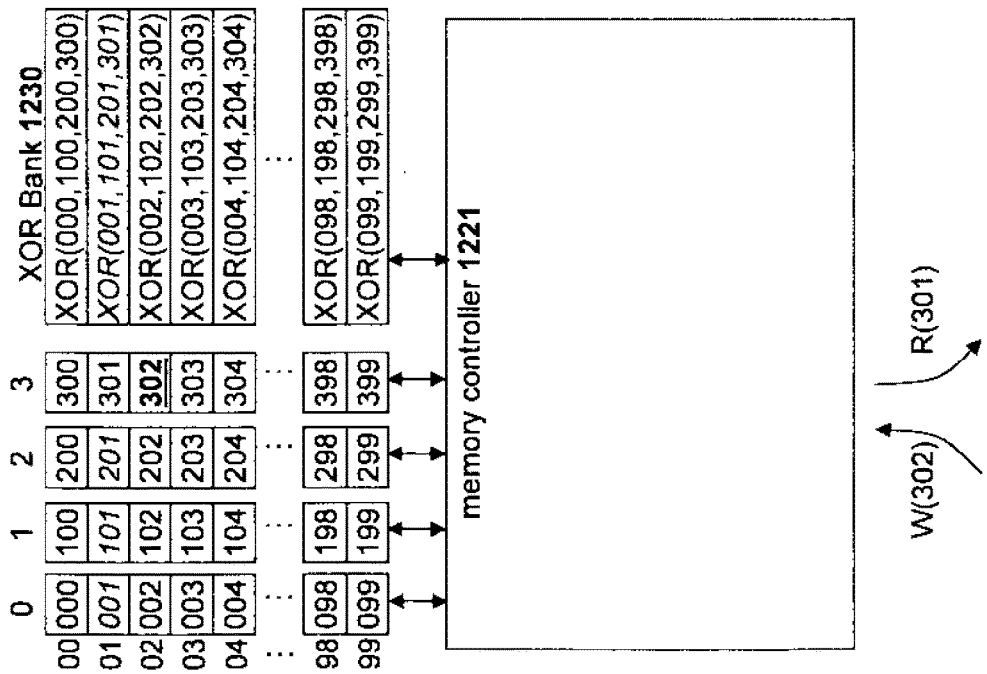
FIG. 12E illustrates an algorithmic memory block using the teachings of FIG. 7 receiving a read operation for address 301 and a write operation for same address 302 wherein both operations are associated with an update operation.

FIGS. 12E and 12F illustrates a third case wherein a read to address 301 and a write-back operation to address 302 target different addresses in the same memory bank. In the case of FIGS. 12E and 12F, the write to address 302 is handled with the carry-forward state information from the earlier read operation in the same manner as set forth in the previous two cases. To handle the read operation, the memory controller 1221 reads the row 01 entry of the XOR bank 1230 and the other data values from the 01 row (addresses 001, 101, and 201). The memory controller 1221 generates the requested address 301 data value by XORing together the row 01 entry of the XOR bank 1230 with data values from addresses 001, 101, and 201 as illustrated in FIG. 12F. The memory controller 1221 then carries the row 01 entry from the XOR bank 1230 and/or the data values from addresses 001, 101, and 201 for use with the subsequent write-back operation.

Figure 13:
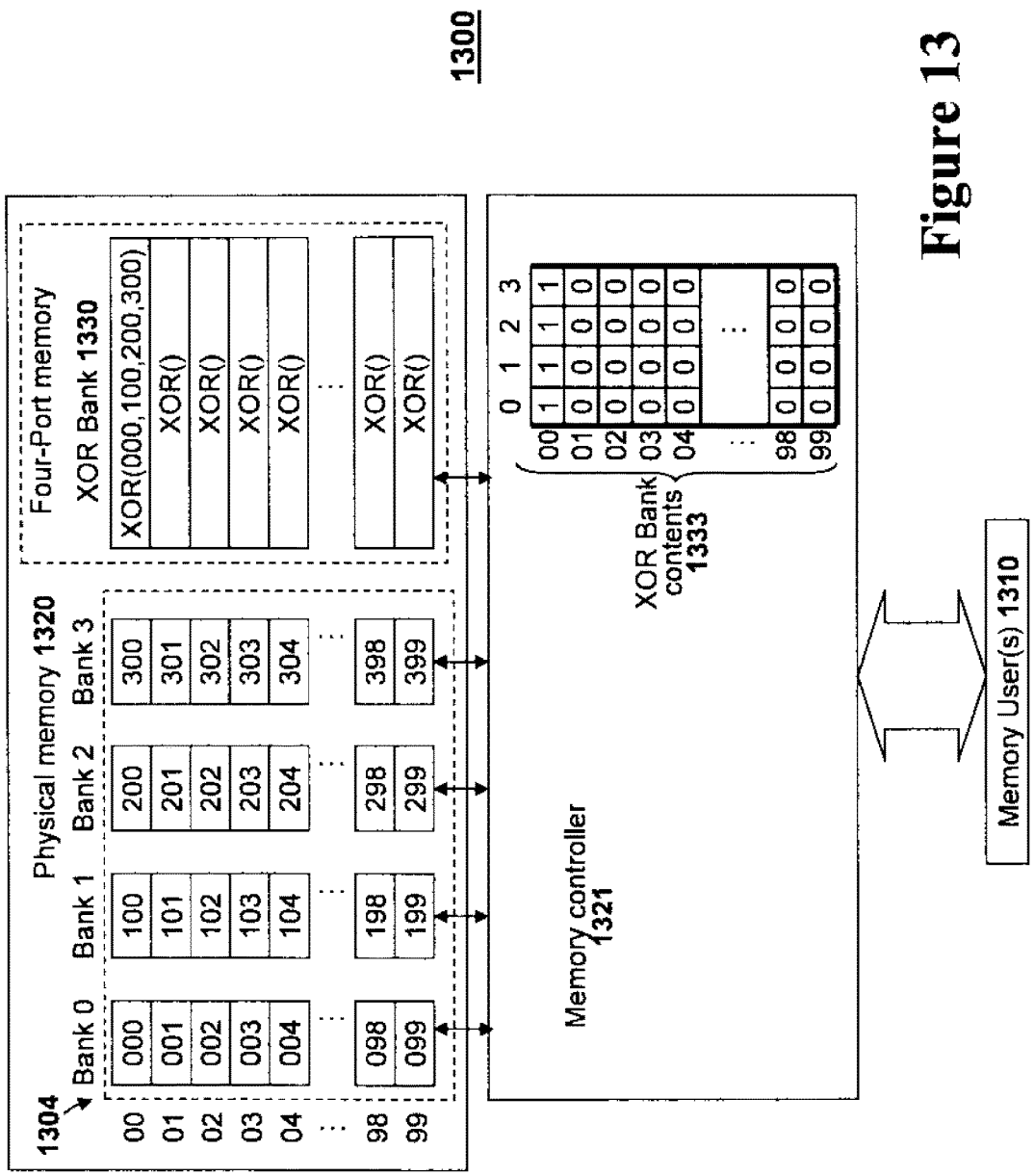
FIG. 13 illustrates an algorithmic memory block for handling read, read-clear, and write operations.

Algorithmic Memory System 8: An Additional XOR Bank to Obtain 2X performance (1R and 1W) But Does Not Allow Overwrites In the XOR-based algorithmic memory block disclosed in FIGS. 9K and 9L that was able to handle a simultaneous read operation and write operation, the memory system used two-memory cells to read an existing data value from a main memory bank location before writing in the new data value. The two-port memory needed in the main memory banks that would allow such a feature is uses more lay out area and thus reduces the bit density of the memory system. It would be desirable to have another method of being able to perform a simultaneous read and write without requiring two-port memory. FIG. 13 discloses such an XOR-based algorithmic memory block that can handle a simultaneous read operation and write operation using single port memory in the main memory banks. However, the XOR-based algorithmic memory block 1300 of FIG. 13 does impose a specific use restriction on the memory system that must be followed as will be set forth below.

As illustrated in FIG. 13, a set of addresses 000 to 399 are stored into a set of main memory banks 1304 wherein each memory bank is associated with addresses having a particular digit of the memory address. As with the previous XOR-based system, the XOR-based algorithmic memory block 1300 also includes an XOR memory bank 1330 that stores an exclusive-OR encoded version of all the data that has been written into the corresponding rows of all the main memory banks. However, the XOR-based algorithmic memory block 1300 also includes a new data structure, a small XOR bank contents table 1333. The XOR bank contents table 1333 keeps track of which addresses in the main memory bank area 1304 currently have valid data represented in the XOR bank 1620. Thus, the XOR bank contents table 1333 is a memory array that has the same number of individually addressable elements as the main memory banks 1304 but only contains a single bit entry for each element in the memory array.

To simplify the task of keeping the XOR memory bank 1330 updated, the XOR-based algorithmic memory block 1300 of FIG. 13 imposes a restriction that forbids a user from writing new data into an address if the memory system already has valid data stored in that particular memory address. With this usage restriction, when a new write operation is received, the memory controller 1321 does not need to remove the participation of the old data from the XOR memory bank 1330 when a new write operation is received since there is no old data in the XOR memory bank 1330 for that address.

To handle a write operation, the memory controller 1321 merely needs to write the new data into the target address in the main memory array 1304 and update the representation in the XOR memory bank 1330 with the new data. Since there not any valid data from that target address currently represented in the corresponding row entry in the XOR memory bank 1330, the memory controller 1321 can simply read the appropriate XOR memory bank entry, XOR in the new data value, and then write that updated encoded representation back into XOR memory bank entry. Note that a four-port memory is used to implement the XOR bank 1330 since a read and a write to the same memory bank will both require access to the XOR bank 1330, however the main memory banks 1304 will not require multi-port memory circuits.

To allow target addresses to be cleared such that new data can be written, the XOR-based algorithmic memory block 1300 implements two different types of read operations: A normal read operation and a read-clear operation. The normal read operation simple reads the data and provides the data to the requestor as done in the previous implementations. The read-clear operation reads the data, provides the data to the requestor, and then removes the representation of that data from the XOR bank 1330. To implement such different read operations, the memory device could use a signal line to the memory device that specifies if a read operation is a normal read operation or a read-clear operation.

The read-clear operation reads the requested data, removes the representation of that data from the corresponding row of the XOR bank 1330, and then clears the associated flag in the XOR bank contents table 1333 to indicate that the XOR bank 1330 no longer contains a representation of the data for that particular memory address. If the XOR-based algorithmic memory block 1300 receives a read operation for a target address that is marked in the XOR bank contents table 1333 as not containing valid data, then the memory controller 1321 will indicate a memory fault since it cannot always provide valid data in such instances. This case should never happen since if an address is not represented in the XOR bank 1330 then that address must have received a "read-clear" operation earlier or never had valid data stored in it. Thus, a properly designed system should not be reading from that memory address since the memory location will only contain a junk value.

When a read request (either normal or read-clear) and a write request are received which do not cause a memory bank conflict occurs, then the read request and write operations can occur simultaneously in the two independent main memory banks. However, if the read operation is a read-clear operation, then the read-clear operation and the write operation will both need to access the XOR bank 1330. As set forth above, the write operation must always access the XOR bank 1330 in order to add the XOR encoded data into the XOR bank 1330. When the read operation is a read-clear operation then the read-clear operation will also have to access the XOR bank 1330 to remove the XOR representation of the data from the XOR bank 1330. Since both the read operation and the write operation may need read, modify, and write the XOR bank 1330; the XOR bank must support two read operations and two write operations in a single memory cycle. Thus, the XOR bank 1330 may need to be a 4-ported memory device.

When a read and write operation both address data values in the same main memory bank then a potential memory bank conflict does occur. To handle this, the memory write operation is given priority to access the memory bank in the main memory 1304 since it must write the new data into that address. (This is referred to as an "inverted XOR" operation, since the read is done indirectly using the rest of the memory banks and the XOR bank, rather than directly from the memory bank; even though the memory bank has no read to read conflicts.) In addition, the write operation must also update the corresponding location in the XOR bank 1330.

The memory read operation (which cannot access the same bank in the main memory 1304 that the write operation is accessing) is handled by retrieving the corresponding XOR coded version from the XOR bank 1330. Specifically, the memory controller reads the appropriate row entry from the XOR bank 1330, reads the data from the corresponding row in the other memory banks that have valid data encoded in the entry from the XOR bank 1330, and then decodes the XOR coded version to obtain the requested data. Note that the XOR bank contents table 1333 is used to select only those memory banks that currently have valid data in the corresponding row of the XOR bank 1330. If this is a normal read for this memory location, then the corresponding location in the XOR bank 1330 may remain unchanged. However, if this is a read-clear operation, then the memory controller 1321 must write back an XOR encoded version that only contains the data from the other memory banks that still have valid data in that row.

Examples of the operation of this particular XOR-based algorithmic memory block 1300 are set forth with reference to FIGS. 14A to 14F. FIG. 14A illustrates the memory system in an empty initial state. The memory system depicted in FIG. 14A must receive at least one write operation before it receives any read operations. FIG. 14A depicts the memory system receiving first write operation into the memory system addressed to address location 302. The memory controller 1421 writes the data into memory location 302 in the main memory and XORs the data into the same row of the XOR bank. Since the XOR bank 1430 was empty, the 02 row in the XOR bank 1430 will end up containing the same data that was written to address 302. The memory controller 1421 then updates the XOR Bank contents table 1433 to indicate that the 02 row of the XOR bank 1430 now contains valid data from main memory bank 3 (XOR bank 1430 now contains valid data for address 302). The final state after the write to address location 302 is illustrated in FIG. 14B.

Figure 14B:
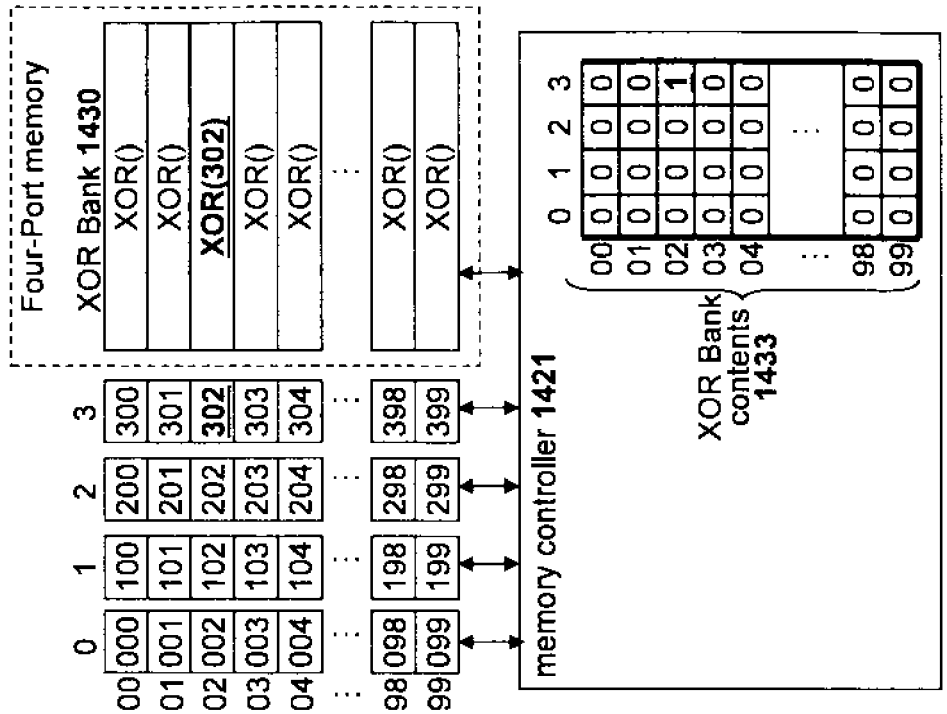
FIG. 14B illustrates the algorithmic memory block of FIG. 14A after handling the write operation.
Figure 14A:
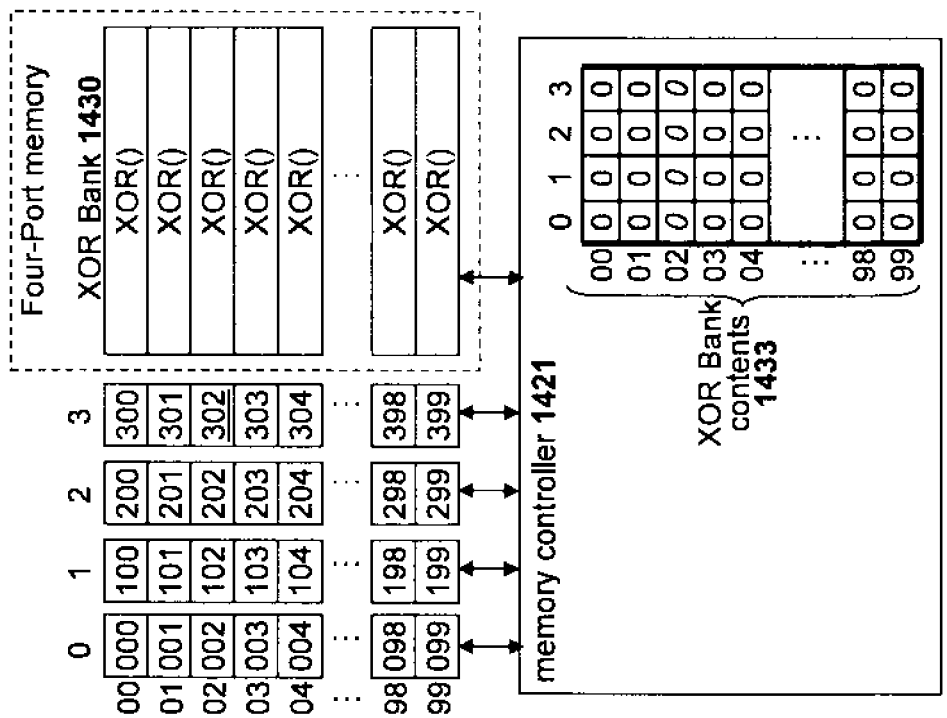
FIG. 14A illustrates an algorithmic memory block using the teachings of FIG. 13 receiving a write operation for address 302.
Figure 14D:
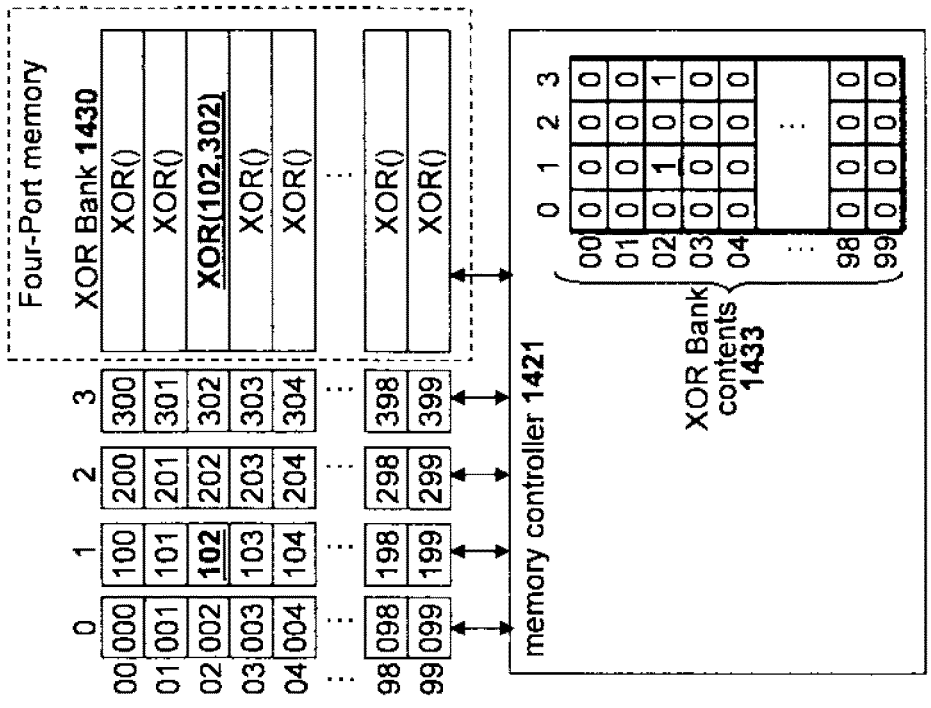
FIG. 14D illustrates the algorithmic memory block of FIG. 14C after handling the write operation.
Figure 14C:
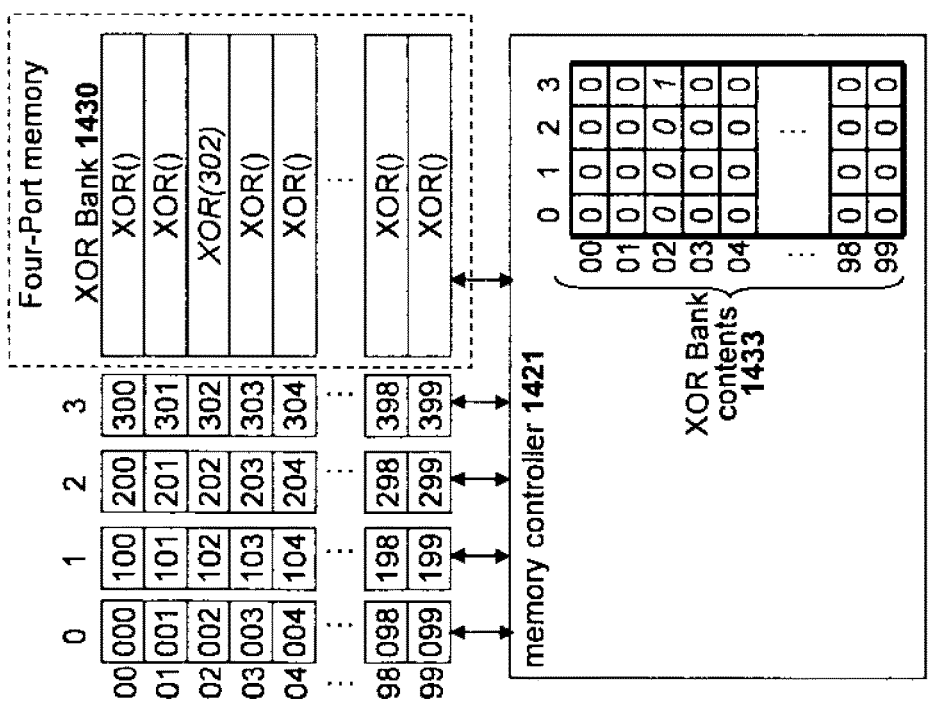
FIG. 14C illustrates the algorithmic memory block of FIG. 14B receiving a write operation for address 102.
Figure 14F:
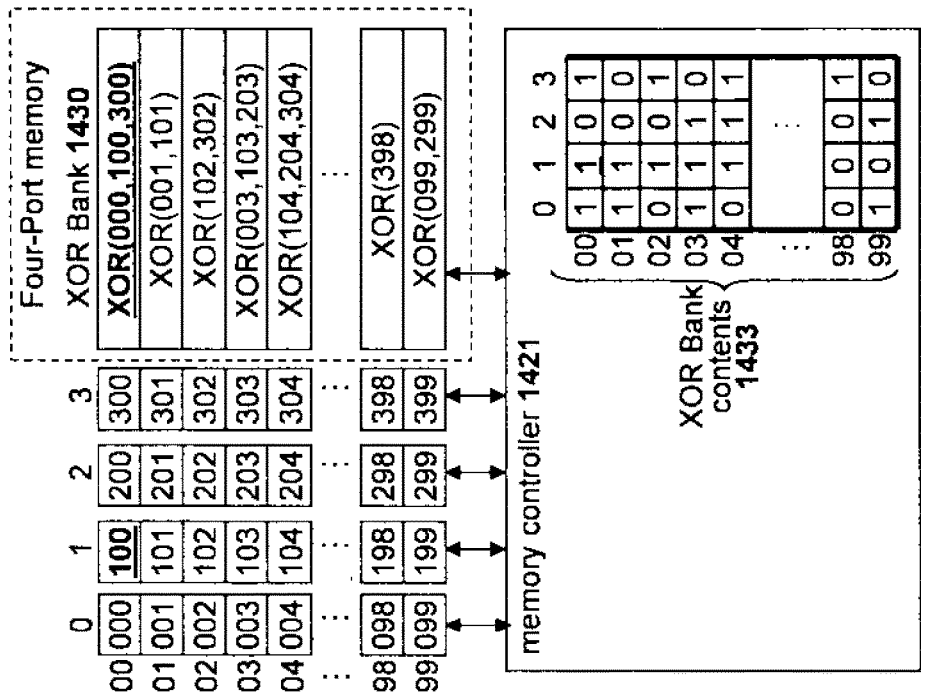
FIG. 14F illustrates the algorithmic memory block of FIG. 14E after handling the write operation and the read operation if the read operation was a normal read operation.

FIG. 14C illustrates the memory system with the state from FIG. 14B receiving a subsequent write to address 102. The data is written into the 102 location of the main memory and the XOR bank 1430 is also updated. Specifically, row 02 of the XOR bank 1430 is read, combined with the new data written to address 102 using an XOR operation, and then written back into row 02 of XOR bank 1430. The XOR Bank contents table 1433 is also updated to reflect that row 02 of the XOR bank 1430 now contains both data from bank 1 and bank 3. The final state of the XOR-based algorithmic memory block after the write to address 102 is illustrated in FIG. 14D.

Figure 14E:
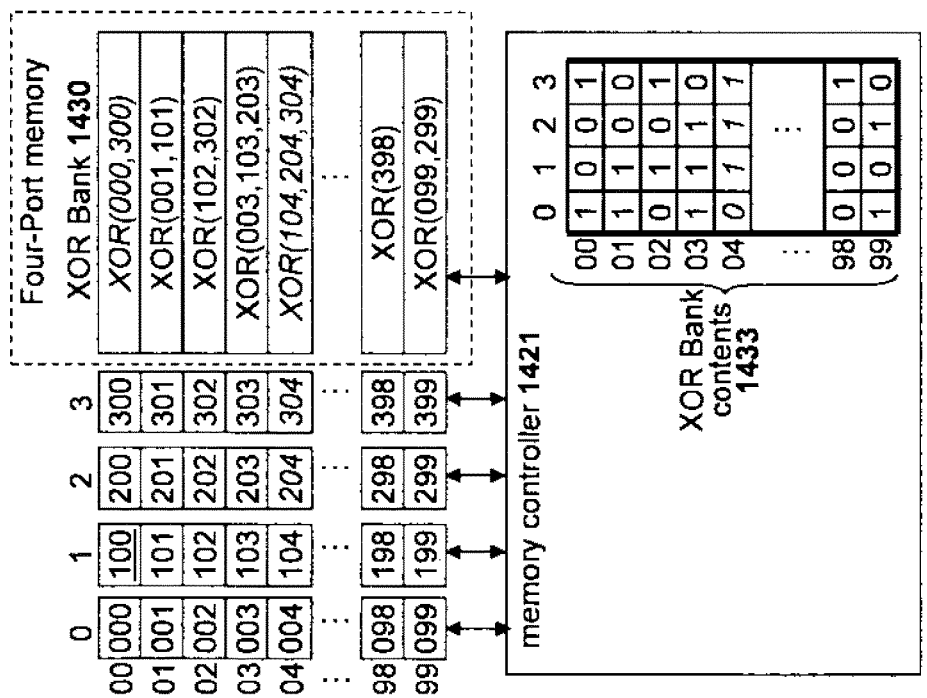
FIG. 14E illustrates an algorithmic memory block using the teachings of FIG. 13 receiving a write operation for address 100 and a read operation for address 104.

The XOR-based algorithmic memory block will continue to fill up in this manner. FIG. 14E illustrates an example state of the memory system after more data has been added. The system of FIG. 14E may then receive a write to address 100 and a read from address 104 simultaneously as illustrated. In this inverted XOR system, the write operation is given priority and the data associated with the write operation is written into address 100 in the main memory bank (as indicated by the underlined 100 in the main memory bank). To update the XOR bank 1430, the memory controller 1421 reads the 00 row from the XOR bank 1430, XORs the data value written to address 100, and then writes the result back to the 00 row of the XOR bank 1430. Finally, the XOR bank contents table 1433 must also be updated. The memory controller 1421 sets the bit in the XOR bank contents table 1433 to indicate that the row 00 of the XOR bank 1430 now also contains data from memory bank 1 (address 100 now has valid data in the XOR bank 1430).

The read from address 104 cannot handled by reading the data directly from address 104 in the main memory due to a bank conflict with the write to location 100. So the read must be handled using the XOR bank 1430 and the other main memory banks. The memory controller first reads row 04 of the XOR bank contents table 1433 to identify which main memory banks have data represented in row 04 of the XOR bank 1430. Row 04 of the XOR bank contents table 1433 specifies that banks 1, 2, and 3 (addresses 104, 204, and 304) all have data XORed in row 04 of the XOR bank 1730. At this point, if the row 04 entry of the XOR bank contents table 1433 had indicated that address 104 did not contain valid data then the memory system should issue a memory fault response since the requestor is requesting data from an address that does not contain any valid data. But in this situation, the XOR bank contents table 1433 indicates that address 104 does have valid data represented in row 04 of the XOR bank 1730.

To retrieve the data for address 104, the memory controller 1421 reads row 04 of the XOR bank 1430 and the data values from the other banks (banks 2 and 3) that have data represented in row 04 of the XOR bank 1430. In this case banks 2 and 3 have valid data in row 04 of the XOR bank 1430 such that the memory controller 1421 reads the data in address 204, the data in address 304, and row 04 of XOR bank 1430. The data values read from these three locations are XORed together to obtain the original data from address 104 that is used to respond to the read request. If the read operation was a normal read operation, then the read operation would be complete at this point.

Figure 14G:
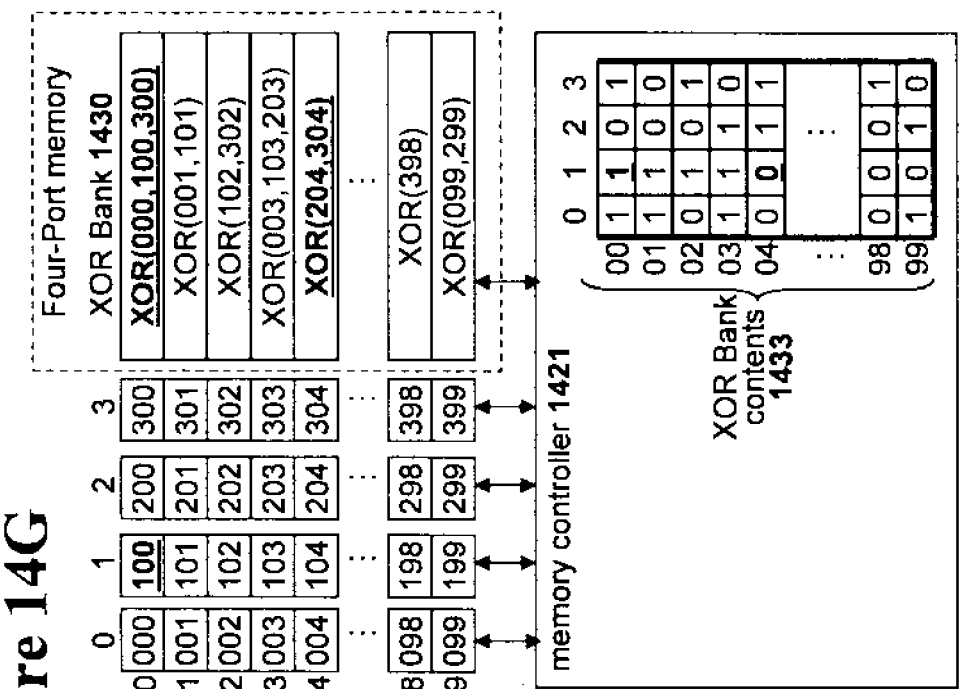
FIG. 14G illustrates the algorithmic memory block of FIG. 14E after handling the write operation and the read operation if the read operation was a read-clear operation.

If the read operation was instead a read-clear operation, then the memory controller 1421 needs to remove the data associated with address 104 from the XOR bank 1430. FIG. 14G illustrates the effect of such a read-clear operation. The memory controller 1421 may perform this by XORing the data value for address 104 with the original value read from row 04 of the XOR bank XR30 to remove the data associated with address 104 and then writing that value back to the XOR bank 1430. The memory controller 1421 must also clear the bit in address 104 location in the XOR bank contents table 1433 to indicate that the data from address 104 is no longer represented in the XOR bank 1430. The final result after the write to address 100 and a read-clear operation of FIG. 14E is the state illustrated in FIG. 14G.

As set forth above, the memory controller always removes data from the XOR bank after a read-clear operation (whether the data is read from the main memory bank or the XOR bank) such that a subsequent write operation can easily update the encoded XOR representation in the XOR bank without needing to remove old data. In an alternate embodiment there is only a read-clear operation such that the memory controller removes the representation from the XOR bank after every read operation. Such an implementation is referred to as a "read once" memory system since each data item can only be read once.

The XOR system disclosed with reference to FIGS. 13 to 14G has features that make it advantageous in some applications but less than ideal in other applications. The fact that normal single port memory can be used to implement the main memory bank is very important. However, this comes at the cost of requiring a user to issue a read-clear operation before a subsequent write may be received for that address. However, this is not a difficult restriction to follow. As with the other XOR-based memory systems, this XOR-based system is not ideal for wide data values since parallel data paths from all of the different memory banks (including the XOR bank) must be routed to the memory controller in order to use the XOR bank properly.

In an alternate embodiment, the memory system may handle write operation with two memory cycles. In such an embodiment, the memory system would read the old data value in the first memory cycle and update the XOR entry in the second memory cycle.

Combining Algorithmic Memory Blocks

The preceding sections disclosed a set of different algorithmic memory blocks that each have various unique capabilities and various restrictions. By combining these different types of algorithmic memory blocks in various hierarchical arrangements that take advantage of the capabilities and restrictions of each algorithmic memory block then complex memory systems can be constructed that have capabilities greater than the individual lower level memories. Thus, a synergistic effect is achieved since the capabilities of whole (the complex hierarchical memory system) is greater than the sum of its parts (the individual algorithmic or fundamental memory blocks).

Several examples will be provided to show the reader several possible combinations of algorithmic or fundamental memory blocks. However, these are only presented as examples and various other combinations of algorithmic memory blocks and fundamental memory blocks may also be created as will be apparent to those skilled in the art.

A First 2 Read and 2 Write Memory Implementation

In all of the algorithmic memory blocks disclosed in the previous sections, none of the algorithmic memory blocks was capable of handling multiple read operations and multiple write operations simultaneously. Some algorithmic memory blocks could handle multiple write operations by using extra banks but only one simultaneous read operation could be handled. Other algorithmic memory blocks could handle multiple read operations by adding extra XOR banks but could only handle one write operation. If one combines the teachings from these various algorithmic memory blocks in a hierarchical manner then one may construct a complex memory system that can handle both multiple read operations and multiple write operations simultaneously. This section will disclose a first complex memory system that may handle two read operations and two write operations simultaneously.

Figure 15A:
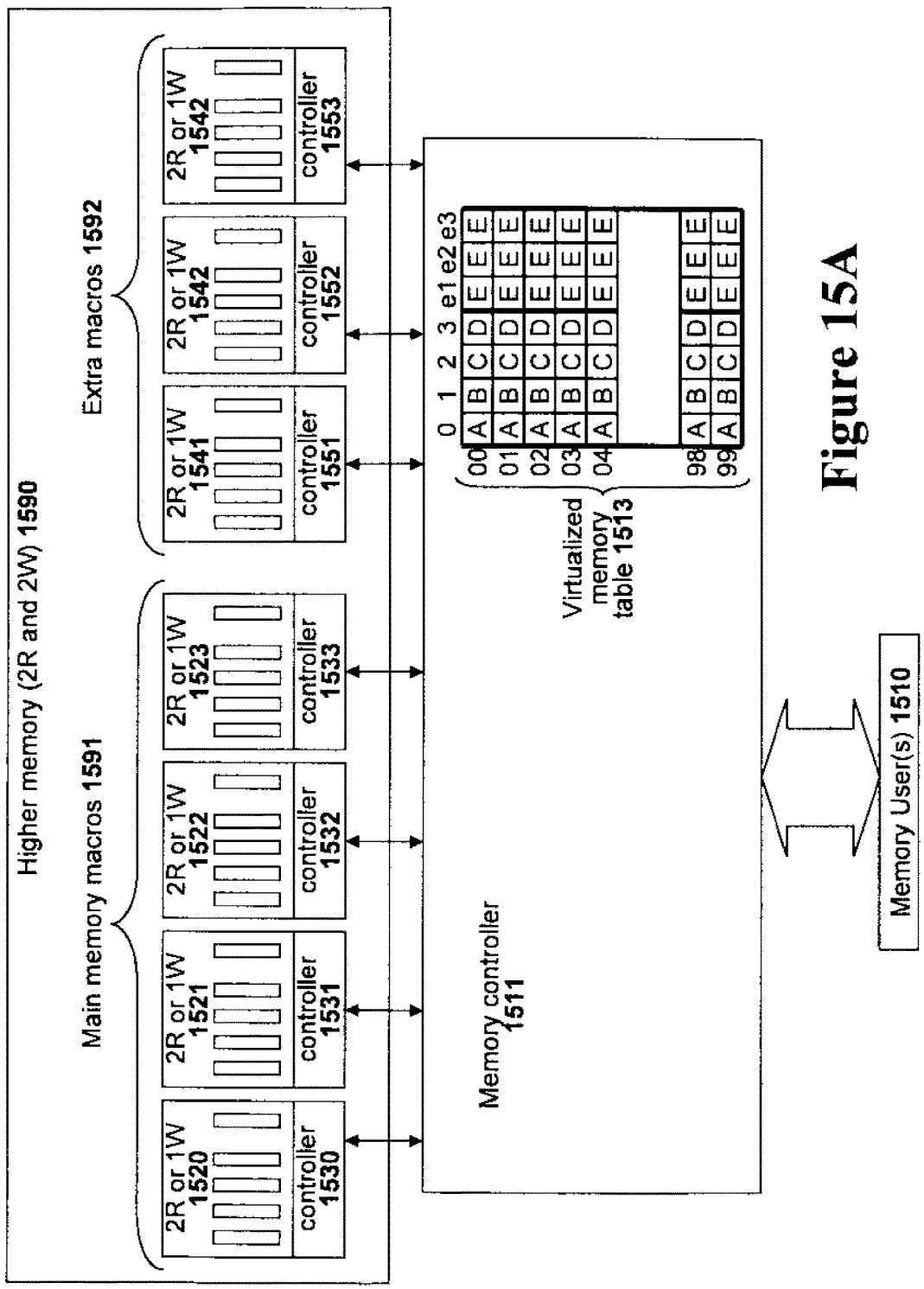
FIG. 15A illustrates a first embodiment of a hierarchical memory system that can handle two simultaneous read operations and two simultaneous write operations.

FIG. 15A illustrates first example of a complex memory system that combines algorithmic memory blocks from the previous sections in a hierarchical manner. In the hierarchical memory system of FIG. 15A, several algorithmic memory blocks are organized into a hierarchical arrangement that allows the hierarchical memory system to perform two simultaneous read operations and two simultaneous read operations. Specifically, a high-level algorithmic memory block that can handle one read operation and two simultaneous write operations is implemented on top of lower-level algorithmic memory blocks that can handle two simultaneous read operations or one write operation. The hierarchical combination of these two different algorithmic memory blocks creates a memory system that can handle two simultaneous read operations and two simultaneous read operations (2R2W).

Since the present disclosure constructs complex hierarchical memory systems, the terminology must be used carefully. This document will refer to multiple instances of particular algorithmic memory blocks as 'memory macros'. The actual memory banks within a memory macro may be constructed with fundamental memory blocks or with other algorithmic memory blocks (that can also be referred to as memory macros).

Referring to FIG. 15A, a first high-level organization implements an algorithmic memory block that can handle one read operation and two simultaneous write operations. In the system of FIG. 15A, the algorithmic memory block from the earlier section "Memory System 2" is used to achieve this goal. This organization is achieved with a set of main memory macros 1591 for storing data, a set of three extra memory macros 1592, and a memory controller 1511. The memory controller 1511 implements the extra-memory-banks technique to handle simultaneous write operations. Specifically, when the memory controller 1511 receives a set of read and write operations addressed to the same memory macro (in the set of main memory macros 1591) thus causing a potential conflict then the memory controller 1511 moves any potential conflicting write operations to a new memory macro and remaps the new location of the written data items in the virtualized memory table 1513. Thus, this first algorithmic memory block organization allows the hierarchical memory system of FIG. 15A to handle two simultaneous write operations. (Note that three extra memory macros can be used to handle three extra write operations, however only two extra write operations are handled by this memory system. The reason why three extra memory macros are required will be explained below.)

To handle two simultaneous read operations, the main memory macros 1591 and the extra memory macros 1592 are each implemented with algorithmic memory blocks designed to handle 2 simultaneous read operations or 1 write operation (2R or 1W) such as the "Memory System 4" algorithmic memory blocks. Specifically, memory macro blocks 1520, 1521, 1522, 1523, 1541, 1542, and 1543 can each handle two simultaneous read operations or one write operation. Each of the memory macro blocks 1520, 1521, 1522, 1523, 1541, 1542, and 1543 includes its own memory controller 1530, 1531, 1532, 1533, 1551, 1552, and 1553, respectively. These memory controllers in each memory macro block implement the XOR-based algorithmic memory block technique used to provide the capability of handling two simultaneous read operations or one write operation. Thus, each individual memory macro in the higher memory organization (made up of main memory macros 1591, extra memory macros 1592, and memory controller 1511) can handle two simultaneous read operations or one write operation.

Since the high level algorithmic memory block organization (of main memory macros 1591 and extra memory macros 1592) can handle two simultaneous write operations and the lower-level algorithmic memory blocks (memory macro blocks 1520, 1521, 1522, 1523, 1541, 1542, and 1543) can handle two simultaneous read operations, the overall hierarchical memory system 1590 of FIG. 15A is thus capable of handling two simultaneous write operations and two simultaneous read operations. The following paragraphs set forth various different cases of handling two read and two write operations.

In a trivial case, the two read and two write operations received simultaneously all address different 'memory macros of the main memory macros 1591 and extra memory macros 1592. In such cases there are no potential memory conflicts at all such that each addressed memory macro can handle a memory access independent of the other memory macros.

When one of the write operations has a potential memory conflict with one of the other memory operations (either a read or write), then the memory controller 1511 will examine the virtualized memory table 1513 to locate a free memory macro for that write operation thus avoiding the conflict. The memory controller 1511 then executes the write operation into the free macro and then re-maps the address for that write operation to the new memory macro that was used to handle the write operation.

One particular difficult case is when all of the memory operations (two simultaneous read operations and two simultaneous write operations) are all directed at the same memory macro. For example, if all four memory operations are addressed to memory macro 1522 (in the higher level main memory macros 1591) then the two read operations may be handled by memory macro 1522 directly since the memory macro is constructed with an algorithmic memory block capable of handling two simultaneous read operations. (Memory macro 1522 must handle both of the read operations since memory macro 1522 is the only place where the addressed data is stored.) However, the write operations must be directed elsewhere since the memory macro 1522 can only handle two read operations or one write operation.

To handle the write operations, the memory controller 1511 will consult the virtualized memory table 1513 to identify two free memory macros that can handle the two write operations. The memory controller 1511 then re-maps the addresses of those write operations to the identified free memory macros to avoid the potential memory conflict. For example, the memory controller 1511 may re-map the first write operation into extra memory macro 1541 and the re-map the second write into extra memory macro 1542. In this manner, the memory system 1590 simultaneously handled two read operations and two write operations addressed to memory macro 1522 by handling both read operations with memory macro 1522 directly, remapping a first write operation to extra memory macro 1541, and remapping a second write operation to extra memory macro 1542. (Note that the location of the free memory macros will differ based upon the current state of the virtualized memory mapping table.)

Figure 15B:
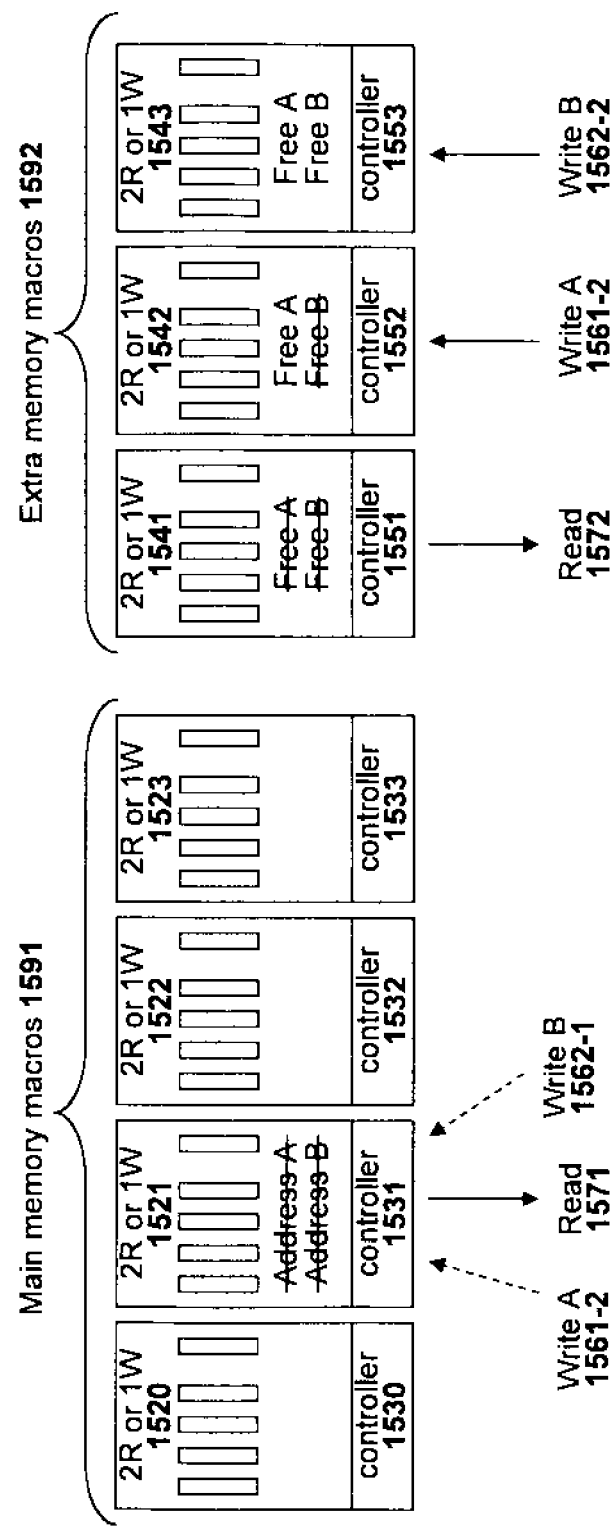
FIG. 15B illustrates how the hierarchical memory system of FIG. 15A avoids memory bank conflicts.

FIG. 15B illustrates one particular difficult case that may be solved with the third extra memory macro (in extra memory macros 1592). In the example of FIG. 15B, a first read operation 1571, a first write operation 1561-1, and a second write operation 1562-1 are all directed to the same memory macro 1521. Since the data value requested by the read operation 1571 is only stored in that one memory macro 1521, the memory controller must access memory macro 1521 to service the read operation 1571. And since the memory macro 1521 can only handle two read operations or a single write operation, the memory controller must redirect the two write operations to different memory banks.

In this example, the memory table in memory controller designates extra memory macros 1541, 1542, and 1543 as the alternate memory macros for handling the write operations. However, the second read operation 1572 is directed at memory macro 1541 such that memory macro 1541 cannot be used to handle either of the write operations. Thus, the memory controller uses memory macro 1542 to handle first write operation 1561-2. Finally, the memory controller uses memory macro 1543 to handle second operation 1562-2.

As illustrated in the example of FIG. 15B, the two read operations (1571 and 1572) may block two of the available memory macros for handling the write operations. And each memory macro can handle only a single write operation. Thus, four different memory macros must be available for each write operation, so that a second write operation can access a memory macro that is not being used by any of two read operations or the first write operation. This is why the hierarchical memory system 1590 of FIG. 15A uses three extra memory macros 1592 (extra memory macros 1541, 1542, and 1543) instead of just two extra memory macros to handle the two write operations.

Note that other techniques may also be used to handle this issue of requiring four available locations to write data values. For example, an alternate implementation may use a cache memory within the memory controller to cache write operations instead of using an extra memory macro. The teachings of the Provisional Patent Application entitled "SYSTEM AND METHOD FOR REDUCED LATENCY CACHING" filed on Dec. 15, 2009 having Ser. No. 61/284,260 may be used to implement a cache system.

Figure 15C:
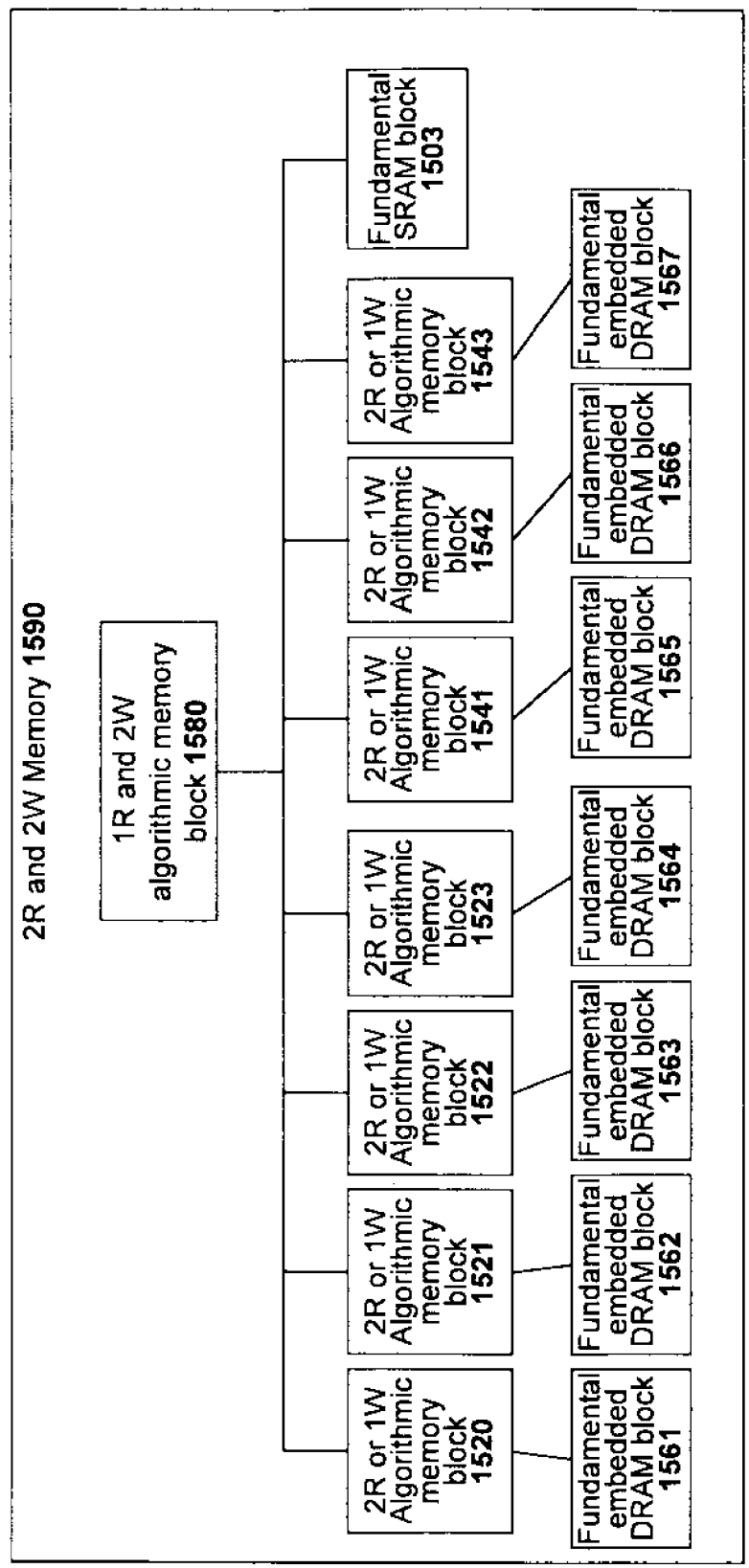
FIG. 15C conceptually illustrates the hierarchical memory organization of the hierarchical memory system of FIG. 15A.

FIG. 15C illustrates a conceptual hierarchical block diagram of the various memory components used to construct the hierarchical memory system 1590 of FIG. 15A. Recall that each algorithmic memory block must be implemented with other lower level algorithmic memory blocks or lower level fundamental memory blocks. And fundamental memory blocks must be used to implement all of the 'leaf memory blocks.

In FIG. 15C, the overall high-level memory design is a memory system 1590 that handles two simultaneous read operations and two simultaneous write operations. To implement these features, a one read and two simultaneous write (1R and 2W) algorithmic memory block 1580 is used as a high level algorithmic memory block. However, the goal is to construct a 2R and 2W memory system. Thus, the system must be enhanced to provide the ability of handling another read operation.

To handle the two read operations, each individual memory bank within the one read and two write (1R and 2W) algorithmic memory block 1580 is implemented with a two read or one write (2R or 1W) algorithmic memory block. Thus, below 1R and 2W block 1580 are the 1R or 1W memory macro 1520, 1521, 1522, 1523, 1541, 1542, and 1543 that provide memory service to algorithmic memory block 1580. In addition, the 1R and 2W algorithmic memory block 1580 also uses a fundamental SRAM memory block 1503 to implement the memory table within the memory controller (virtualized memory table 1513 as illustrated in FIG. 15A) to keep track of which addresses are stored in which memory macros. Since each memory bank within the 1R and 2W algorithmic memory block 1580 can now handle two read operations simultaneously, the overall hierarchical memory system 1590 is now a 2R and 2R memory system.

Every memory block must ultimately terminate with some type of fundamental memory block that actually provides the storage circuitry. Thus, each of the two read or one write algorithmic memory blocks (2R or 1W) memory blocks 1520, 1521, 1522, 1523, 1541, 1542, and 1543) must also be implemented with some type of underlying memory system. In the embodiment illustrated in FIG. 15C, each of the two read or one write algorithmic memory blocks 1520, 1521, 1522, 1523, 1541, 1542, and 1543 is implemented with a fundamental embedded DRAM memory block. Note that any other type of appropriate fundamental memory system such SRAM may also be used. The selection will depend upon the demands of the particular memory application.

Thus, as illustrated in FIG. 15C, a complex memory system with new features (the ability to handle two read operations and two write operations all simultaneously) can be implemented by organizing algorithmic memory blocks with less features such as (1R and 2W) memories and (2R or 1W) memories in a hierarchical arrangement. Each algorithmic memory block consists of a memory controller implementing control logic for a particular algorithmic memory and one or more lower-level memory systems. Each of the lower level memory systems may be other algorithmic memory blocks or fundamental memory blocks. Ultimately, at the 'leaf ends of the hierarchical memory system arrangement, some type of fundamental memory block is used to provide fundamental memory storage capabilities.

A First n Read and m Write Memory Implementation

Figure 16:
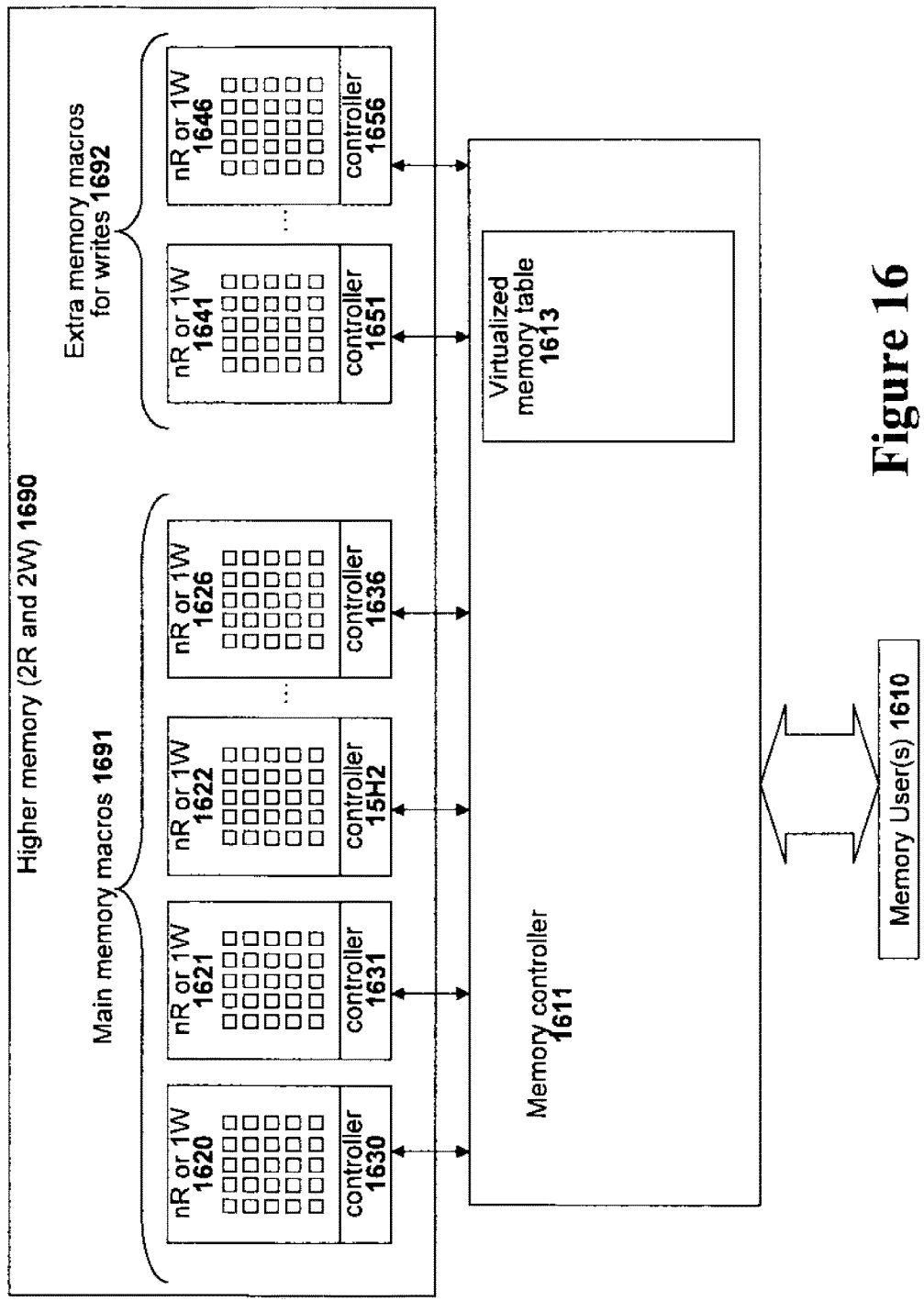
FIG. 16 illustrates the hierarchical memory system of FIG. 15A extended to handle additional simultaneous read and write operations.

The two read and two write (2R2W) hierarchical memory system of the previous section can be generalized into an n read and m write memory system that can handle n simultaneous read operations and m simultaneous write operations. FIG. 16 illustrates an n read and m write memory system that uses the same general hierarchical, architecture as the system of FIG. 15A.

In the hierarchical memory system of FIG. 16, a set of main memory macros 1691 are used to store data and a set of extra memory macros 1692 are used to handle potential memory conflicts between write operations and other memory operations attempting to access the same memory macro. The algorithmic memory block from the section "Memory System 2" may be used to achieve this goal. The number of extra memory macros 1692 should be large enough such that there will be enough available memory macros to handle all m write operation even in the worst case of memory conflicts between read operations and write operations. The memory controller 1611 uses a virtualized memory table 1613 to keep track of the current physical location of each data value. Specifically, the virtualized memory table 1613 specifies which virtualized memory addresses are stored in which physical memory macros. Note that the virtualized memory table 1613 itself may be constructed using an algorithmic memory block.

In a system that handles n simultaneous read operations and m simultaneous write operations then n+m-1 extra memory macros will always ensure that there are enough extra memory macros to move the addresses of write operations that conflict with other memory accesses. However, other memory means, such as write buffers, may also be used to handle conflicting write operations such that the n+m-1 extra memory macros will not always be required.

Each of the individual memory macros within the main memory macros 1691 and extra memory macros 1692 are n read or one write (nR or 1W) memory macros implemented with an algorithmic memory block (or hierarchy of memory blocks). For example, the XOR-based algorithmic memory block from the section "Memory System 6" may used to provide the n read or one write feature. In this manner, even if when all n read operations are directed toward the same memory macro, that memory macro will be able to respond to all n read operations simultaneously.

A Second 2 Read and 2 Write Memory Implementation

In the two read and two write memory system disclosed in a previous section, a high-level multiple-write algorithmic memory block was constructed using multiple-read algorithmic memory blocks as subcomponents. This architecture may be reversed such that a two read and two write memory system may be constructed as a high-level multiple-read algorithmic memory block that uses multiple-write algorithmic memory blocks as subcomponents.

Figure 17A:
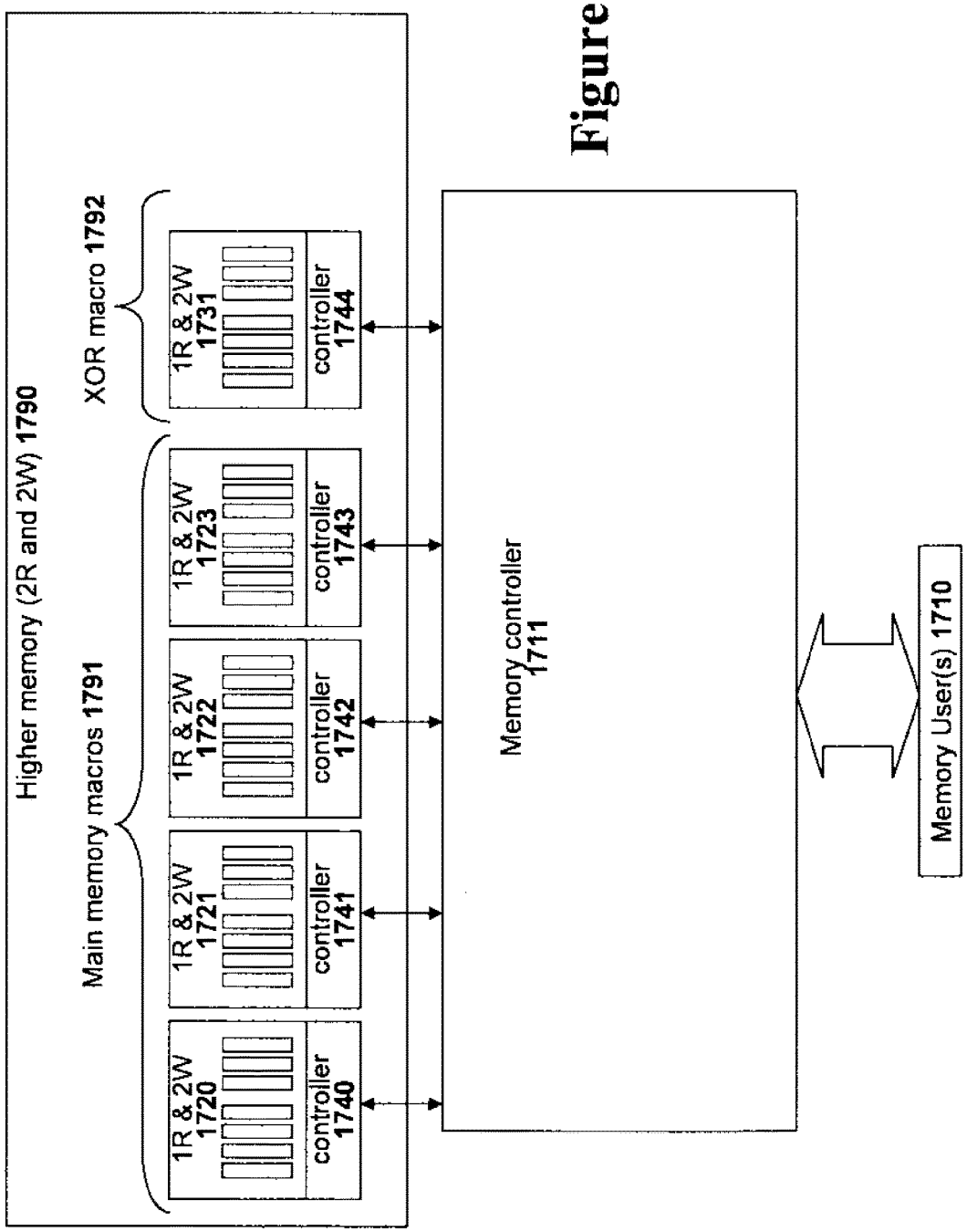
FIG. 17A illustrates a second embodiment of a hierarchical memory system that can handle two simultaneous read operations and two simultaneous write operations.

FIG. 17A illustrates second example of a hierarchical memory system that can handle two read operations and two write operations simultaneously. Referring to FIG. 17A, a first high-level organization implements an algorithmic memory block that can handle two simultaneous read operations or one write operation using the XOR-based system disclosed in the section on "Memory System 4". Specifically, the first high-level organization has a set of main memory macros 1791 for handling normal read or write operations and an XOR macro 1792 for handling a second read operation. The XOR macro 1792 contains an encoded representation of the data from the other main memory macros 1791. Thus, when two read operations are received, one read operation can be serviced directly by a bank in the set of set of main memory blocks 1791 and the other read operation can be serviced by another of the main memory blocks (when there is no conflict) or by using the encoded version of data within the XOR macros 1792 (when both read requests are addressed to the same memory macro in the set of main memory macros 1791).

To handle two simultaneous write operations in addition to the two read operations, each of the main memory macros 1791 and the XOR macro 1792 are implemented with an algorithmic memory block from the "Memory System 2" section that discloses a one read and n write algorithmic memory block. In the embodiment of FIG. 17A, each of the main memory macros 1791 and the XOR macro 1792 can handle one read and two write operations simultaneously. Specifically, any of the main memory blocks 1791 can handle the worst case scenario of one read operation and two write operations simultaneously attempting to access the same memory bank in the same memory macro. And the XOR macro 1792 can be used to handle an extra read operation such that two read operations and two write operations can handled simultaneously.

Figure 17B:
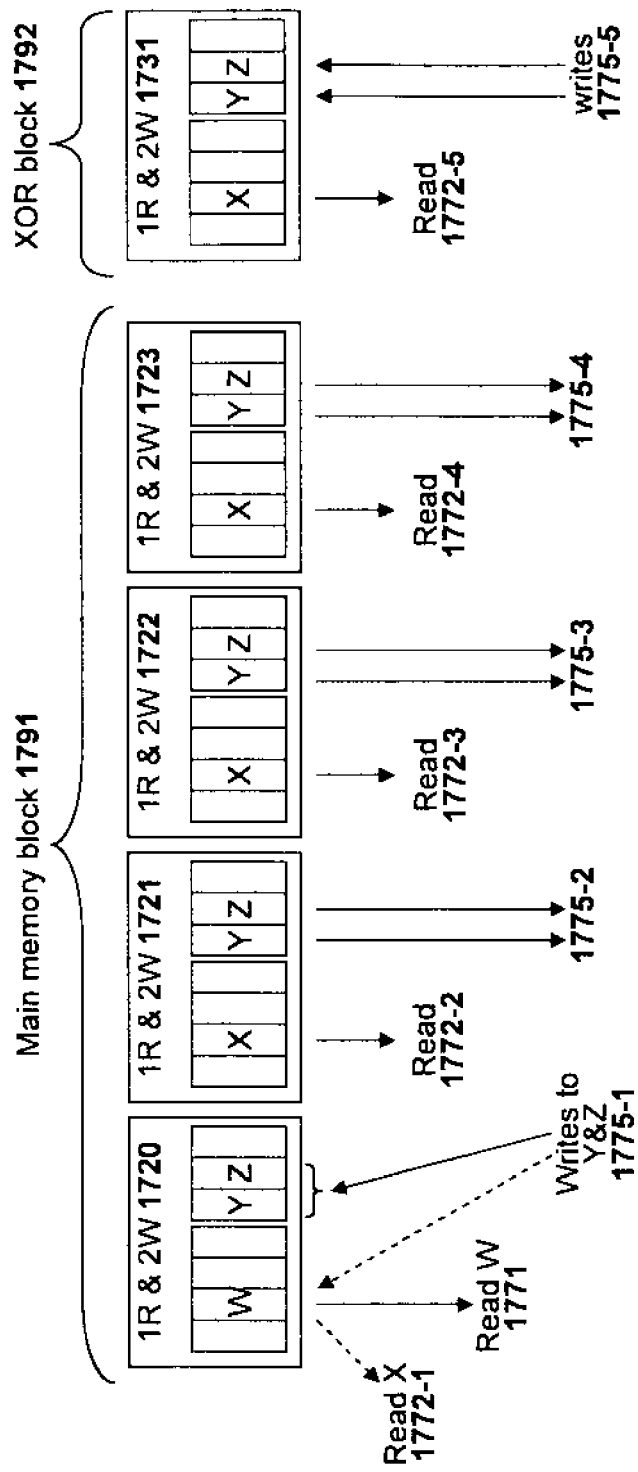
FIG. 17B illustrates how the hierarchical memory system of FIG. 17A handles two simultaneous read operations and two simultaneous write operations all directed toward the same memory bank in the same memory block.

FIG. 17B illustrates the case wherein all four memory operations (a read from address W, a read from address X, a write to address Y, and a write to address Z) are all directed toward a single memory bank (the second block from the left) within memory macro 1720. A first read operation 1771 (from address W) is handled directly by that addressed memory bank within memory macro 1720. Since that internal memory bank within memory macro 1720 is being used to handle the first read, it cannot be used by any of the other memory operations. To indicate this blockage, the targeted memory bank within memory macro 1720 is marked with an "W". All three remaining memory operations (the read from address X and the writes to addresses Y and Z), cannot use that memory bank labelled "W" within memory macro 1720.

Since the second read operation 1772-1 directed at address X cannot directly access that same targeted bank within memory macro 1720, the second read operation must be handled using the encoded version of the data within the XOR macro 1792. Thus, the memory controller for the high-level organization of the memory system reads the corresponding location in within the XOR macro 1792 with read operation 1772-5 to obtained the encoded representation of the data. To decode the encoded representation, the memory controller must also read the corresponding locations in all of the other memory macros. Thus, the memory controller reads from the second from the left memory bank within memory macros 1721, 1722, and 1723 with read operations 1772-2, 1772-3, and 1772-4. The data values read from read operations 1772-5, 1772-2, 1772-3, and 1772-4 are combined with an XOR operation to produce the requested data value for the read operation to address X. (The main representation of the address X data was in the second from the left memory bank in memory macro 1720 that could not be accessed due to a conflict with the read to address W.) The memory banks accessed by read operations 1772-5, 1772-2, 1772-3, and 1772-4 to handle the second read operation cannot be used by any of the other memory operations. To indicate this blockage, the memory banks accessed with read operations 1772-5, 1772-2, 1772-3, and 1772-4 are marked with a "X".

The two write operations 1775-1 are also blocked from accessing the targeted (second from left) memory bank in memory macro 1720 such that the memory controller of memory macro 1720 must direct the two write operations 1775-1 to other (free) memory banks within memory macro 1720. The memory controller of memory macro 1720 then remaps the target addresses (Y and Z) associated with the two write operations 1775-1 in a virtualized address table within memory macro 1720. However, since the higher-level structure of main memory macros 1791 and the XOR macro 1792 is an XOR-based system that must also keep an encoded version of each value written into the memory system, the high level memory controller must also update XOR macro 1792 with the data written to addresses Y and Z.

To update the XOR macro 1792, for each of the write operations, the high-level memory controller reads the corresponding locations of the write operation in all of the other main memory macros (memory macros 1721, 1722, and 1723), combines that data with the new data value being written into memory macro 1720 with an XOR operation, and writes the result into the corresponding location in the XOR macro 1792. For example, to handle the write to address Y, the system writes the data into a free memory bank in memory macro 1720 (depicted as the 'Y' in memory macro 1720), reads the corresponding location in the other main memory macros (as depicted by reads 1775-2, 1775-3, and 1775-4), combines the data from those reads with the new data for address Y using an XOR operation, and then writes that encoded version into the XOR macro 1792 with write 1775-5. All of the memory banks that are accessed by the writes to addresses Y and Z are marked as "Y" and "Z" respectively.

Note that memory macros 1721, 1722, and 1723 are all actually handling three write operations simultaneously even though those memory macros are only designated as 1 Read and 2 Write (1R and 2W) memories. This is possible since these three memory read operations are 'load balanced' such that they will always access different memory banks. The load-balancing occurs due to the resolution of potential bank conflict in memory macro 1720 that moves the two write operations (to addresses Y and Z) to different memory banks. And since the memory banks in each memory bank are independent from each other, memory macros 1721, 1722, and 1723 can handle the three 'load-balanced' read operations simultaneously.

As illustrated in FIG. 17B, all four memory operations (a read from address W, a read from address X, a write to address Y, and a write operation to address Z) to a single memory bank in a single memory macro 1720 can be handled simultaneously by the hierarchical memory system of FIG. 17B. All of the memory banks that were accessed (with either a read or a write) are labelled with the letter of the address from the original memory operation (W, X, Y, or Z.). The read from address W only accessed the one bank that stored the main representation of the data. The read from address X accessed the encoded representation from the XOR macro 1792 and three data values from memory macros 1721, 1722, and 1723 to decode the encoded representation. The writes to both address Y and Z each accessed five different memory banks: a write to a bank in memory macro 1720 to store the main representation; reads from memory macros 1721, 1722, and 1723 to create an encoded representation; and a write to XOR macro 1792 to store the encoded representation. None of these many memory operations conflict with each other.

Figure 17C:
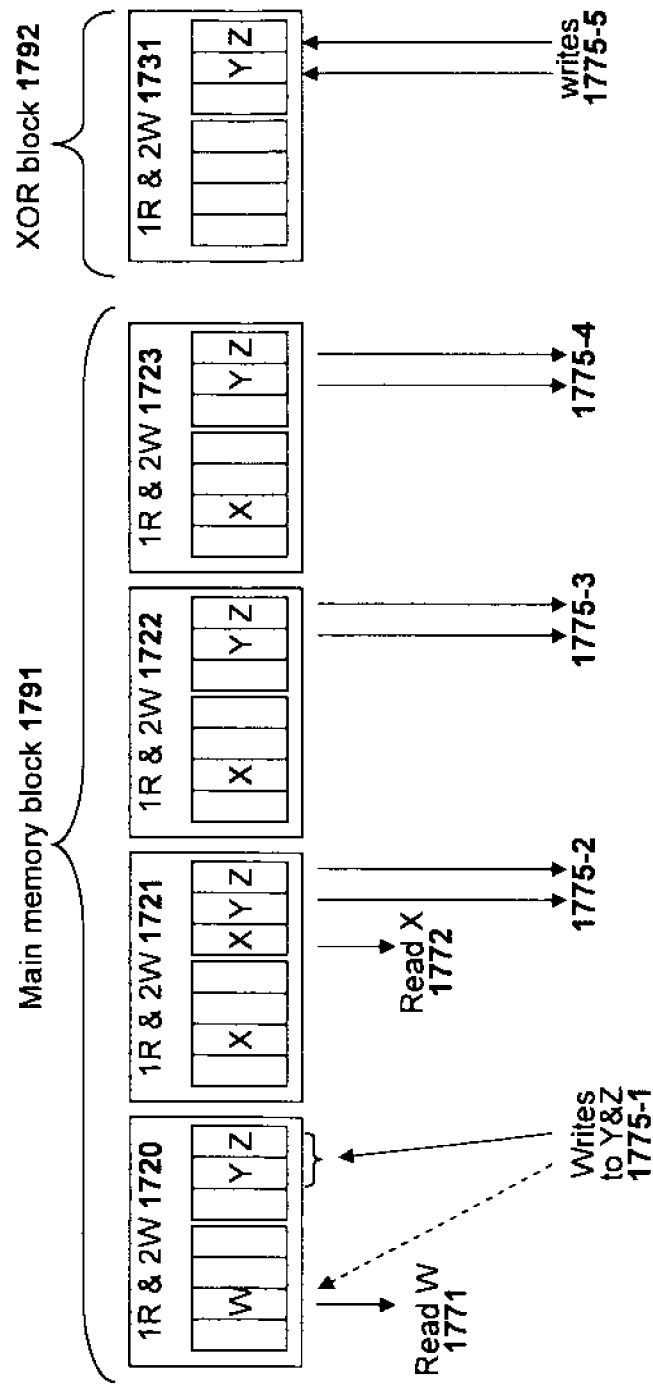
FIG. 17C illustrates how the hierarchical memory system of FIG. 17A uses an extra memory bank to prevent conflicts between read operations and write operations.

FIG. 17C illustrates a particularly difficult case for the 2R and 2W hierarchical memory system of FIG. 17A. The case of FIG. 17C explains why three extra banks are used within each of the main memory macros 1720 to 1723 and XOR macro 1731. In the example of FIG. 17C, a first read operation 1771 directed to address W and two write operations 1775-1 to addresses Y and Z all target the same second-from-left bank in memory block 1720. The memory controller for memory block 1720 allows the read to address W 1771 to access the bank to obtain the data needed to respond to the read operation. Thus, the memory controller for memory block 1720 must move the writes to addresses Y and Z to different memory banks that are available to accept the memory writes.

In this example, the three extra memory banks are deemed to be the currently available memory banks for accepting the write operations to addresses Y and Z. However, the second read operation 1772 is accessing one of the extra memory banks in memory macro 1721 Since, a write operation (into memory macro 1720 in this example) must also read access the corresponding memory bank in every other memory macro (memory macros 1721, 1722, and 1723 in this example) in order to update the XOR macro 1792 with the second representation of data, the writes cannot access the same extra memory bank as that second read operation 1772. Thus, when handling the write operations to addresses Y and Z the system cannot access the first of the extra memory banks since that first extra memory bank is being used by the read from address X 1772. Therefore, the system directs the write operations to addresses Y and Z 1775-1 to the last two extra memory banks in the memory macro 1720. This prevents a memory bank conflict in memory macro 1721 since the read 1772 of address X reads from the first extra memory bank and the two writes (to address Y and Z) can read from the last two extra memory banks in the memory macro 1721 as needed to update the XOR block 1792. Thus, the use of three extra memory banks in each of the memory blocks 1721, 1722, and 1723 and XOR macro 1731 allows the two write operations to avoid a conflict with either of the two read operations.

Figure 17D:
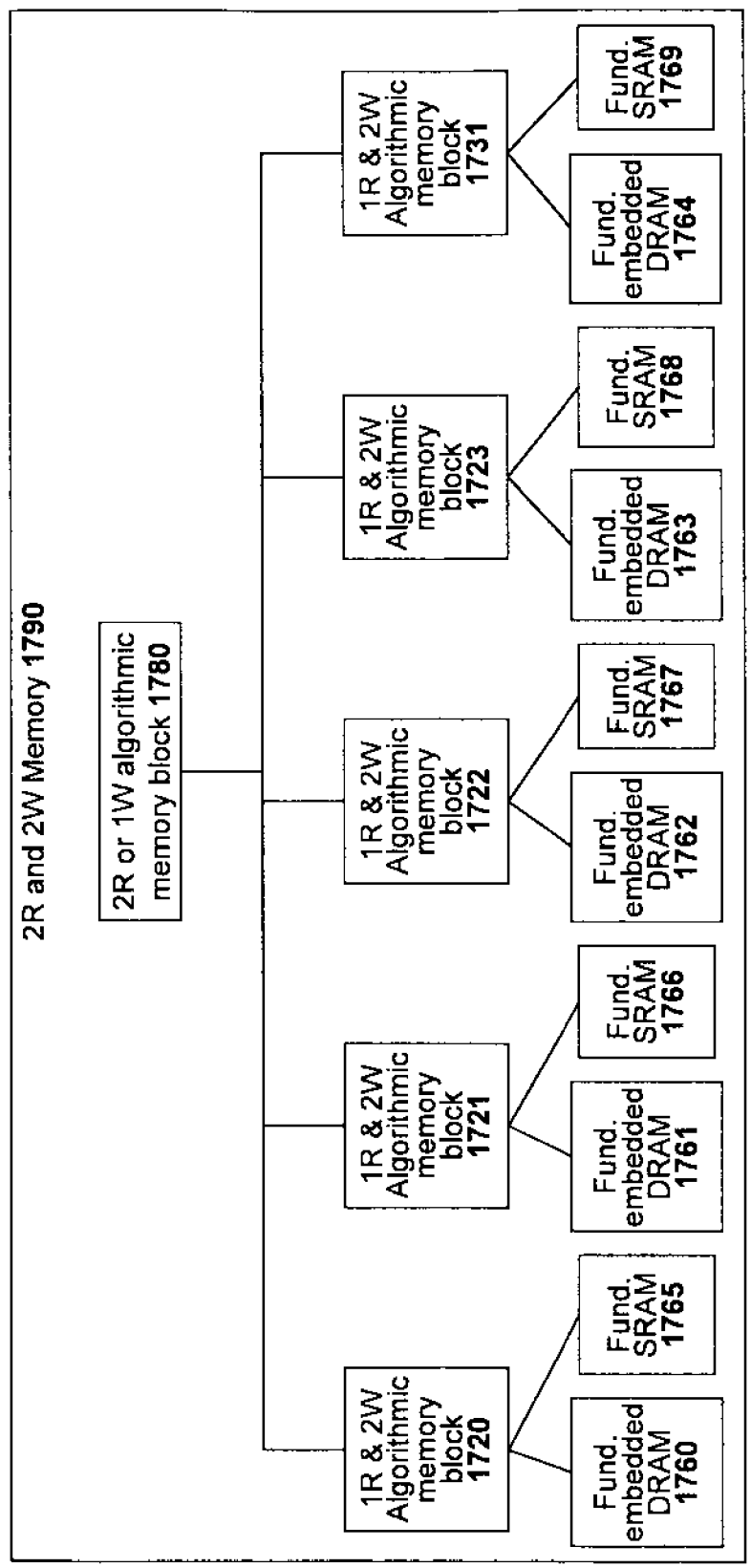
FIG. 17D conceptually illustrates the hierarchical memory organization of the hierarchical memory system of FIG. 17A.

FIG. 17D illustrates a hierarchical block diagram of the overall high level memory design of the memory system disclosed in FIGS. 17A to 17C that handles two simultaneous read operations and two simultaneous write operations. To implement the memory system, a two read algorithmic memory block 1780 is used as a high level algorithmic memory block. This high-level structure allows the hierarchical memory system to handle two simultaneous read operations.

To handle the two write operations, each of the five individual memory blocks within the high-level two read algorithmic memory block 1780 is implemented one read and two write algorithmic memory blocks (algorithmic memory blocks 1720, 1721, 1722, 1723, and 1731). Combining the multiple write capability of these lower memory blocks with the two read capability of the higher-level organization allows the full hierarchical memory system to handle two simultaneous reads and two simultaneous writes.

As set forth earlier, all of the algorithmic memory blocks must eventually terminate at the final "leaf" level with some type of fundamental memory block used to provide actual storage circuitry. In the memory system disclosed in FIGS. 17A to 17C, the lower algorithmic memory blocks are the one read and two write algorithmic memory blocks (algorithmic memory blocks 1720, 1721, 1722, 1723, and 1731). In the specific example embodiment of FIG. 17D, the memory banks of the one read and two write algorithmic memory blocks are each implemented with embedded DRAM memory 1760 to 1764 and the virtualized memory tables are implemented with fundamental SRAM 1765 to 1769. Other embodiments may use other memory choices as long as the required performance metric for the memory system are met.

Thus, as illustrated in FIGS. 17A to 17D, the ability to handle two read operations and two write operations all simultaneously can be implemented with an alternate hierarchical arrangement other than the arrangement presented in FIGS. 15A to 15C. In both hierarchical memory systems, each algorithmic memory block consists of a memory controller implementing control logic and one or more lower-level memory blocks. Each lower level memory block may be other algorithmic memory blocks or fundamental memory blocks. And the very lowest level ('leaf) ends of the hierarchical memory system arrangement are implemented with some type of fundamental memory block to provide fundamental memory storage capabilities. The memory architecture of FIGS. 17A to 17D, can extended to handle more simultaneous read operations by adding more XOR blocks and more write operations by adding more memory banks within each memory macro.

Other Hierarchical Memory Arrangements

Using the various different algorithmic memory blocks disclosed and various different types of fundamental memory devices, a wide variety of complex hierarchical memory systems may be constructed. Furthermore, memory systems that provide the same general functional characteristics, such as the number of simultaneous read and write operations supported, may be created in many different ways.

FIG. 18 illustrates a chart with a horizontal axis specifying a number of simultaneous write operations supported and a vertical axis specifying a number of simultaneous read operations supported. Any point on the graph represents a possible memory system that may be constructed with a hierarchical intelligent memory system. In the upper right, location system 1890 represents a memory system that supports four read operations and four write operations. That four read and four write memory system at position 1890 may be constructed in a variety of different manners.

A first method of constructing a four read and four write memory system 1890 is to used the teachings disclosed in FIG. 16 wherein a high-level algorithmic memory block organization uses extra memory banks to support multiple write operations. This is represented on FIG. 18 by the horizontal dot-dashed line 1811 to support four write operations. The individual memory banks are then implemented with an XOR-based algorithmic memory block organization that supports multiple read operations. This is represented on FIG. 18 by the vertical dot-dashed line 1815 to support four read operations.

A second method of constructing a four read and four write memory system 1890 is to used the teachings disclosed in FIGS. 17A to 17D wherein a high-level algorithmic memory block organization uses XOR banks to support multiple read operations. This is represented on FIG. 18 by the vertical solid line 1831 to support four read operations. The individual memory blocks within the high-level structure may be implemented with algorithmic memory blocks that contain extra memory banks for supporting additional write operations. This is represented on FIG. 18 by the horizontal sold line 1835 to support four write operations.

Other methods of constructing a four read and four write memory system 1890 may use other hierarchical structures that follow a path within the graph of FIG. 18. For example, one possible arrangement may use a first memory organizational layer to create a 1 read and 1 write memory system as depicted by dashed diagonal line 1861, a second memory organizational layer to implement three additional write operations as depicted by horizontal dashed line 1862, and a third memory organizational layer to implement three additional read operations as depicted by vertical dashed line 1863.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A memory circuit, comprising:
 a set of memory banks each having a plurality of data entries;

an algorithm operation result bank having a plurality of algorithm operation result entries, the plurality of data entries and the plurality of algorithm operation result entries forming a plurality of rows; and a memory controller configured to:
generate algorithmic operation results to be stored in each of the plurality of algorithm operation result entries using values stored in data entries of a corresponding row; and
resolve a memory access conflict of reading a first data entry and a second data entry in a first memory bank of the set of memory banks during one clock cycle by:
reading a first value stored at the first data entry of the first memory bank, values of all data entries other than the second data entry for a first row to which the second data entry belongs, and a first algorithmic operation result stored in a first algorithm operation result entry for the first row; and
generating a second value stored at the second data entry of the first memory bank from the values of all data entries other than the second data entry for the first row and the first algorithmic operation result.

2. The memory circuit of claim 1, wherein each of the algorithmic operation results is generated from all data entries of a corresponding row combined together with an exclusive-OR operation.

3. The memory circuit of claim 1, wherein each of the algorithmic operation results is generated from all data entries of a corresponding row using an erasure coding.

4. The memory circuit of claim 3, wherein the erasure coding is one of: Reed-Solomon coding, Maximum Distance Separable (MDS) codes and Galois Fields.

5. The memory circuit of claim 1, wherein the memory controller is further configured to write a new data value to a third data entry by:
writing the new data value to the third data entry;
reading values of all data entries other than the third data entry for a corresponding row;
generating an algorithmic operation result from the new data value and the values of all data entries other than the third data entry for the corresponding row; and
writing the generated algorithmic operation result to an algorithmic operation result entry for the corresponding row.

6. The memory circuit of claim 5, wherein each of the plurality of data entries is a simple single port memory cell.

7. The memory circuit of claim 1, wherein the memory controller is further configured to write a new data value to a third data entry by:
reading a currently stored data value at the third data entry;
writing the new data value to the third data entry;
reading a currently stored algorithmic operation result from an algorithm operation result entry for the corresponding row;
generating an updated algorithmic operation result by replacing the currently stored data value with the new data value; and
writing the updated algorithmic operation result to the algorithmic operation result entry for the corresponding row.

8. The memory circuit of claim 7, wherein each of the plurality of data entries is a two port memory cell and the new data value is written to the third data entry in a single clock cycle.

9. The memory circuit of claim 7, wherein each of the plurality of data entries is a single port memory cell and the new data value is written to the third data entry in two clock cycles.

10. The memory circuit of claim 1, wherein the memory access conflict is caused by reading all data entries for the first row that includes the second data entry.

11. A method of handling memory access requests in a memory circuit, comprising:
receiving a first memory read request for a first data entry and a second memory read request for a second data entry during one clock cycle, the first data entry and the second data entry located in a first memory bank of a set of memory banks of the memory circuit, the memory circuit comprising:
the set of memory banks each having a plurality of data entries; and
an algorithm operation result bank having a plurality of algorithm operation result entries, the plurality of data entries and the plurality of algorithm operation result entries forming a plurality of rows; and
reading a first value stored at the first data entry of the first memory bank, values of all data entries other than the second data entry for a first row to which the second data entry belongs, and a first algorithmic operation result stored in a first algorithm operation result entry for the first row; and
generating a second value stored at the second data entry of the first memory bank from the values of all data entries other than the second data entry for the first row and the first algorithmic operation result.

12. The method of claim 11, wherein the first algorithmic operation result is generated from all data entries of the first row combined together with an exclusive-OR operation.

13. The method of claim 11, wherein the first algorithmic operation result is generated from all data entries of the first row using an erasure coding.

14. The method of claim 13, wherein the erasure coding is one of: Reed-Solomon coding, Maximum Distance Separable (MDS) codes and Galois Fields.

15. The method of claim 11, further comprising:
receiving a new data value to be written to a third data entry;
writing the new data value to the third data entry;
reading values of all data entries other than the third data entry for a corresponding row;
generating an algorithmic operation result from the new data value and the values of all data entries other than the third data entry for the corresponding row; and
writing the generated algorithmic operation result to an algorithmic operation result entry for the corresponding row.

16. The method of claim 11, wherein each of the plurality of data entries is a simple single port memory cell.

17. The method of claim 11, further comprising:
receiving a new data value to be written to a third data entry;
reading a currently stored data value at the third data entry;
writing the new data value to the third data entry;
reading a currently stored algorithmic operation result from an algorithm operation result entry for the corresponding row;
generating an updated algorithmic operation result by replacing the currently stored data value with the new data value; and writing the updated algorithmic operation result to the algorithmic operation result entry for the corresponding row.

18. The method of claim 17, wherein each of the plurality of data entries is a two port memory cell and the new data value is written to the third data entry in a single clock cycle.

19. The method of claim 17, wherein each of the plurality of data entries is a single port memory cell and the new data value is written to the third data entry in two clock cycles.

20. The method of claim 11, wherein the second memory read request is a request for reading all data entries for the first row that includes the second data entry.

* * * * *